US007116476B2

(12) United States Patent
Suzuki et al.

(10) Patent No.: US 7,116,476 B2
(45) Date of Patent: Oct. 3, 2006

(54) FRESNEL LENS, SCREEN, IMAGE DISPLAYING DEVICE, LENS FORMING MOLD MANUFACTURING METHOD AND LENS MANUFACTURING METHOD

(75) Inventors: Hiroshi Suzuki, Tokyo (JP); Kohei Teramoto, Tokyo (JP); Yoshihiro Ashizaki, Tokyo (JP); Shinsuke Sikama, Tokyo (JP); Hiroshi Sekiguchi, Tokyo (JP); Tadahiko Ryuugou, Tokyo (JP); Kuniko Kojima, Tokyo (JP)

(73) Assignees: Mitsubishi Denki Kabushiki Kaisha, Tokyo (JP); Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/792,795

(22) Filed: Mar. 5, 2004

(65) Prior Publication Data

US 2004/0169921 A1    Sep. 2, 2004

Related U.S. Application Data

(62) Division of application No. 10/148,323, filed as application No. PCT/JP01/08578 on May 29, 2002, now Pat. No. 6,726,859.

(30) Foreign Application Priority Data

Sep. 29, 2000  (JP) ............................. 2000-300937
Jul. 18, 2001  (WO) ...................... PCT/JP01/06250

(51) Int. Cl.
G03B 21/56  (2006.01)
G03B 21/60  (2006.01)
G02B 3/08  (2006.01)

(52) U.S. Cl. ...................... 359/457; 359/460; 359/742

(58) Field of Classification Search ................ 359/457, 359/460, 742, 743
See application file for complete search history.

(56) References Cited

U.S. PATENT DOCUMENTS 4,443,088 A * 4/1984 Ohtaka ........................ 359/743
4,674,836 A   6/1987 Yata et al.
4,708,435 A   11/1987 Yata et al.
4,729,631 A * 3/1988 Takahashi et al. .......... 359/456
6,249,376 B1 * 6/2001 Goto ........................... 359/457
6,724,535 B1 * 4/2004 Clabburn ..................... 359/457
6,804,055 B1 * 10/2004 Peterson et al. ............ 359/457

FOREIGN PATENT DOCUMENTS

| JP | 55-111936 A | 8/1980 |
| JP | 59-15925 A | 1/1984 |
| JP | 61-52601 A | 3/1986 |
| JP | 61-256337 | 11/1986 |
| JP | 61-277935 A | 12/1986 |

(Continued)

*Primary Examiner*—Christopher Mahoney
(74) *Attorney, Agent, or Firm*—Birch, Stewart, Kolasch & Birch, LLP

(57) ABSTRACT

A Fresnel lens has a plurality of pitch areas in which a plurality of hybrid type prism portions are arranged. Each hybrid type prism portion has a refraction type prism portion and a total reflection type prism portion. In the refraction type prism portion, a ray of incident light Li1 of an incident angle "a" is refracted twice and goes out as a ray of outgoing light Lo1 of an outgoing angle "f". In the total reflection type prism portion, a ray of incident light Li2 of the incident angle "a" is refracted, totally reflected and refracted in that order and goes out as a ray of outgoing light Lo2 parallel to the ray of outgoing light Lo1.

41 Claims, 47 Drawing Sheets

FOREIGN PATENT DOCUMENTS

| | | |
|---|---|---|
| JP | 62-19837 A | 1/1987 |
| JP | 62-113131 | 5/1987 |
| JP | 63-2031 A | 1/1988 |
| JP | 2-134527 U | 11/1990 |
| JP | 4-152332 A | 5/1992 |
| JP | 4-281443 A | 10/1992 |
| JP | 4-362625 A | 12/1992 |
| JP | 7-276371 A | 10/1995 |
| JP | 10-166202 A | 6/1998 |

\* cited by examiner

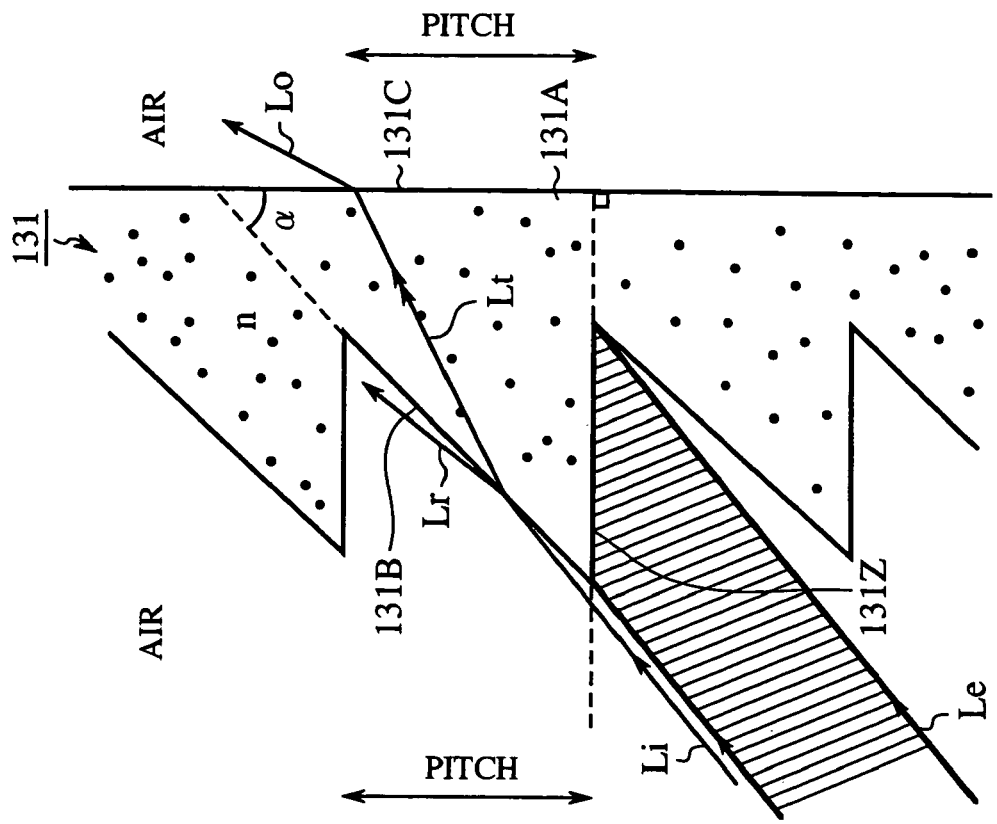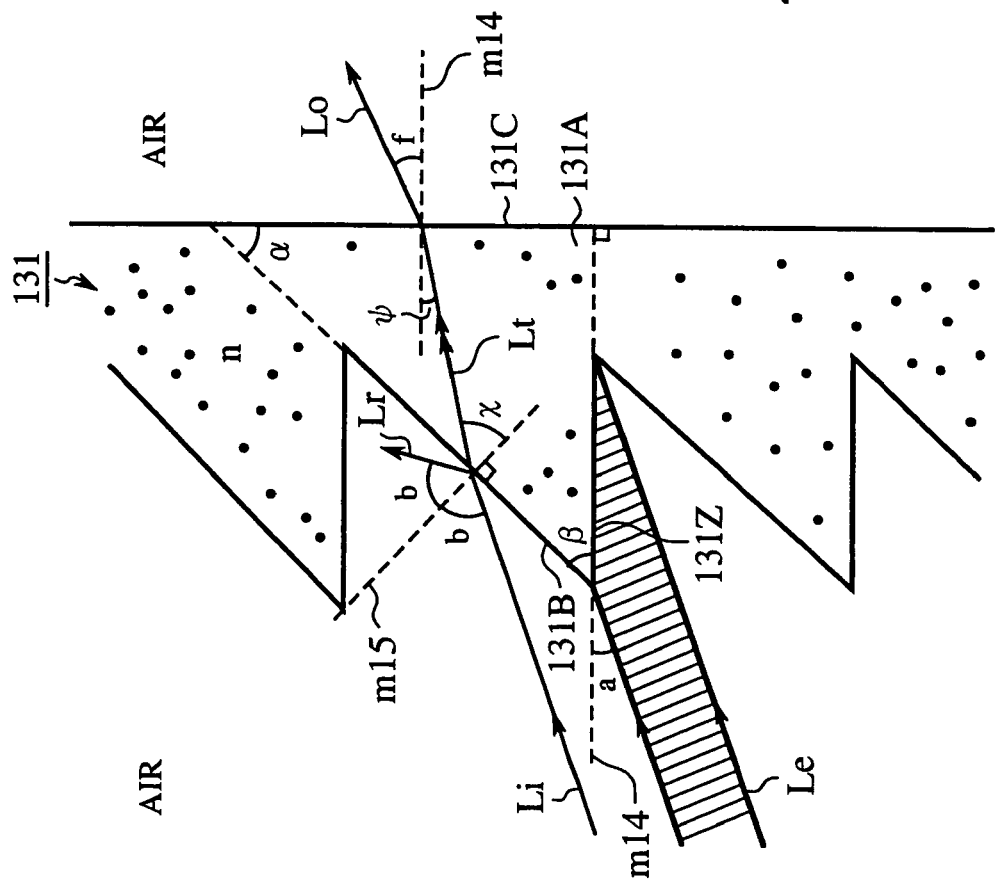

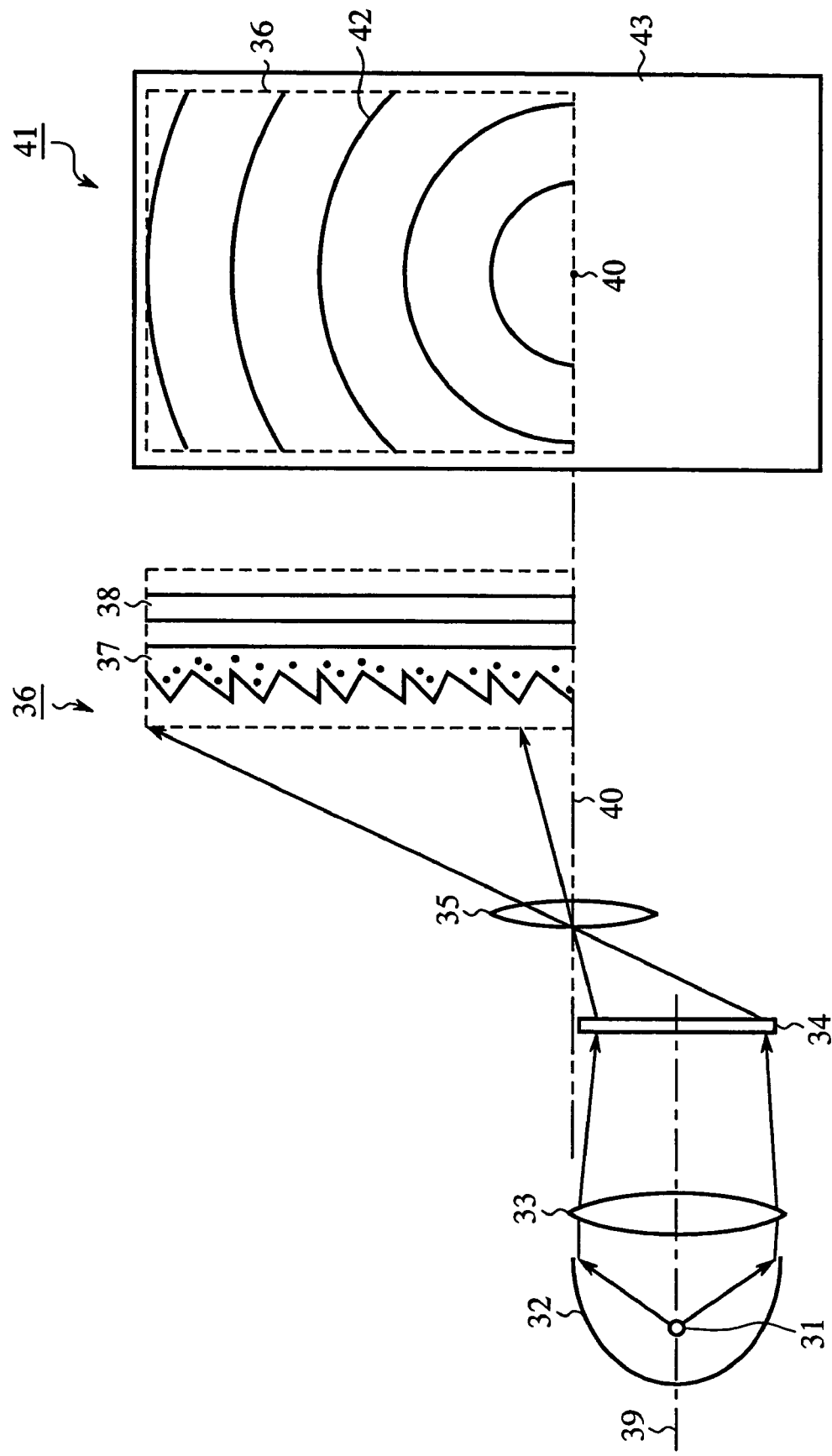

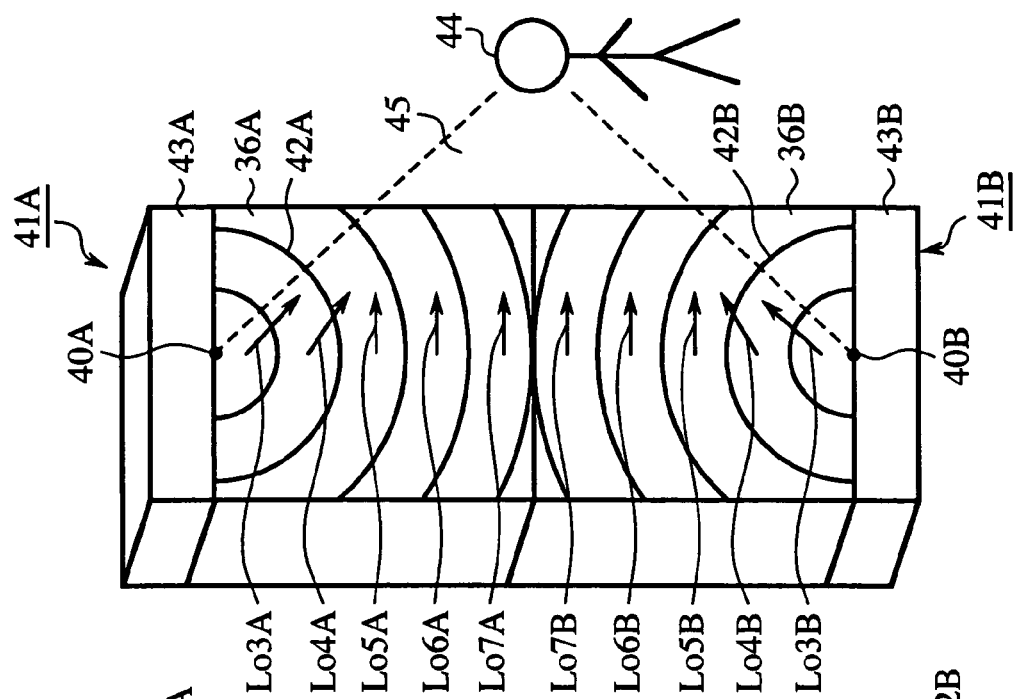
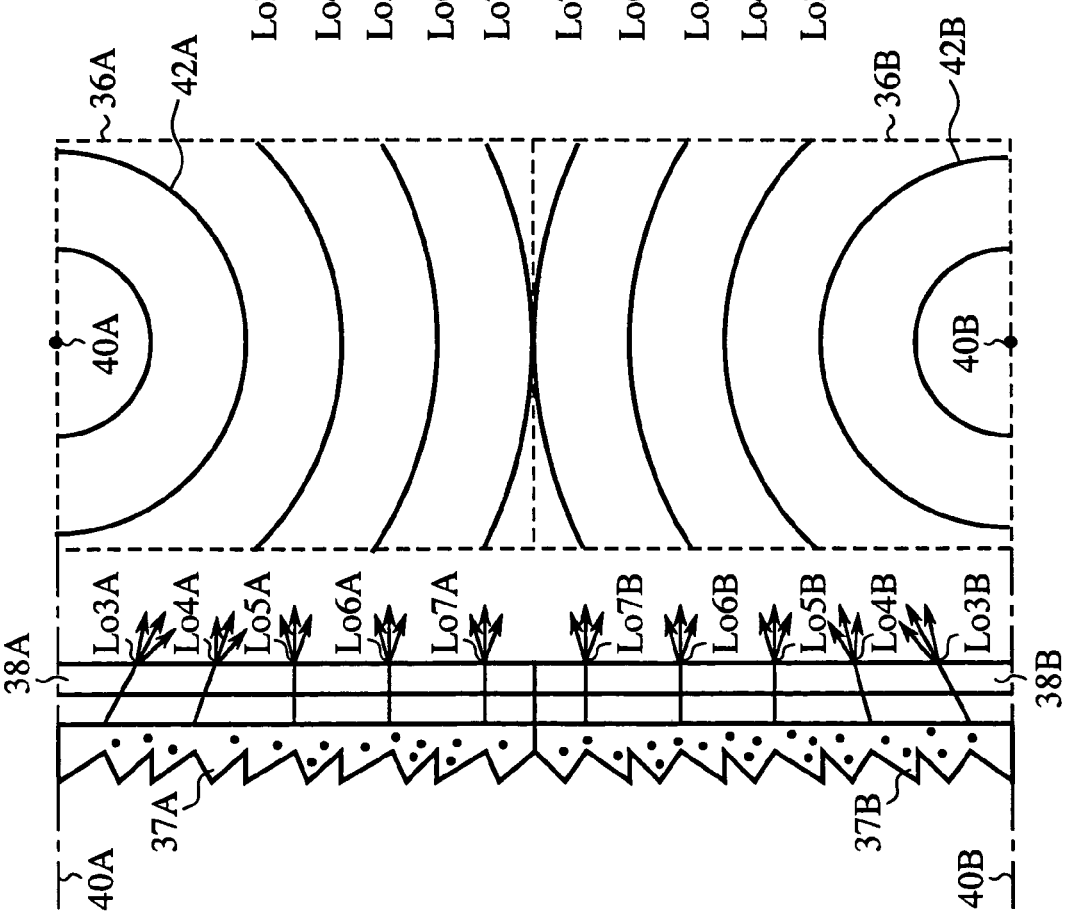

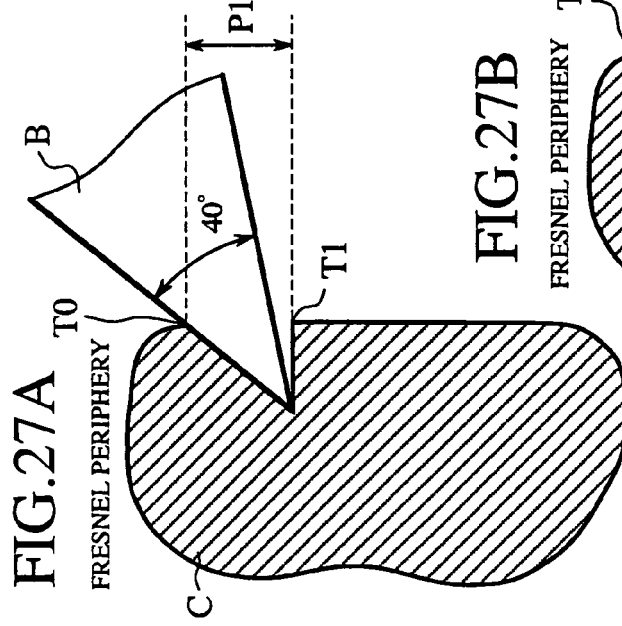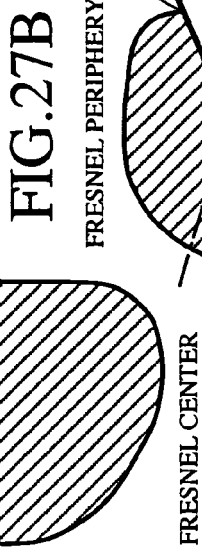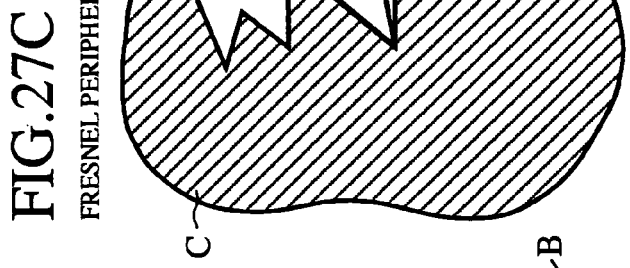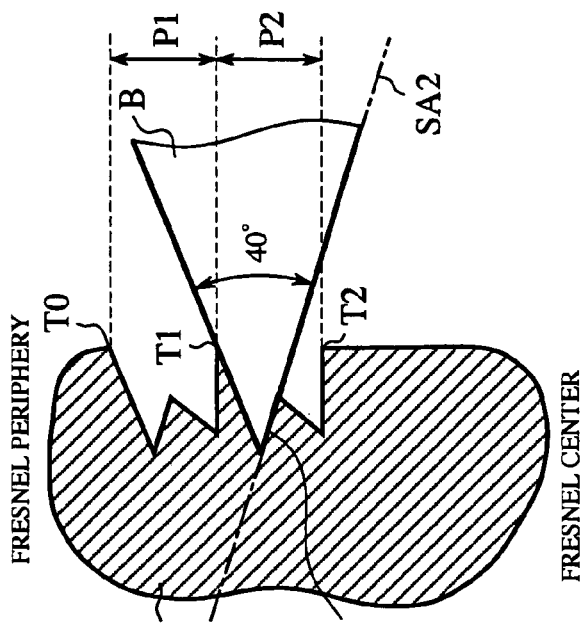
FIG. 27A
FIG. 27B
FIG. 27C
FIG. 27D

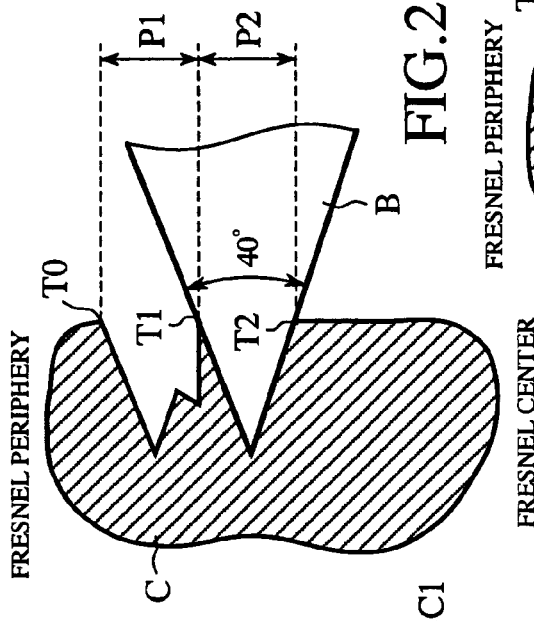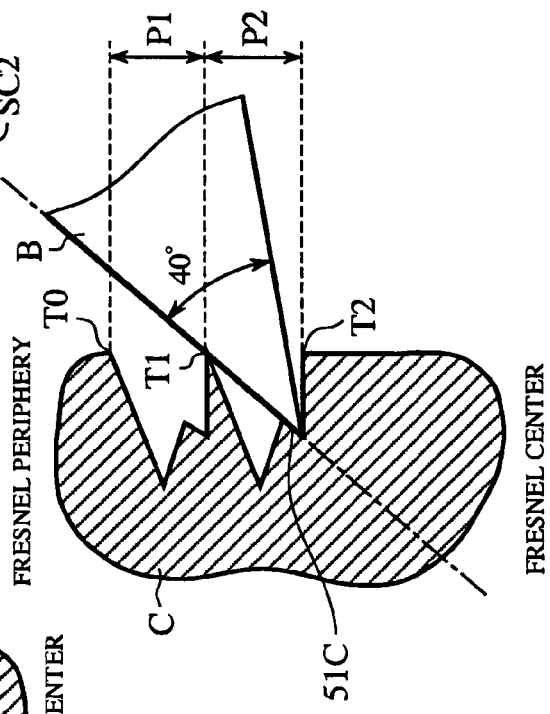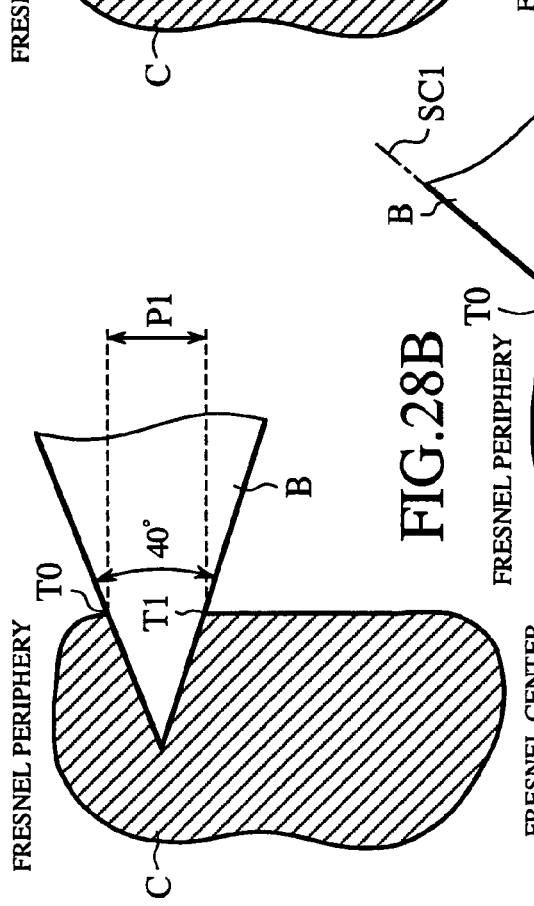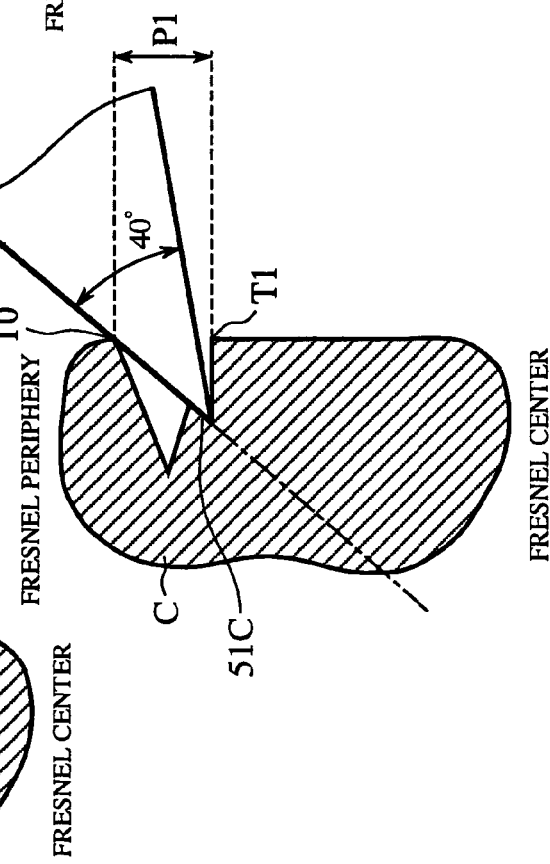

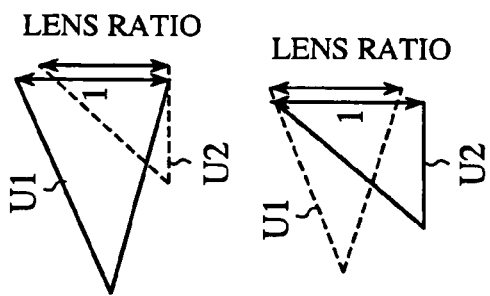
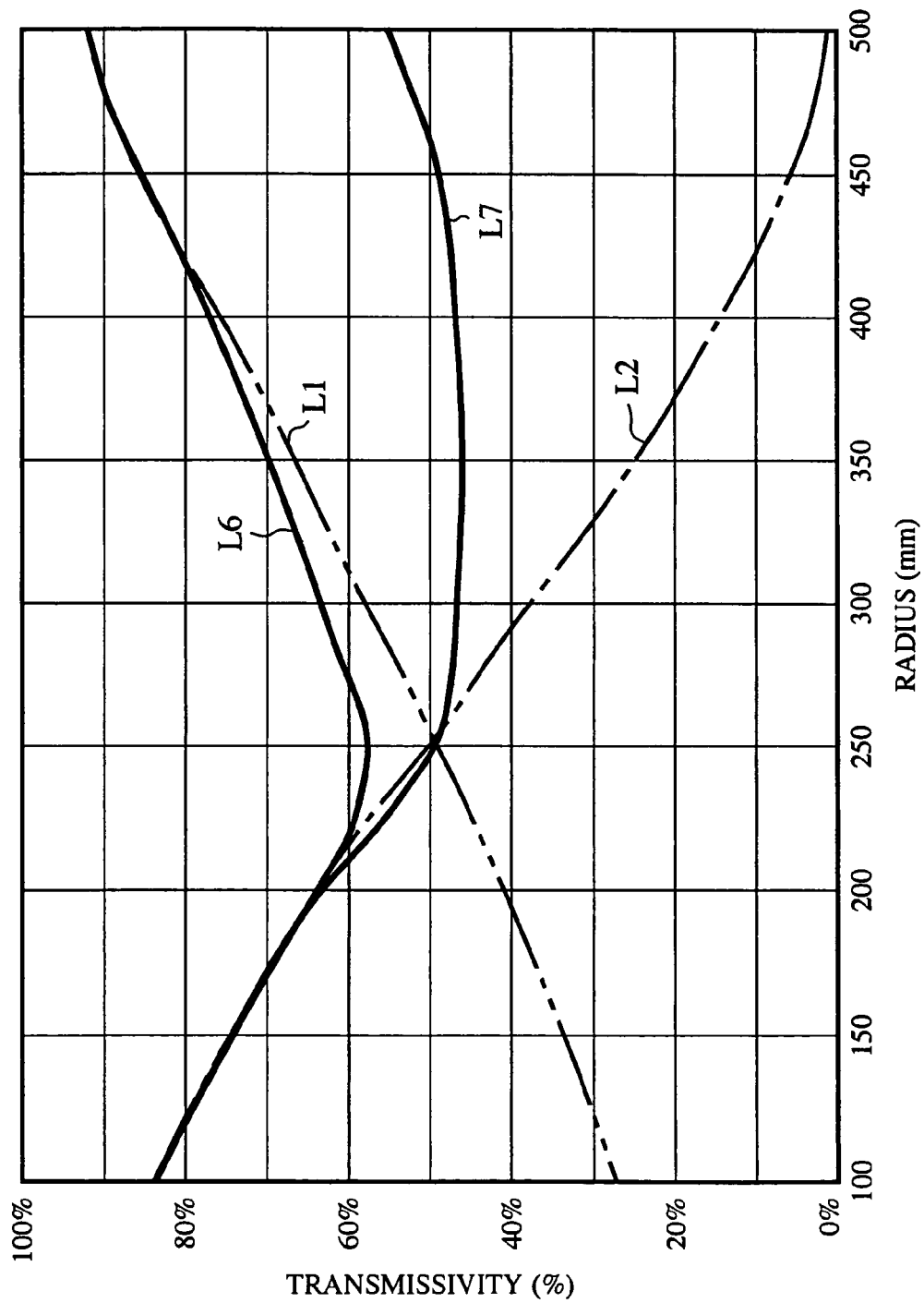
FIG.32

FRESNEL PERIPHERY

FRESNEL CENTER

FRESNEL PERIPHERY

FRESNEL CENTER

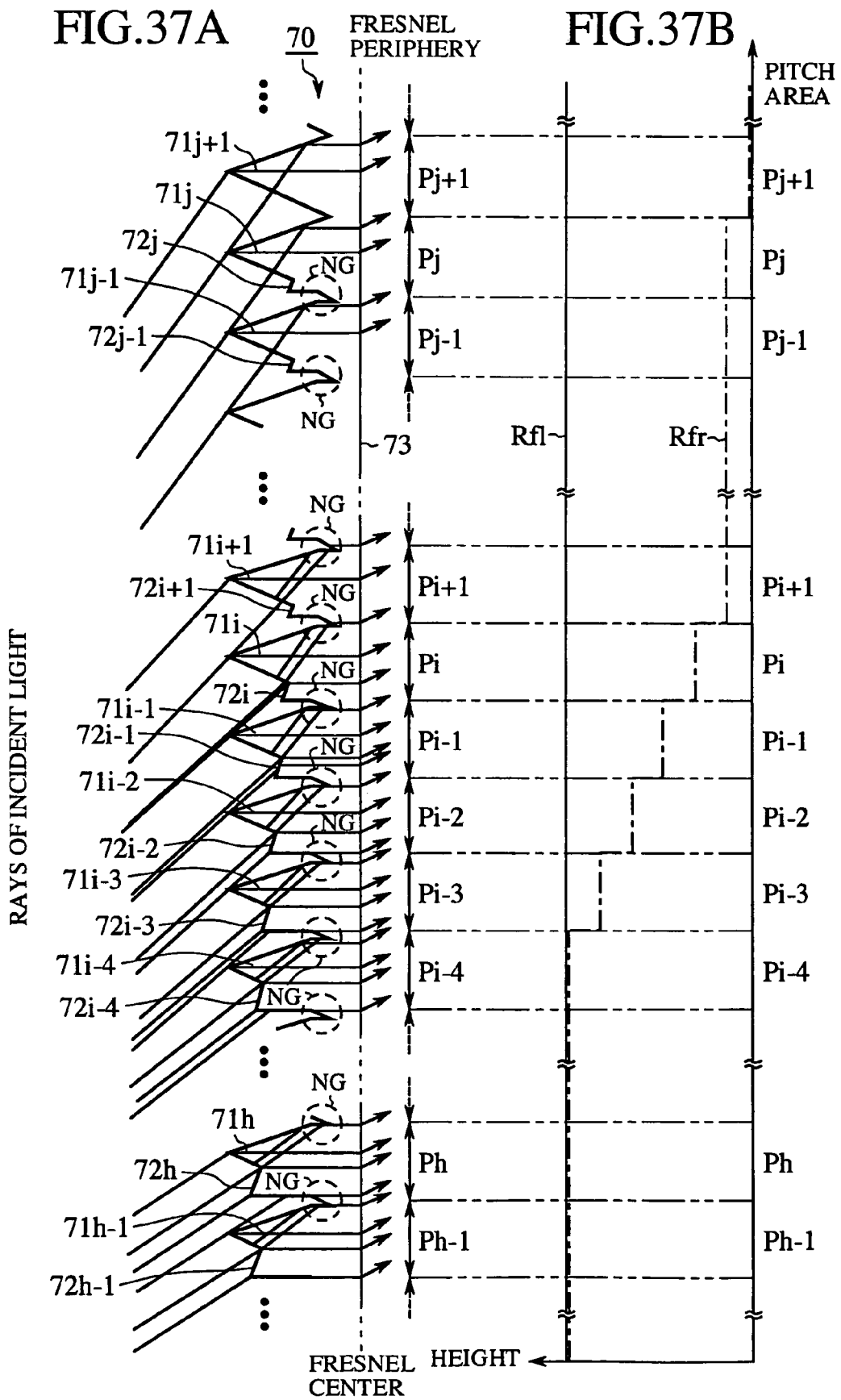

FRESNEL LENS, SCREEN, IMAGE DISPLAYING DEVICE, LENS FORMING MOLD MANUFACTURING METHOD AND LENS MANUFACTURING METHOD

This application is a Divisional of application Ser. No. 10/148,323 filed on May 29, 2002 now U.S. Pat. No. 6,726,859 and for which priority is claimed under 35 U.S.C. § 120. Application Ser. No. 10/148,323 is the national phase of PCT International Application No. PCT/JP01/08578 filed on Sep. 28, 2001 under 35 U.S.C. § 371. The entire contents of each of the above-identified applications are hereby incorporated by reference. This application also claims priority of Application No. JP 2000-300937 filed in Japan on Sep. 29, 200 and International Application No. PCT/JP01/06250 filed on Jul. 18, 2001 under 35 U.S.C. § 119.

TECHNICAL FIELD

The present invention relates to a Fresnel lens having the same function as a convex lens almost without requiring a distance between a light incident point and a light outgoing point. Also, the present invention relates to a rear projection type screen, to which the Fresnel lens is applied, and an image displaying device to which the screen is applied. In addition, the present invention relates to a lens forming mold manufacturing method and a lens manufacturing method.

BACKGROUND ART

In an image displaying device represented by a rear projection type projection television, a screen is used, and image light emitted from an image light source is projected on the screen. In general, the screen of the image displaying device is formed by combining a lenticular and a Fresnel lens. The lenticular functions as a light diffusion plate in which the image light is scattered to form an image. In the Fresnel lens, the image light emitted from the image light source is refracted, and rays of refracted light go out to the lenticular almost in parallel to each other.

FIG. 1 is a view showing an external appearance of a conventional Fresnel lens.

In FIG. 1, 101 indicates a Fresnel lens seen on a slant. 102 indicates a sectional shape of the Fresnel lens 101. 103 indicates an optical axis of the Fresnel lens 101. 104 indicates a prism portion formed for each pitch area corresponding to one pitch length in the Fresnel lens 101.

In the manufacturing of the Fresnel lens 101, a metal mold (or a lens forming mold) is formed by rotating the mold on the optical axis 103, synthetic resin is poured into the metal mold, the synthetic resin is hardened, the metal mold is taken off from the synthetic resin, and the manufacturing of the Fresnel lens 101 is completed. On a surface of the manufactured Fresnel lens 101, a plurality of ring bands are formed in a concentric circular shape around the optical axis 103. As is realized by looking at the sectional shape 102 of the Fresnel lens 101, the ring bands formed in a concentric circular shape denote the plurality of prism portions 104.

That is, the prism portions 104 of the sectional shape 102 formed in a saw-tooth shape are equally spaced at pitch intervals respectively corresponding to one pitch width. One pitch width of the Fresnel lens 101 actually used is almost equal to 0.1 mm, and the pitch width is very small even though the pitch width is compared with each of minimum pixels on which an image is projected through the Fresnel lens 101.

The whole Fresnel lens 101 functions as one convex lens. Because the prism portions 104 can be thinned, rays of light incident on the Fresnel lens 101 can be changed or refracted almost without requiring a distance between an incident point of the ray of incident light and an outgoing point of a ray of outgoing light.

In the image displaying device, to shorten the depth of the image displaying device, image light is often injected on the Fresnel lens 101 of the screen from a direction inclined with respect to an incident normal of the Fresnel lens 101 as much as possible. Therefore, a thinned type image displaying device can be obtained.

FIG. 2 is a view showing the configuration of an image displaying device in which a conventional Fresnel lens is applied to a screen. A plurality of arrows indicate a plurality of rays of light.

111 indicates a light emitting source (or illumination light source means) for emitting a plurality of rays of light. 112 indicates a parabolic mirror (or illumination light source means). The light emitting source 111 is disposed on a focal point of the parabolic mirror 112. 113 indicates a converging lens (or converging optics means) for converging a plurality of rays of light reflected on the parabolic mirror 112. 114 indicates a light bulb (or optical modulating means) formed of liquid crystal. An intensity of each ray of light converged by the converging lens 113 is spatially changed in the light bulb 114 to modulate the converged rays of light according to display contents written on the light bulb 114.

115 indicates a projection optics lens (or projection optics means) for forming an image from the rays of light of which the intensities are changed by the light bulb 114. 116 indicates a rear projection type screen for receiving the image of the rays of light formed by the projection optics lens 115 from the rear side and displaying the image. The rays of light spreading in the projection optics lens 115 are changed in the screen 116 to a plurality of rays of light parallel to each other, the image formed from the rays of light is displayed on the screen 116, and the rays of light are diffused from the screen 116 to a wide area. Therefore, the screen 116 has a function for widening a view field.

In the screen 116, 117 indicates a Fresnel lens described before, and 118 indicates a lenticular.

In the Fresnel lens 117, the spreading rays of light sent from the projection optics lens 115 are received on an incident plane 117A, and the rays of light go out at a prescribed outgoing angle through a prism portion 117B arranged for each pitch area corresponding one pitch. In short, the Fresnel lens 117 is used to almost collimate the rays of light spreading in the projection optics lens 115. An image is formed on the lenticular 118 from the rays of light going out from the Fresnel lens 117, and the rays of light are diffused.

119 indicates an optical axis. The optical axis 119 exists for the parabolic mirror 112, the converging lens 113, the light bulb 114, the projection optics lens 115, the Fresnel lens 117 and the lenticular 118, and the optical axis 119 is perpendicular to the incident plane 117A of the Fresnel lens 117.

Next, an operation will be described below.

The light emitting source 111 disposed on a focal point of the parabolic mirror 112 can be almost regarded as a point source. Therefore, rays of light emitted from the light emitting source 111 are reflected on the parabolic mirror 112 and goes out to the converging lens 113 as almost parallel rays of light. When the parallel rays of light are converged by the converging lens 113 onto the light bulb 114, intensities of the converged rays of light are spatially changed by the light bulb 114 to modulate the converged rays of light according to display contents of the light bulb 114.

The rays of light intensity-modulated are projected on the rear surface of the screen 116 at a wide angle by the projection optics lens 115, and an image is formed from the rays of projected light. An angle between each ray of light and the optical axis 119 is called a projection angle. As shown in FIG. 2, the projection angle in each pitch area differs from those in the other pitch areas. However, because the pitch between each pair of prism portions 117B is considerably shorter than the lengths of the projection optics lens 115 and the screen 116, a plurality of rays of light incident on each prism portion 117B can be almost regarded as a plurality of parallel rays.

An angle between a normal m11 of the incident plane 117A and each ray of incident light denotes an incident angle. Because the incident angle of each ray of incident light is equal to the projection angle of the ray of incident light according to the relationship of alternate-interior angles obtained from a straight line (the incident ray) intersecting two parallel lines (the optical axis 119 and the normal m11), the more a pitch area receiving a ray of light approaches the optical axis 119, the smaller the incident angle of the ray of light is. Also, the more a pitch area receiving a ray of light is far away from the optical axis 119, the larger the incident angle of the ray of light is. In particular, the ray of light going out to the prism portion 117B placed at each end of the screen 116 is incident on the incident plane 117A at the maximum incident angle.

A size of the screen 116 is determined according to this maximum incident angle, or the maximum projection angle of the projection optics lens 115, and a projection distance from the projection optics lens 115 to the screen 116. In contrast, in a case where the size of the screen 116 is predetermined, the larger the maximum projection angle is, the more the projection distance can be shortened. Therefore, an optical system having a shortened distance in the direction of the optical axis 119 can be obtained, and the image displaying device can be thinned.

In the Fresnel lens 117, a plurality of rays of light are received on the incident plane 117A at the incident angles respectively, and the ray of light goes out to the lenticular 118 at a prescribed outgoing angle through the prism portion 117B arranged for each pitch area. The outgoing angle is defined as an angle between a straight line parallel to the optical axis 119 on the Fresnel lens 117 and the ray of light going out from the Fresnel lens 117. The outgoing angle is normally set to a small angle ranging from 0 degree to several degrees. In short, the rays of light going out from the Fresnel lens 117 are almost parallel to the optical axis 119 (the outgoing angle for the rays of light is set to 0 degree in FIG. 2). In this case, the higher the transmissivity (a ratio in power of the outgoing light to the incident light) of the Fresnel lens 117 for the rays of light, the better the Fresnel lens 117. Also, the higher the transmissivity, the more the image displayed on the screen 116 is bright.

In the lenticular 118, the rays of light are received from the prism portions 117B of the Fresnel lens 117. Also, though an image of the display contents of the light bulb 114 is formed by the projection optics lens 115, the rays of light indicating the image are diffused from the lenticular 118 in a direction (the right direction of the screen 116 in FIG. 2) directed toward a user. The user of the image displaying device views the rays of light diffused from each of a plurality of image forming points as an image. Because the rays of light are diffused by the lenticular 118, the user can view the image which has the brightness required in a certain view field.

As is described above, the larger the maximum projection angle of the projection optics lens 115, in other words, the larger the maximum incident angle of light to the Fresnel lens 117, the more the projection distance is shortened. Therefore, a thin type image displaying device having a shortened projection distance can be provided for the user.

In cases where a size of the screen 116 is predetermined by the specification of the screen 116, even though a large maximum projection angle is obtained by the function of the projection optics lens 115 or another optical unit, unless the Fresnel lens 117 receives a ray of light corresponding to the maximum projection angle, the projection distance cannot be shortened. In conclusion, it is an important point that the Fresnel lens 117 is designed so as to set the incident angle of a ray of light as large as possible on condition that the ray of light go out from the Fresnel lens 117 at high transmissivity.

Next, various principles of the conventional Fresnel lens will be described below.

FIG. 3A and FIG. 3B are respectively an enlarged view showing the sectional shape of a plurality of prism portions arranged in a plurality of pitch areas of the conventional Fresnel lens, FIG. 3A shows the sectional shape in case of a small incident angle, and FIG. 3B shows the sectional shape in case of a large incident angle. Each arrow in FIG. 3A and FIG. 3B indicates a ray of light.

In FIG. 3A and FIG. 3B, 121 indicates a Fresnel lens. 121A indicates a refraction type prism portion formed for each pitch area of the Fresnel lens 121.

121B indicates an incident plane of each refraction type prism portion 121A. The incident plane 121B is formed in a flat surface shape and is perpendicular to an optical axis (not shown) of the Fresnel lens 121. 121C indicates an outgoing plane of each refraction type prism portion 121A. 121Z indicates an ineffective plane of each refraction type prism portion 121A. Each refraction type prism portion 121A is shaped by the incident plane 121B, the outgoing plane 121C and the ineffective plane 121Z. Here, the ineffective plane 121Z does not participate with a ray of incident light or a ray of outgoing light.

Also, Li indicates a ray of light incident on the incident plane 121B. Lr indicates a ray of light reflected on the incident plane 121B. Lt indicates a ray of transmitted light refracted on the incident plane 121B and transmitted through the internal of the refraction type prism portion 121A. Lo indicates a ray of outgoing light refracted on the outgoing plane 121C and going out to the air. m12 indicates a normal of the incident plane 121B, and m13 indicates a normal of the outgoing plane 121C.

Next, an operation will be described below.

In FIG. 3A, when a ray of incident light Li transmitted through the air having a refractive index of unity comes on the Fresnel lens 121 having a refractive index of n (n>1) at a real incident angle "a" to the normal m14, the ray of incident light Li is divided on the incident plane 121B into a ray of transmitted light Lt transmitted at a refraction angle of $\chi$ and a ray of reflected light Lr transmitted at a reflection angle of "a". The ray of reflected light Lr causes a loss to the Fresnel lens 121.

The ray of transmitted light Lt refracted on the incident plane 121B and transmitted through the internal of the refraction type prism portion 121A makes an angle of $\phi$ to the normal m13 and reaches the outgoing plane 121C. A part of the ray of transmitted light Lt is changed to a ray of reflected light (not shown), and the remaining part of the ray of transmitted light Lt crosses the outgoing plane 121C and goes out as a ray of outgoing light Lo at an outgoing angle of "f".

As is described above, the ray of incident light Li incident on the Fresnel lens 121 at the incident angle of "a" makes a turn in the Fresnel lens 121 to a direction of an outgoing angle of "f". Because the ray of incident light Li is received on the incident plane 121B formed in a flat surface shape, the Fresnel lens 121 has a special feature in that the ray of incident light Li is received in the Fresnel lens 121 at a high light-receiving efficiency.

In cases where the incident angle of a ray of incident light becomes smaller, the transmissivity of the incident plane is heightened, and the reflectivity of the incident plane is lowered. In contrast, in cases where the incident angle of a ray of light becomes larger, the transmissivity of the incident plane is lowered, and the reflectivity of the incident plane is heightened. This phenomenon is well-known as an optical theory. Accordingly, as shown in FIG. 3B, when the incident angle "a" of a ray of light becomes larger, a ratio of the ray of transmitted light Lt to the ray of incident light Li is decreased, and a ratio of the ray of reflected light Lr to the ray of incident light Li is increased. Therefore, the transmissivity of the Fresnel lens 121 is undesirably lowered.

In short, the transmissivity of the Fresnel lens 121 depends on the incident angle. The larger the incident angle "a", the more the transmissivity is lowered. Also, in cases where the Fresnel lens 121 is applied to a screen of which the size is predetermined, the thinning of the image displaying device is undesirably restricted due to the limitation of the maximum incident angle.

In another type of Fresnel lens having the refraction type prism portion, as is described below, the structure on the incident side of the refraction type prism portion 121A shown in FIG. 3A and FIG. 3B is changed to that on an outgoing side, and the structure on the outgoing side of the refraction type prism portion 121A shown in FIG. 3A and FIG. 3B is changed to that on an incident side.

FIG. 4A and FIG. 4B are enlarged views respectively showing the sectional shape of a plurality of prism portions arranged in a plurality of pitch areas of another type conventional Fresnel lens, FIG. 4A shows the sectional shape in case of a small incident angle, and FIG. 4B shows the sectional shape in case of a large incident angle. An arrow in each of FIG. 4A and FIG. 4B indicates a ray of light.

In FIG. 4A and FIG. 4B, 131 indicates a Fresnel lens. 131A indicates a refraction type prism portion formed for each pitch area of the Fresnel lens 131.

131B indicates an incident plane of each refraction type prism portion 131A. 131C indicates an outgoing plane of each refraction type prism portion 131A. 131Z indicates an ineffective plane of each refraction type prism portion 131A. Each refraction type prism portion 131A is shaped by the incident plane 131B, the outgoing plane 131C and the ineffective plane 131Z. The incident plane 131B is formed in a flat surface shape and is perpendicular to an optical axis (not shown) of the Fresnel lens 131. Though rays of light are received on the ineffective plane 131Z, the ineffective plane 131Z does not participate in the going-out of a ray of light from the outgoing plane 131C.

Also, Li indicates a ray of light incident on the incident plane 131B. Lr indicates a ray of light reflected on the incident plane 131B. Lt indicates a ray of transmitted light refracted on the incident plane 131B and transmitted through the internal of the refraction type prism portion 131A. Lo indicates a ray of outgoing light refracted on the outgoing plane 131C and going out to the air. Le indicates a ray of ineffective light received on the ineffective plane 131Z. m14 indicates a normal of the outgoing plane 131C, and m15 indicates a normal of the incident plane 131B.

Next, an operation will be described below.

In FIG. 4A, when a ray of incident light Li transmitted through the air having a refractive index of unity comes on the Fresnel lens 131 having a refractive index of n (n>1) at an incident angle of "a" to the normal m14, the ray of incident light Li is incident on the incident plane 131B at a real incident angle of "b" to the normal m15, and the ray of incident light Li is divided on the incident plane 131B into a ray of transmitted light Lt transmitted at a refraction angle of χ and a ray of reflected light Lr transmitted at a reflection angle of "b". The ray of reflected light Lr causes a loss to the Fresnel lens 131.

The ray of transmitted light Lt refracted on the incident plane 131B and transmitted through the refraction type prism portion 131A makes an angle of φ to the normal m14 and reaches the outgoing plane 131C. A part of the ray of transmitted light Lt is changed to a ray of reflected light (not shown), and the remaining part of the ray of transmitted light Lt crosses the outgoing plane 131C and goes out as a ray of outgoing light Lo at an outgoing angle of "f".

Also, because the ray of ineffective light Le received on the ineffective plane 131Z goes out from the outgoing plane 131C at an angle different from the outgoing angle of "f", the ray of ineffective light Le causes a loss to the Fresnel lens 131.

As is described above, the ray of incident light Li incident on the Fresnel lens 131 at the incident angle of "a" makes a turn in the Fresnel lens 131 to a direction of the outgoing angle of "f". Because the Fresnel lens 131 has the outgoing plane 131C formed in a flat surface shape, in cases where the Fresnel lens 131 is applied to a screen, the Fresnel lens 131 has a special feature in that a lenticular can be integrally formed with the outgoing plane 131C.

However, for the same reason as that in the Fresnel lens 121, as shown in FIG. 4B, in cases where the incident angle of "a" becomes larger, a ratio of the ray of reflected light Lr to the ray of incident light Li is undesirably increased, and an area (an area of slash marks in each of FIG. 4A and FIG. 4B) of the ray of ineffective light received on the ineffective plane 131Z is undesirably enlarged.

Therefore, in the same manner as in the Fresnel lens 121, the transmissivity of the Fresnel lens 131 depends on the incident angle. And, the larger the incident angle, the more the transmissivity is lowered.

As is described above, in cases where the incident angle in the Fresnel lens 131 having the refraction type prism portions is increased, the transmissivity of the Fresnel lens 131 is undesirably lowered. Also, in cases where the Fresnel lens 131 is applied to a screen of which the size is predetermined, the thinning of the image displaying device is undesirably restricted due to the lowering of the transmissivity of the Fresnel lens 131.

To remedy the above-described defects in the conventional Fresnel lens having the refraction type prism portions and to obtain a high transmissivity of the Fresnel lens in case of a large incident angle, another conventional Fresnel lens will be described below.

FIG. 5A and FIG. 5B are enlarged views respectively showing the sectional shape of a plurality of prism portions arranged in a plurality of pitch areas of another type conventional Fresnel lens, FIG. 5A shows the sectional shape in case of a large incident angle, and FIG. 5B shows the sectional shape in case of a small incident angle. Each arrow in FIG. 5A and FIG. 5B indicates a ray of light.

In FIG. 5A and FIG. 5B, 141 indicates a Fresnel lens. 141A indicates a total reflection type prism portion formed for each pitch area of the Fresnel lens 141.

141B indicates an incident plane of each total reflection type prism portion 141A. 141C indicates a total reflection plane of each total reflection type prism portion 141A. 141D indicates an outgoing plane of each total reflection type prism portion 141A. Each total reflection type prism portion 141A is shaped by the incident plane 141B, the total reflection plane 141C and the outgoing plane 141D. The outgoing plane 141D is formed in a flat surface shape and is perpendicular to an optical axis (not shown) of the Fresnel lens 141. In a case where a ray of light transmitted through a high refractive index type medium is incident on a plane between the high refractive index type medium and a low refractive index type medium at a large incident angle larger than a critical angle, the ray of light is totally reflected on the plane. This phenomenon is used in the reflection performed on the total reflection plane 141C.

Also, Li indicates a ray of light incident on the incident plane 141B. Lt1 indicates a ray of transmitted light refracted on the incident plane 141B and transmitted through the total reflection plane 141C. Lt2 indicates a ray of transmitted light totally reflected on the total reflection plane 141C and transmitted to the outgoing plane 141D. Lo indicates a ray of outgoing light refracted on the outgoing plane 141D and going out to the air. Le indicates a ray of ineffective light received on the incident plane 141B. m16 indicates a normal of the outgoing plane 141D, m17 indicates a normal of the incident plane 141B, and m18 indicates a normal of the total reflection plane 141C.

Next, an operation will be described below.

In FIG. 5A, when a ray of incident light Li transmitted through the air having a refractive index of unity comes on the Fresnel lens 141 having a refractive index of n (n>1) at an incident angle of "a" to the normal m16, the ray of incident light Li is incident on the incident plane 141B at a real incident angle of "b" to the normal m17, and the ray of incident light Li is divided on the incident plane 141B into a ray of transmitted light Lt1 transmitted at a refraction angle of $\chi$ and a ray of reflected light (not shown). The ray of reflected light generated on the incident plane 141B causes a loss to the Fresnel lens 141.

The ray of transmitted light Lt1 refracted on the incident plane 141B and transmitted through the total reflection type prism portion 141A reaches the total reflection plane 141C at an angle which is made to the normal m18 and is larger than the critical angle, the ray of transmitted light Lt1 is totally reflected on the total reflection plane 141C, and the ray of transmitted light Lt1 totally reflected is transmitted as the ray of transmitted light Lt2. Because an optical path of the ray of transmitted light Lt1 is bent by using the phenomenon of the total reflection, no ray of light is transmitted through or goes out from the total reflection plane 141C. Therefore, loss in the transmitted light Lt1 is hardly generated on the total reflection plane 141C.

The ray of transmitted light Lt2 totally reflected on the total reflection plane 141C is transmitted at an angle of $\phi$ to the normal m16 and reaches the outgoing plane 141D. A part of the ray of transmitted light Lt2 is changed to a ray of reflected light (not shown), and the remaining part of the ray of transmitted light Lt2 is transmitted through the outgoing plane 141D and goes out as a ray of outgoing light Lo at an outgoing angle of "f" (0 degree in FIG. 5A).

Because an optical path is bent in each of the Fresnel lens 121 having the refraction type prism portions 121A and the Fresnel lens 131 having the refraction type prism portions 131A according to the refraction phenomenon, it is required that the ray of incident light Li is received in each of the Fresnel lenses 121 and 131 at a large real incident angle of "a" or "b" to bend the optical path to a considerable degree. Therefore, a ratio of the ray of reflected light Lr to the ray of incident light Li on each of the incident planes 121B and 131B is increased, and the transmissivity of each of the Fresnel lenses 121 and 131 for the ray of incident light Li is undesirably decreased.

In contrast, in the Fresnel lens 141 having the total reflection type prism portions 141A, because the optical path is bent according to the total reflection phenomenon, a degree of the bending of the optical path based on the refraction phenomenon can be reduced. Therefore, the ray of incident light Li can be incident on the incident plane 141B at a small real incident angle of "b", the increase of the reflectivity of the Fresnel lens 141 can be suppressed, and high transmissivity of the Fresnel lens 141 can be obtained.

As is described above, differently from the Fresnel lenses 121 and 131, high transmissivity can be obtained for the large incident angle in the Fresnel lens 141 having the total reflection type prism portions 141A.

However, as shown in FIG. 5B, in cases where the incident angle of "a" is decreased in the Fresnel lens 141, the ray of incident light Li received on the incident plane 141B is decreased, a ratio of the rays of transmitted light Lt2 totally reflected on the total reflection plane 141C to the rays of incident light Li is decreased, and rays of ineffective light Le (placed in an area of slash marks in FIG. 5B) are inevitably generated.

Though each ray of ineffective light Le is transmitted through the inside of the total reflection type prism portion 141A, the total reflection of the ray of ineffective light Le on the total reflection plane 141C is not performed. Therefore, the rays of ineffective light Le cause a loss to the Fresnel lens 141. In other words, the transmissivity of the Fresnel lens 141 for the rays of incident light Li depends on the incident angle. Therefore, though the transmissivity of the Fresnel lens 141 for the high incident angle of "a" can be heightened, the transmissivity of the Fresnel lens 141 for the low incident angle of "a" is undesirably decreased.

Because each conventional Fresnel lens has the above-described configuration, a problem has arisen that the transmissivity of the conventional Fresnel lens for the rays of incident light Li considerably depends on the incident angle.

Therefore, in each conventional Fresnel lens, a part of image light projected on a screen on a slant at an angle larger than a maximum projection angle cannot be deflected to a desired direction, and the transmissivity of the conventional Fresnel lens for the rays of incident light Li is low.

Here, a conventional Fresnel lens will be briefly described below once more.

FIG. 6 is a view, partially in cross-section, of a conventional Fresnel lens on which image light is projected on a slant.

In FIG. 6, 100 indicates a conventional Fresnel lens in which a plurality of refraction type prism portions are arranged in a plurality of pitch areas. 100a indicates an incident plane disposed on a light incident side of the Fresnel lens 100. 100b indicates an ineffective plane disposed on a light incident side of the Fresnel lens 100. 100c indicates an outgoing plane disposed on a light outgoing side of the Fresnel lens 100. R1in indicates a light flux incident on the incident plane 100a. R2in indicates a light flux incident on the ineffective plane 100b.

The Fresnel lens 100 shown in FIG. 6 has a plurality of very small refraction type prism portions each of which denotes a unit of prism portion. In each refraction type prism portion, a light flux R1in incident on the incident plane 100a on a slant is deflected and goes out as a light flux R1out through the outgoing plane 100c.

However, a light flux R2i incident on the ineffective plane 100b different from the incident plane 100a does not go out in a desired direction but goes out as stray light. Therefore, the light flux R2i cannot be effectively used, and the transmissivity of the Fresnel lens 100 is low.

A Fresnel lens having a plurality of total reflection type prism portions is proposed as a means for solving the above-described problem, and rays of light are deflected in the Fresnel lens according to the total reflection.

For example, a Fresnel lens having a plurality of refraction type prism portions and a plurality of total reflection type prism portions alternately disposed is proposed in Published Unexamined Japanese Patent Application No. 52601 of 1986. Also, a Fresnel lens having a plurality of prism portions is proposed in Published Unexamined Japanese Patent Application No. 19837 of 1987, and are fraction using portion and a total reflection using portion are disposed in each prism portion.

However, in the Fresnel lens disclosed in the Published Unexamined Japanese Patent Application No. 52601 of 1986, a refraction type prism portion additionally exists in an area in which the refraction type prism portion does not effectively function, and a total reflection type prism portion additionally exists in an area in which the total reflection type prism portion does not effectively function. Therefore, a problem has arisen that a large amount of light does not still go out in a desired direction.

In contrast, in the Fresnel lens disclosed in the Published Unexamined Japanese Patent Application No. 19837 of 1987, the shape of the Fresnel lens in section is formed in a polygonal shape. Therefore, in cases where a lens forming mold used to form the Fresnel lens is manufactured, a cutting tool having a specific shape is required, and it is difficult to manufacture the lens forming mold. In its turn, it is difficult to manufacture the Fresnel lens.

Also, in cases where each conventional Fresnel lens is applied to a rear projection type screen, a problem has arisen that the brightness of an image displayed on the screen is not uniformly set.

In detail, in cases where a Fresnel lens having refraction type prism portions is applied to the screen, the Fresnel lens cannot effectively function in case of a large projection angle. Therefore, the brightness of an image displayed in a peripheral area of the screen is undesirably lowered, and the thinning of the image displaying device is restricted.

Also, in cases where a Fresnel lens having total reflection type prism portions is applied to the screen, the Fresnel lens cannot effectively function in case of a small projection angle. Therefore, the brightness of an image in an area of the screen placed in the neighborhood of an optical axis is undesirably lowered.

The present invention is provided to solve the above-described problems, and the object of the present invention is to provide a Fresnel lens in which the dependence of transmissivity on an incident angle is lowered.

Also, the present invention is to provide a screen, in which unevenness of the brightness of an image is suppressed in a range from a small projection angle to a large projection angle, and to provide an image displaying device to which the screen is applied.

In addition, the present invention is to provide a lens forming mold manufacturing method, in which a lens forming mold of the Fresnel lens is manufactured, and a lens manufacturing method using the lens forming mold manufacturing method.

DISCLOSURE OF THE INVENTION

A Fresnel lens according to the present invention includes a pitch area having a hybrid type prism portion which has both a refraction type prism portion for making a ray of first incident light having a prescribed incident angle go out according to a first refraction phenomenon and a second refraction phenomenon as a ray of first outgoing light having a prescribed outgoing angle and a total reflection prism portion for making a ray of second incident light having the prescribed incident angle go out according to a third refraction phenomenon, a total reflection phenomenon and a fourth refraction phenomenon as a ray of second outgoing light parallel to the ray of first outgoing light.

Therefore, a Fresnel lens having high transmissivity can be obtained while lowering the dependence of transmissivity on an incident angle.

A Fresnel lens according to the present invention further includes another pitch area having the hybrid type prism portion or a plurality of other pitch areas having the hybrid type prism portions respectively, and a ratio of an area occupied by the refraction type prism portion to an area occupied by the hybrid type prism portion in each pitch area differs from ratios in the other pitch areas.

Therefore, the transmissivity in the Fresnel lens can be improved.

A Fresnel lens according to the present invention includes a plurality of pitch areas respectively having a hybrid type prism portion which has both a refraction type prism portion and a total reflection prism portion integrally formed with each other. The refraction type prism portion of each pitch area has a sectional shape formed by a first incident plane for changing a ray of first incident light incident at a prescribed incident angle to a ray of first transmitted light according to a first refraction phenomenon, a plane-shaped outgoing plane for changing the ray of first transmitted light obtained on the first incident plane to a ray of first outgoing light having a prescribed outgoing angle according to a second refraction phenomenon, and an ineffective plane connecting with the first incident plane and an adjacent pitch area. The total reflection type prism portion of each pitch area has a sectional shape formed by a second incident plane for changing a ray of second incident light incident at the prescribed incident angle to a ray of second transmitted light according to a third refraction phenomenon, a total reflection plane for changing the ray of second transmitted light obtained on the second incident plane to a ray of third transmitted light parallel to the ray of first transmitted light according to a total reflection phenomenon, and the outgoing plane of the refraction type prism portion. The ray of third transmitted light obtained in the total reflection plane is changed to a ray of second outgoing light having the prescribed outgoing angle according to a fourth refraction phenomenon on the outgoing plane, and a portion of the ray of second incident light not changed to the ray of third transmitted light is received as the ray of first incident light.

Therefore, a Fresnel lens having high transmissivity can be obtained while lowering the dependence of transmissivity on an incident angle.

In the Fresnel lens according to the present invention, the second incident plane of each pitch area is formed in a sectional shape so as to make the second incident plane conceal the ineffective plane of the hybrid type prism portion arranged in an adjacent pitch from a view seen in a direction of a ray of ineffective light incident on the ineffective plane, and the total reflection plane of each pitch area is formed in a second incident plane compensating shape so as to compensate for the sectional shape of the second incident plane.

Therefore, a light receiving efficiency of the Fresnel lens can be heightened while decreasing an ineffective area.

In the Fresnel lens according to the present invention, a small incident angle region is determined according to a characteristic changing angle at which transmissivity of the hybrid type prism portion is equal to that of the refraction type prism portion, and the refraction type prism portion is arranged in each of pitch areas placed in the small incident angle region.

Therefore, characteristics of transmissivity in the small incident angle region can be improved.

In the Fresnel lens according to the present invention, a small incident angle region is determined according to a characteristic changing angle at which transmissivity of the hybrid type prism portion is equal to that of the refraction type prism portion, and the refraction type prism portion is arranged in each of pitch areas placed in the small incident angle region.

Therefore, characteristics of transmissivity in the small incident angle region can be improved.

In the Fresnel lens according to the present invention, a mixing ratio of the refraction type prism portion to the hybrid type prism portion is increased with the decrease of the incident angle in each of pitch areas corresponding to a characteristic changing region neighboring to the characteristic changing angle.

Therefore, characteristics of transmissivity in the small incident angle region can be improved, and the transmissivity in the characteristic changing region neighboring to the characteristic changing angle can be smoothly changed.

In the Fresnel lens according to the present invention, a mixing ratio of the refraction type prism portion to the hybrid type prism portion is increased with the decrease of the incident angle in each of pitch areas corresponding to a characteristic changing region neighboring to the characteristic changing angle.

Therefore, characteristics of transmissivity in the small incident angle region can be improved, and the transmissivity in the characteristic changing region neighboring to the characteristic changing angle can be smoothly changed.

In the Fresnel lens according to the present invention, an intermediary prism portion is arranged as one hybrid type prism portion in each of pitch areas corresponding to a characteristic changing region neighboring to the characteristic changing angle, an area of the second incident plane of the intermediary prism portion is slightly decreased with the decrease of the incident angle, and an area of the first incident plane of the intermediary prism portion is slightly increased with the decrease of the incident angle.

Therefore, characteristics of transmissivity in the small incident angle region can be improved, and a change of the transmissivity at the characteristic changing angle can be smoothed.

In the Fresnel lens according to the present invention, an intermediary prism portion is arranged as one hybrid type prism portion in each of pitch areas corresponding to a characteristic changing region neighboring to the characteristic changing angle, an area of the second incident plane of the intermediary prism portion is slightly decreased with the decrease of the incident angle, and an area of the first incident plane of the intermediary prism portion is slightly increased with the decrease of the incident angle.

Therefore, characteristics of transmissivity in the small incident angle region can be improved, and a change of the transmissivity at the characteristic changing angle can be smoothed.

In the Fresnel lens according to the present invention, a top blade angle between the second incident plane and the total reflection plane is set to a most-acute angle in a range in which an angle between the second incident plane and the outgoing plane is not obtuse.

Therefore, transmissivity of the Fresnel lens can be further improved.

In the Fresnel lens according to the present invention, the top blade angle is set to an angle larger than the most-acute angle in a small incident angle region corresponding to incident angles smaller than a specific incident angle at which transmissivity corresponding to the top blade angle set to the most-acute angle is equal to transmissivity corresponding to the top blade angle different from the most-acute angle.

Therefore, a Fresnel lens having high transmissivity at all incident angles can be obtained.

In the Fresnel lens according to the present invention, the prescribed outgoing angle is set to a value larger than zero degree in each of pitch areas corresponding to incident angles at which transmissivity of the hybrid type prism portions is decreased.

Therefore, transmissivity of the Fresnel lens can be further improved.

In the Fresnel lens according to the present invention, the Fresnel lens is cut in a rectangular shape so as to have four sides, a boundary ring band of the Fresnel lens intersects only one side nearest to an optical axis among the four sides of the Fresnel lens, the outgoing angle is set so as to make the ray of first outgoing light and the ray of second outgoing light going out on a lens periphery side of the boundary ring band be parallel to the optical axis, and the outgoing angle of the ray of first outgoing light and the ray of second outgoing light going out on an optical axis side of the boundary ring band is set to a value larger than that corresponding to the ray of first outgoing light and the ray of second outgoing light going out in parallel to the optical axis.

Therefore, in cases where the Fresnel lens is applied to a screen of an image displaying device having a multiple-structure, the uniformity of luminance on the screen can be improved.

In the Fresnel lens according to the present invention, each refraction type prism portion has a thin-film light absorbing layer on the ineffective layer, and the thin-film light absorbing layer absorbs light.

Therefore, a ray of ineffective light expected to be received on the ineffective plane and be changed to stray light in the inside of the Fresnel lens can be absorbed in the thin-film light absorbing layer, and ghosts generated on the screen can be reduced.

The Fresnel lens according to the present invention further includes a stray light absorbing plate which is arranged on the outgoing plane and has a plurality of light transmitting layers and a plurality of light absorbing layers alternately layered almost in parallel to an optical axis of the Fresnel lens. A ray of light is transmitted through each light transmitting layer, and light is absorbed in each light absorbing layer.

Therefore, stray light generated in the inside of the Fresnel lens can be absorbed, and ghosts generated on the screen can be reduced.

In the Fresnel lens according to the present invention, the stray light absorbing plate arranged on the outgoing plane is integrally formed with the Fresnel lens.

Therefore, the ghosts can be reduced by using a small number of constituent parts.

In the Fresnel lens according to the present invention, the light transmitting layers and the light absorbing layers are layered in a concentric circular shape while centering around the optical axis of the Fresnel lens.

Therefore, a reduction efficiency of the ghosts can be maximized.

In the Fresnel lens according to the present invention, the light transmitting layers and the light absorbing layers are layered in a direction almost in parallel to each other.

Therefore, the stray light absorbing plate can be easily manufactured, and a manufacturing cost can be reduced.

The Fresnel lens according to the present invention further includes a light absorbing plate, arranged on the outgoing layer, for absorbing light.

Therefore, stray light can be absorbed by using a simple structure, and ghosts generated on a screen can be reduced.

In the Fresnel lens according to the present invention, the hybrid type prism portions are formed while having a pitch margin between each pair of pitch areas adjacent to each other.

Therefore, the total reflection plane can be formed in a shape determined in the designing, and the optical performance of the Fresnel lens can be guaranteed.

The Fresnel lens according to the present invention further includes a group of pitch areas in which a plurality of dummy prism portions are successively arranged. A height of each dummy prism portion in an optical axis direction is set not to have relation to the reception of light.

Therefore, a rapid disappearance and occurrence of a manufacturing error occurring by the change of the shape of the prism portion can be suppressed, and a rapid change of the optical performance such as transmissivity can be relieved.

A screen according to the present invention, includes the Fresnel lens according to the claim 1, and an image forming and diffusing means for receiving the ray of outgoing light, to which display contents are added, from the Fresnel lens, forming an image from the ray of outgoing light and diffusing the image.

Therefore, unevenness of the brightness of an image can be suppressed, and a screen applicable in a range from a small projection angle to a large projection angle can be obtained.

A screen according to the present invention, includes the Fresnel lens according to the claim 3, and an image forming and diffusing means for receiving the ray of outgoing light, to which display contents are added, from the Fresnel lens, forming an image from the ray of outgoing light and diffusing the image.

Therefore, unevenness of the brightness of an image can be suppressed, and a screen applicable in a range from a small projection angle to a large projection angle can be obtained.

In the screen according to the present invention, the image forming and diffusing means is arranged on the outgoing plane to be integrally formed with the Fresnel lens.

Therefore, a screen manufactured by using a reduced number of constituent parts can be provided.

In the screen according to the present invention, the image forming and diffusing means is arranged on the outgoing plane to be integrally formed with the Fresnel lens.

Therefore, a screen manufactured by using a reduced number of constituent parts can be provided.

An image displaying device according to the present invention includes the screen according to the claim 23, illumination light source means for emitting a plurality of rays of light almost parallel to each other, converging optics means for converging the rays of light emitted from the illumination light source means, optical modulating means for spatially changing intensities of the rays of light converged by the converging optics means so as to modulate the rays of light according to the display contents, and projection optics means for projecting the rays of light modulated by the optical modulating means onto the screen.

Therefore, an image displaying device having an improved brightness of an image can be obtained.

An image displaying device according to the present invention includes the screen according to the claim 24, illumination light source means for emitting a plurality of rays of light almost parallel to each other, converging optics means for converging the rays of light emitted from the illumination light source means, optical modulating means for spatially changing intensities of the rays of light converged by the converging optics means so as to modulate the rays of light according to the display contents, and projection optics means for projecting the rays of light modulated by the optical modulating means onto the screen.

Therefore, an image displaying device having an improved brightness of an image can be obtained.

A Fresnel lens according to the present invention includes a plurality of total reflection type prism portions which respectively have a subsidiary unit-prism portion in a part of a second incident plane on which a ray of light expected not to be totally reflected on a total reflection plane is incident. A refraction type prism portion having a first incident plane on which the ray of incident light is refracted to be deflected in a desired direction is set as the subsidiary unit-prism portion.

Therefore, the subsidiary unit-prism portion functions as a lens for a ray of light for which the total reflection type prism portion does not effectively function, and the transmissivity of the Fresnel lens can be improved.

In the Fresnel lens according to the present invention, a plane obtained by extending the first incident plane of each subsidiary unit-prism portion is placed in a position shifted from the total reflection plane toward a light outgoing side in a range of the corresponding total reflection type prism portion.

Therefore, a Fresnel lens possible to be easily manufactured can be provided.

In the Fresnel lens according to the present invention, a ratio of each subsidiary unit-prism portion to the corresponding second incident plane differs from those of the other subsidiary unit-prism portions.

Therefore, each subsidiary unit-prism portion can be formed in an optimum shape in correspondence to an incident angle of a light flux, and a Fresnel lens having high transmissivity can be obtained.

In the Fresnel lens according to the present invention, a ratio of each subsidiary unit-prism portion to the corresponding second incident plane differs from those of the other subsidiary unit-prism portions.

Therefore, each subsidiary unit-prism portion can be formed in an optimum shape in correspondence to an incident angle of a light flux, and a Fresnel lens having high transmissivity can be obtained.

A Fresnel lens according to the present invention, includes a plurality of refraction type prism portions which respectively have a subsidiary unit-prism portion, in which a ray of light expected to be incident on an ineffective plane of another adjacent refraction type prism portion placed on a Fresnel periphery side is received, on a first incident plane. A total reflection type prism portion has both a second incident plane, on which a ray of light is received, and a total reflection plane, on which the ray of light received on the second incident plane is totally reflected to be deflected in a desired direction, and is set as the subsidiary unit-prism portion.

Therefore, the subsidiary unit-prism portion functions as a lens for a ray of light for which the refractive type prism portion does not effectively function, and the transmissivity of the Fresnel lens can be improved.

In the Fresnel lens according to the present invention, a plane obtained by extending the second incident plane of each subsidiary unit-prism portion is placed in a position shifted from the ineffective plane toward a light outgoing side in a range of the corresponding refraction type prism portion.

Therefore, a Fresnel lens possible to be easily manufactured can be provided.

In the Fresnel lens according to the present invention, a ratio of each subsidiary unit-prism portion to the corresponding first incident plane differs from those of the other subsidiary unit-prism portions.

Therefore, each subsidiary unit-prism portion can be formed in an optimum shape in correspondence to an incident angle of a light flux, and a Fresnel lens having high transmissivity can be obtained.

In the Fresnel lens according to the present invention, a ratio of each subsidiary unit-prism portion to the corresponding first incident plane differs from those of the other subsidiary unit-prism portions.

Therefore, each subsidiary unit-prism portion can be formed in an optimum shape in correspondence to an incident angle of a light flux, and a Fresnel lens having high transmissivity can be obtained.

A Fresnel lens according to the present invention, includes a first region in which the Fresnel lens according to the claim 29 is arranged, and a second region in which a plurality of refraction type prism portions respectively having both a first incident plane, on which a ray of incident light is refracted to be deflected in a desired direction, and an ineffective plane different from the first incident plane are arranged on a light incident side, wherein each refraction type prism portion has a subsidiary unit-prism portion arranged on the first incident plane, a ray of light expected to be incident on the ineffective plane of another adjacent refraction type prism portion placed on a Fresnel periphery side is received in the subsidiary unit-prism portion, and the subsidiary unit-prism portion functions as a total reflection type prism portion having both a second incident plane, on which a ray of light is received, and a total reflection plane on which the ray of light received on the second incident plane is totally reflected to be deflected in the desired direction.

Therefore, an optimum shape of each unit-prism portion can be selected from the first region or the second region in correspondence to an incident angle of a light flux and be formed, and a Fresnel lens having high transmissivity can be obtained.

In the Fresnel lens according to the present invention, a ratio of the subsidiary unit-prism portion to the corresponding second incident plane in the first region is increased as the subsidiary unit-prism portion approaches a boundary between the first region and the second region, the ratio of the subsidiary unit-prism portion to the corresponding second incident plane in the first region is decreased as the subsidiary unit-prism portion is far away from the boundary, a ratio of the subsidiary unit-prism portion to the corresponding first incident plane in the second region is increased as the subsidiary unit-prism portion approaches the boundary, and the ratio of the subsidiary unit-prism portion to the corresponding first incident plane in the second region is decreased as the subsidiary unit-prism portion is far away from the boundary.

Therefore, the ratios of the subsidiary unit-prism portion are increased as the subsidiary unit-prism portion approaches the boundary in which the subsidiary unit-prism portion effectively functions, and a Fresnel lens having high transmissivity can be obtained.

In the Fresnel lens according to the present invention, a second Fresnel lens different from the Fresnel lens arranged on a plane of the light incident side is arranged on a plane of a light outgoing side of the Fresnel lens.

Therefore, the Fresnel lens arranged on the light incident side and the Fresnel lens arranged on the light outgoing side are cooperated, and a Fresnel lens having transmissivity further heightened can be obtained.

In the Fresnel lens according to the present invention, a second Fresnel lens different from the Fresnel lens arranged on a plane of a light incident side is arranged on a plane of a light outgoing side of the Fresnel lens.

Therefore, the Fresnel lens arranged on the light incident side and the Fresnel lens arranged on the light outgoing side are cooperated, and a Fresnel lens having transmissivity further heightened can be obtained.

A screen according to the present invention, includes the Fresnel lens according to the claim 29, and light diffusing means, arranged on a plane of a light outgoing side of the Fresnel lens, for diffusing the rays of light going out from the Fresnel lens.

Therefore, a screen applicable in a range from a small projection angle to a large projection angle can be obtained while decreasing the number of constituent parts and suppressing unevenness of the brightness of an image.

A screen according to the present invention, includes the Fresnel lens according to the claim 33, and light diffusing means, arranged on a plane of a light outgoing side of the Fresnel lens, for diffusing the rays of light going out from the Fresnel lens.

Therefore, a screen applicable in a range from a small projection angle to a large projection angle can be obtained while decreasing the number of constituent parts and suppressing unevenness of the brightness of an image.

A screen according to the present invention, includes the Fresnel lens according to the claim 39, and light diffusing means, arranged on a light outgoing side of the Fresnel lens, for diffusing the rays of light going out from the Fresnel lens.

Therefore, a screen applicable in a range from a small projection angle to a large projection angle can be obtained while suppressing unevenness of the brightness of an image.

A screen according to the present invention, includes the Fresnel lens according to the claim 40, and light diffusing means, arranged on a light outgoing side of the Fresnel lens, for diffusing the rays of light going out from the Fresnel lens.

Therefore, a screen applicable in a range from a small projection angle to a large projection angle can be obtained while suppressing unevenness of the brightness of an image.

An image displaying device according to the present invention, includes the screen according to the claim 41, an image light source for emitting a plurality of rays of image light, and projection optics means for projecting the rays of image light emitted from the image light source onto the screen.

Therefore, an image displaying device displaying an image of an improved brightness can be provided.

An image displaying device according to the present invention, includes the screen according to the claim 42 an image light source for emitting a plurality of rays of image light, and projection optics means for projecting the rays of image light emitted from the image light source onto the screen.

Therefore, an image displaying device displaying an image of an improved brightness can be provided.

An image displaying device according to the present invention, includes the screen according to the claim 43 an image light source for emitting a plurality of rays of image light, and projection optics means for projecting the rays of image light emitted from the image light source onto the screen.

Therefore, an image displaying device displaying an image of an improved brightness can be provided.

An image displaying device according to the present invention, includes the screen according to the claim 44 an image light source for emitting a plurality of rays of image light, and projection optics means for projecting the rays of image light emitted from the image light source onto the screen.

Therefore, an image displaying device displaying an image of an improved brightness can be provided.

A method of manufacturing a lens forming mold according to the present invention, includes a main unit-prism portion cutting step of cutting a lens forming mold in a reversed shape of a refractive type prism portion of a cutting pitch area by using a cutting tool, and a subordinate unit-prism portion cutting step of cutting the lens forming mold in a reversed shape of a total reflection type prism portion of the cutting pitch area by using the cutting tool on condition that a plane obtained by extending an incident plane in the reversed shape of the total reflection type prism portion intersects a trough line placed between the cutting pitch area and another cutting area adjacent to the cutting pitch area on a Fresnel center side or pass through an area shifted from the trough line toward a light outgoing side. The combination of the main unit-prism portion cutting step and the subordinate unit-prism portion cutting step is repeatedly performed by a prescribed number equal to the number of cutting pitch areas.

Therefore, a lens forming mold can be easily manufactured by using a normal cutting tool, and the precision in the manufacturing of the lens forming mold can be improved.

A method of manufacturing a lens forming mold according to the present invention, includes a main unit-prism portion cutting step of cutting a lens forming mold in a reversed shape of a total reflection type prism portion of a cutting pitch area by using a cutting tool, and a subordinate unit-prism portion cutting step of cutting the lens forming mold in a reversed shape of a refractive type prism portion of the cutting pitch area by using the cutting tool on condition that a plane obtained by extending a first incident plane in the reversed shape of the refractive type prism portion intersects a trough line placed between the cutting pitch area and another cutting area adjacent to the cutting pitch area on a Fresnel periphery side or pass through an area shifted from the trough line toward a light outgoing side, wherein the combination of the main unit-prism portion cutting step and the subordinate unit-prism portion cutting step is repeatedly performed by a prescribed number equal to the number of cutting pitch areas.

Therefore, a lens forming mold can be easily manufactured by using a normal cutting tool, and the precision in the manufacturing of the lens forming mold can be improved.

The method of manufacturing a lens forming mold according to the present invention, further includes a pitch margin setting step for setting a pitch margin for each cutting pitch area before the subordinate unit-prism portion cutting step in cases where the lens forming mold is cut in a cut performing direction from the Fresnel periphery side to a Fresnel center side in the order of the refractive type prism portion and the total reflection type prism portion. The lens forming mold is cut by shifting a cutting start position toward the cut performing direction by the pitch margin to form a reversed shape of the total reflection type prism portion in the subordinate unit-prism portion cutting step for each cutting pitch area.

Therefore, in cases where the lens forming mold is cut in the reversed shape of the refractive type prism portion, the distortion of the lens forming mold occurring in a tip portion on the trough line placed between the total reflection type prism portions for each pitch area can be prevented, the lens forming mold can be formed in a shape determined in the designing, and the optical performance of the Fresnel lens manufactured by using the lens forming mold can be guaranteed.

The method of manufacturing a lens forming mold according to the present invention, further includes a pitch margin setting step for setting a pitch margin for each cutting pitch area before the subordinate unit-prism portion cutting step in cases where the lens forming mold is cut in a cut performing direction from a Fresnel center side to the Fresnel periphery side in the order of the total reflection type prism portion and the refractive type prism portion, wherein the lens forming mold is cut by shifting a cutting start position toward the cut performing direction by the pitch margin to form the reversed shape of the refractive type prism portion in the subordinate unit-prism portion cutting step for each cutting pitch area.

Therefore, in cases where the lens forming mold is cut in the reversed shape of the total reflection type prism portion, the distortion of the lens forming mold occurring in a tip portion on the trough line placed between the refractive type prism portions for each pitch area can be prevented, the lens forming mold can be formed in a shape determined in the designing, and the optical performance of the Fresnel lens manufactured by using the lens forming mold can be guaranteed.

A method of manufacturing a lens forming mold according to the present invention, further includes the step of successively cutting the lens forming mold in a reversed shape of a plurality of dummy prism portions respectively having a height in an optical axis direction not related to the reception of light for a group of pitch areas.

Therefore, a rapid disappearance and occurrence of a manufacturing error occurring by the change of the shape of the prism portion can be suppressed, and a rapid change of the optical performance such as transmissivity in a Fresnel lens can be relieved.

A method of manufacturing a lens according to the present invention, includes the steps of pouring resin into a lens forming mold manufactured in the method of manufacturing a lens forming mold according to claim 49, hardening the resin, and taking off the lens forming mold from the hardened resin to form a lens.

Therefore, a Fresnel lens having high precision can be easily manufactured.

A method of manufacturing a lens according to the present invention, includes the steps of pouring resin into a lens forming mold manufactured in the method of manufacturing a lens forming mold according to claim 50, hardening the resin, and taking off the lens forming mold from the hardened resin to form a lens.

Therefore, a Fresnel lens having high precision can be easily manufactured.

A method of manufacturing a lens according to the present invention, includes the steps of pouring resin into a lens forming mold manufactured in the method of manufacturing a lens forming mold according to claim 51, hardening the resin, and taking off the lens forming mold from the hardened resin to form a lens.

Therefore, a Fresnel lens having high precision can be easily manufactured.

A method of manufacturing a lens according to the present invention, includes the steps of pouring resin into a lens forming mold manufactured in the method of manufacturing a lens forming mold according to claim 52, hardening the resin, and taking off the lens forming mold from the hardened resin to form a lens.

Therefore, a Fresnel lens having high precision can be easily manufactured.

A method of manufacturing a lens according to the present invention, includes the steps of pouring resin into a lens forming mold manufactured in the method of manufacturing a lens forming mold according to claim 53, hardening the resin, and taking off the lens forming mold from the hardened resin to form a lens.

Therefore, a Fresnel lens having high precision can be easily manufactured.

BRIEF DESCRIPTION OF THE DRAWINGS

FIG. 4A and FIG. 4B are enlarged views respectively showing a sectional shape of a plurality of prism portions arranged in a plurality of pitch areas of another conventional Fresnel lens.

FIG. 17A and FIG. 17B are respectively a view showing the configuration of an image displaying device in which the Fresnel lens is applied to a screen.

FIG. 18A, FIG. 18B and FIG. 18C are views explaining a method of optimizing the outgoing angle of a ray of outgoing light.

FIG. 27A, FIG. 27B, FIG. 27C and FIG. 27D are views showing steps of a cutting work for the lens forming mold C using a cutting tool B.

FIG. 28A, FIG. 28B, FIG. 28C and FIG. 28D are views showing steps of another cutting work for the lens forming mold C using the cutting tool B.

FIG. 32 is a view showing the transmissivity of the Fresnel lens 51 based on the fifth embodiment and the transmissivity of the Fresnel lens 110 based on the prior art.

FIG. 37A and FIG. 37B are views explaining the configuration and operation of a Fresnel lens having dummy prism portions.

BEST MODE FOR CARRYING OUT THE INVENTION

Hereinafter, the best mode for carrying out the present invention will now be described with reference to the accompanying drawings to explain the present invention in more detail.

EMBODIMENT 1

Figure 7:
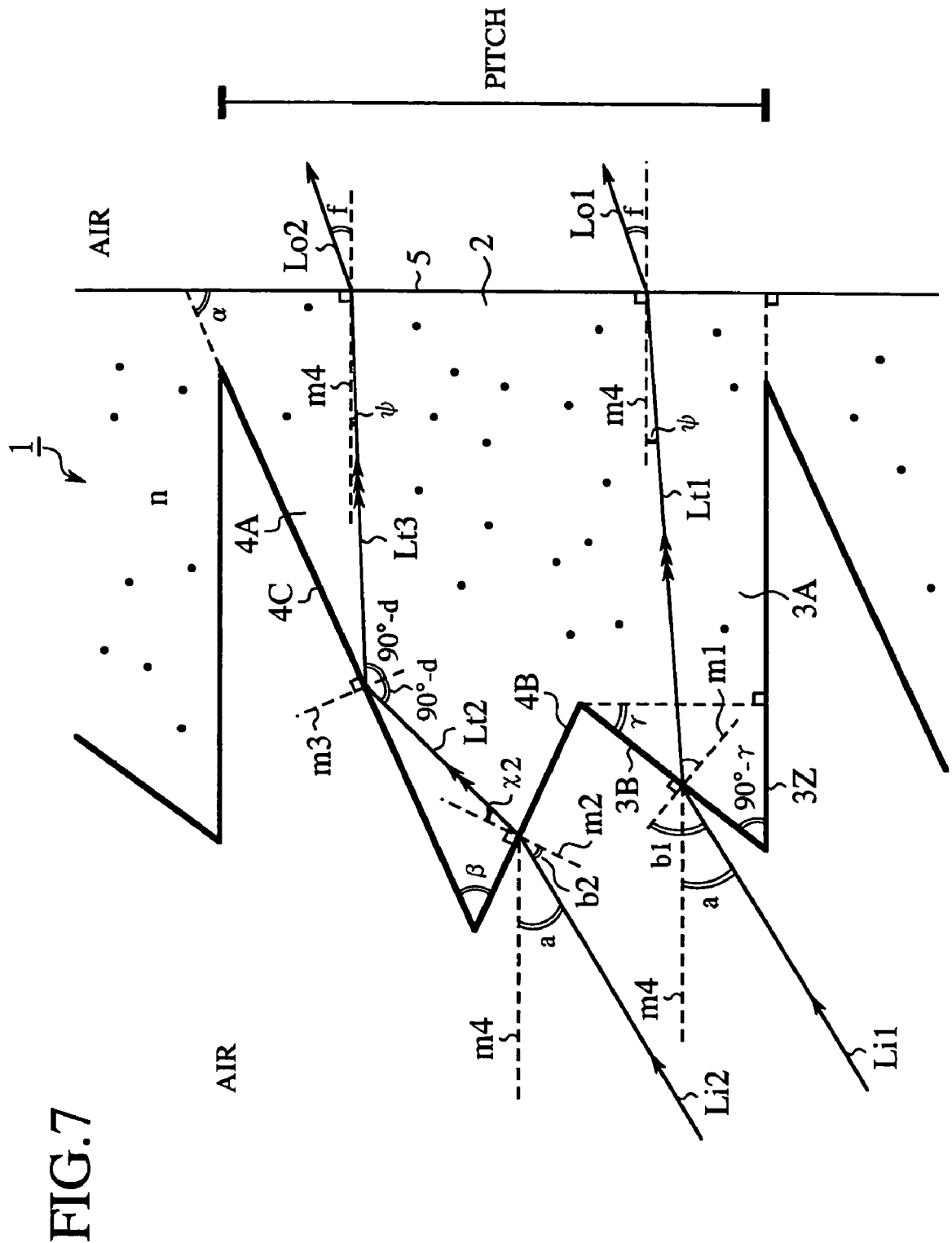
FIG. 7 is an enlarged view showing a sectional shape of a Fresnel lens in one pitch area according to a first embodiment of the present invention.

FIG. 7 is an enlarged view showing a sectional shape of a Fresnel lens in one pitch area according to a first embodiment of the present invention. Each arrow denotes a ray of light. Here, a sectional shape denotes a shape of a cutting plane of a plurality of prism portions of the Fresnel lens obtained in a case where the Fresnel lens is cut along a plane which includes an optical axis of the Fresnel lens.

In FIG. 7, 1 indicates a Fresnel lens according to a first embodiment. 2 indicates a hybrid type prism portion which is formed for each pitch area corresponding to one pitch of the Fresnel lens 1. 3A indicates a refraction type prism portion. 4A indicates a total reflection type prism portion. 5 indicates an outgoing plane of the hybrid type prism portion 2. The outgoing plane 5 is formed in a flat surface shape and is perpendicular to an optical axis (not shown) of the Fresnel lens 1. The refraction type prism portions 3A and the total reflection type prism portions 4A have the outgoing plane 5 in common. Each hybrid type prism portion 2 comprises the refraction type prism portion 3A and the corresponding total reflection type prism portion 4A.

In each refraction type prism portion 3A, 3B indicates an incident plane (or a first incident plane) of the refraction type prism portion 3A, and 3Z indicates an ineffective plane. A shape of each refraction type prism portion 3A is formed by the incident plane 3B, the outgoing plane 5 and the ineffective plane 3Z. Though a ray of light is received on the ineffective plane 3Z, the ineffective plane 3Z does not participate in the going-out of a ray of light from the outgoing plane 5.

In each total reflection type prism portions 4A, 4B indicates an incident plane (or a second incident plane) of the total reflection type prism portions 4A, and 4C indicates a total reflection plane. A shape of each total reflection type prism portion 4A is formed by the incident plane 4B, the outgoing plane 5 and the total reflection plane 4C. A phenomenon of the total reflection is used for the total reflection plane 4C, and a ray of light transmitted through a high refractive index type medium and being incident on a plane between the high refractive index type medium and a low refractive index type medium at an incident angle larger than a critical angle is totally reflected on the plane. Any ray of light directed from the air to the total reflection plane 4C is not incident on the total reflection plane 4C because the ray of light is interrupted by the incident plane 4B.

Li1 denotes a ray of incident light (or a ray of first incident light) transmitted through the air and being incident on the incident plane 3B. Lt1 denotes a ray of transmitted light (or a ray of first transmitted light) transmitted to the outgoing plane 5 due to the refraction (or a first refraction phenomenon) of the ray of incident light Li1 on the incident plane 3B. Lo1 denotes a ray of outgoing light (or a ray of first outgoing light) going out to the air due to the refraction (or a second refraction phenomenon) of the ray of transmitted light Lt1 on the outgoing plane 5.

Li2 denotes a ray of incident light (or a ray of second incident light) transmitted through the air and being incident on the incident plane 4B. Lt2 denotes a ray of transmitted light (or a ray of second transmitted light) transmitted to the total reflection plane 4C due to the refraction (or a third refraction phenomenon) of the ray of incident light Li2 on the incident plane 4B. Lt3 denotes a ray of transmitted light (or a ray of third transmitted light) transmitted to the outgoing plane 5 due to the total reflection (or a total reflection phenomenon) of the ray of transmitted light Lt2 on the total reflection plane 4C. Lo2 denotes a ray of outgoing light (or a ray of second outgoing light) going out to the air due to the refraction (or a fourth refraction phenomenon) of the ray of transmitted light Lt3 on the outgoing plane 5.

Also, m1 indicates a normal of the incident plane 3B, m2 indicates a normal of the incident plane 4B, m3 indicates a normal of the total reflection plane 4C, and m4 indicates a normal of the outgoing plane 5.

Next, an operation will be described below.

In FIG. 7, when a ray of incident light Li1 and a ray of incident light Li2 transmitted through the air having a refractive index of unity come on the Fresnel lens 1 having a refractive index of n (n>1) at an incident angle "a", the ray of incident light Li1 is received on the incident plane 3B of the refraction type prism portion 3A, and the ray of incident light Li2 is received on the incident plane 4B of the total reflection type prism portion 4A.

Initially, the ray of incident light Li1 received on the incident plane 3B is described.

The ray of incident light Li1 is incident on the incident plane 3B at a real incident angle b1 to the normal m1 and is divided into a ray of transmitted light Lt1 transmitted at a refraction angle χ1 to the normal m1 and a ray of reflected light (not shown). The ray of reflected light on the incident plane 3B causes a loss to the Fresnel lens 1.

The ray of transmitted light Lt1 refracted on the incident plane 3B is transmitted through the refraction type prism portion 3A and reaches the outgoing plane 5 at an angle φ to the normal m4. A part of the transmitted light Lt1 is changed to a ray of reflected light (not shown), and the remaining part of the transmitted light Lt1 goes out from the outgoing plane 5 at an outgoing angle "f" to the normal m4 as a ray of outgoing light Lo1.

In contrast, the ray of incident light Li2 received on the incident plane 4B is incident on the incident plane 4B at a real incident angle b2 to the normal m2 and is divided into a ray of transmitted light Lt2 transmitted at a refraction angle χ2 to the normal m2 and a ray of reflected light (not shown). The ray of reflected light on the incident plane 4B causes a loss to the Fresnel lens 1.

The ray of transmitted light Lt2 refracted on the incident plane 4B is transmitted through the total reflection type prism portion 4A and reaches the total reflection plane 4C at an angle of 90−d degrees to the normal m3. The angle of 90−d degrees is larger than a critical angle of the total reflection plane 4C. Thereafter, the ray of transmitted light Lt2 is totally reflected on the total reflection plane 4C and is changed to a ray of transmitted light Lt3. In this case, the total reflection plane 4C is designed in advance so as to make the ray of transmitted light Lt3 be parallel to the ray of transmitted light Lt1. Because an optical path of the transmitted light Lt2 is bent by using the phenomenon of the total reflection, no ray of light goes out from the total reflection plane 4C. Therefore, rays of light on the total reflection plane 4C hardly cause a loss to the Fresnel lens 1.

The ray of transmitted light Lt3 totally reflected on the total reflection plane 4C reaches the outgoing plane 5 at an angle φ to the normal m4. A part of the transmitted light Lt3 is changed to a ray of reflected light (not shown), and the remaining part of the transmitted light Lt3 goes out from the outgoing plane 5 at the outgoing angle "f" to the normal m4 as a ray of outgoing light Lo2. Because the transmitted light Lt1 is parallel to the transmitted light Lt3, the ray of outgoing light Lo1 and the ray of outgoing light Lo2 are output in parallel to each other.

Figure 5B:
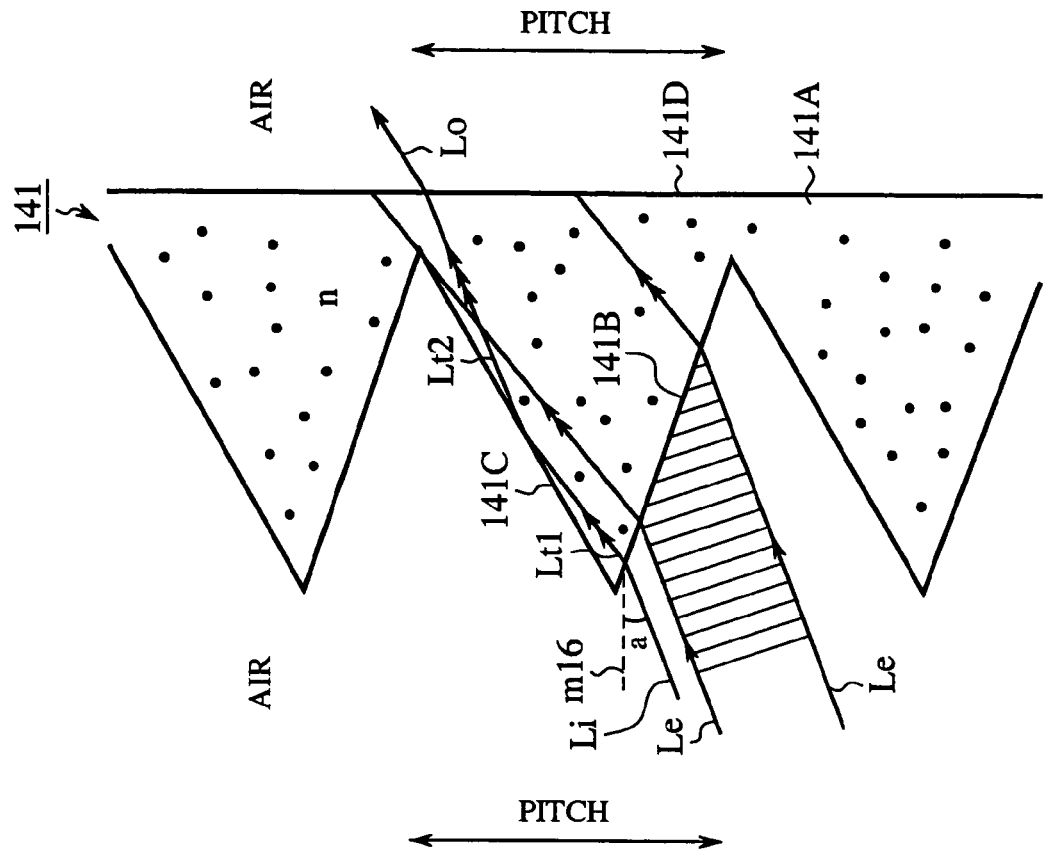
FIG. 5A and FIG. 5B are enlarged views respectively showing a sectional shape of a plurality of prism portions arranged in a plurality of pitch areas of another conventional Fresnel lens.
Figure 5A:
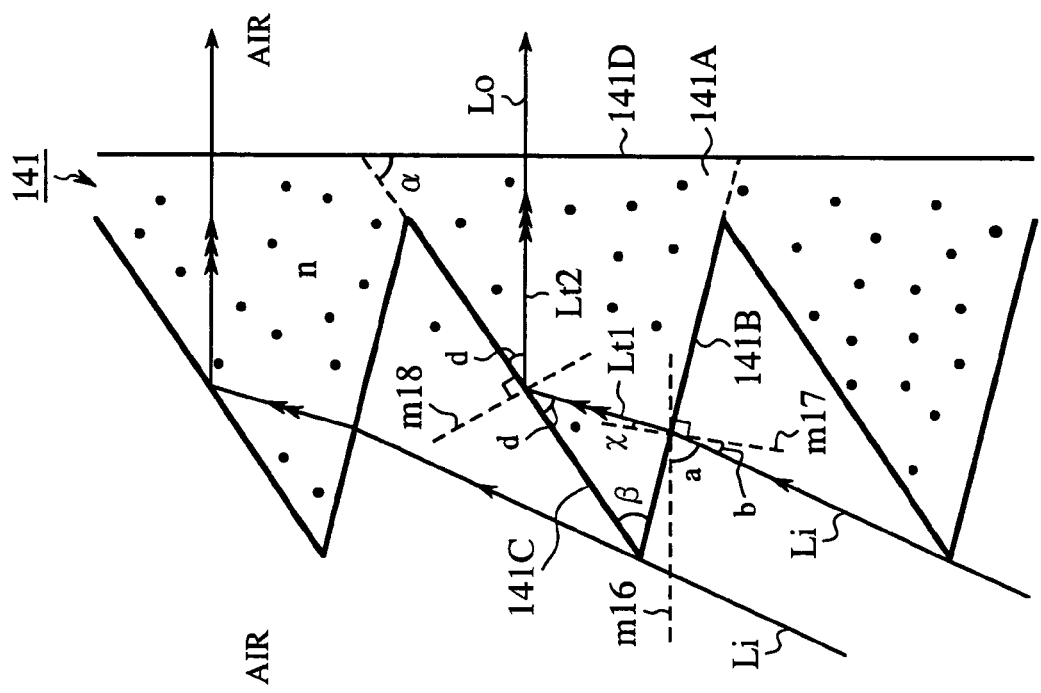

As is described above, the Fresnel lens 1 comprises the hybrid type prism portions 2 respectively obtained by combining one refraction type prism portion 3A and one total reflection type prism portion 4A. In other words, each hybrid type prism portion 2 is obtained by reshaping a portion of one refraction type prism portion 3A to one total reflection type prism portion 4A so as to receive the rays of the ineffective light Le (placed in an area of slash marks) described with reference to FIG. 5B on the incident plane 3B, and the Fresnel lens 1 has the hybrid type prism portions 2 arranged in a plurality of pitch areas respectively corresponding to one pitch. The ineffective lights Le are kind of like a part of the rays of light Li2 each of which is incident on the incident plane 4B and is not changed to the ray of transmitted light Lt3 due to no total reflection on the total reflection plane 4C, and the ineffective lights Le causing a loss in the total reflection type prism portion 4A are substantially received in the refraction type prism portion 3A.

In cases where the incident angle "a" and the outgoing angle "f" to the outgoing plane 5 formed in a flat surface shape are determined, an angle γ between the outgoing plane 5 and the incident plane 3B is determined according to the law of refraction. Also, in addition to the incident angle "a" and the outgoing angle "f", in cases where a top blade angle β between the total reflection plane 4C and the incident plane 4B is determined, an angle α between the outgoing plane 5 and the total reflection plane 4C is determined according to the law of refraction and the law of total reflection. The top blade angle β is set to an optimum value with respect to the incident angle so as to obtain the hybrid type prism portion 2 having a high transmissivity. Also, an angle between the outgoing plane 5 and the ineffective plane 3Z is set to a value (90 degrees in FIG. 7) at which a forming mold (or a lens forming mold) can be taken off in the manufacturing of the Fresnel lens 1.

Because the Fresnel lens 1 comprises the hybrid type prism portions 2 respectively obtained by combining the refraction type prism portion 3A having the high transmissivity for the small incident angle "a" and the total reflection type prism portion 4A having the high transmissivity for the large incident angle "a", the Fresnel lens 1 can have an excellent transmissivity in a wide range of the incident angle "a".

To realize the effect of the first embodiment, the transmissivity will be analyzed below with reference to FIG. 7.

The transmissivity TX of the refraction type prism portion 3A and the transmissivity TY of the total reflection type prism portion 4A are expressed according to equations (1) and (2) respectively.

<Transmissivity TX of Refraction Type Prism Portion 3A>

$$TX=[\tan(\alpha-d)/\{\tan(\alpha-d)-\tan(\alpha+\beta)\}]\times\{1-\text{than}(\gamma)\times\tan(a)\}\times[1-\{(n-1)/(n+1)\}^2]\times[1-0.5\times(PX^2+QX^2)] \quad (1)$$

Here, $$PX=\tan[a+\gamma-\sin^{-1}\{(1/n)\times\sin(a+\gamma)\}]\div\tan[a+\gamma+\sin^{-1}\{(1/n)\times\sin(a+\gamma)\}]$$

and $$QX=\tan[a+\gamma-\sin^{-1}\{(1/n)\times\sin(a+\gamma)\}]\div\sin[a+\gamma+\sin^{-1}\{(1/n)\times\sin(a+\gamma)\}]$$

are satisfied.

<Transmissivity TY of Total Reflection Type Prism Portion 4A>

$$TY=[\tan(\alpha)/\{\tan(\alpha)-\tan(\alpha+\beta)\}-\tan(\alpha-d)/\{\tan(\alpha-d)-\tan(\alpha+\beta)\}]\times\{1-\text{than}(\alpha+\beta)\times\tan(a)\}\times[1-\{(n-1)/(n+1)\}^2]\times[1-0.5\times(PY^2+QY^2)] \quad (2)$$

Here, $$PY=\tan[b-\sin^{-1}\{(1/n)\times\sin(b)\}]\div\tan[b+\sin^{-1}\{(1/n)\times\sin(b)\}] \text{ and}$$

$$QY=\tan[b-\sin^{-1}\{(1/n)\times\sin(b)\}]\div\sin[b+\sin^{-1}\{(1/n)\times\sin(b)\}]$$

are satisfied.

A transmissivity Tall of the hybrid type prism portion 2 is obtained as a sum of the transmissivity TX and the transmissivity TY and is expressed according to an equation (3).

<Transmissivity Tall of Hybrid Type Prism Portion 2>

$$Tall=TX+TY \quad (3)$$

Figure 8:
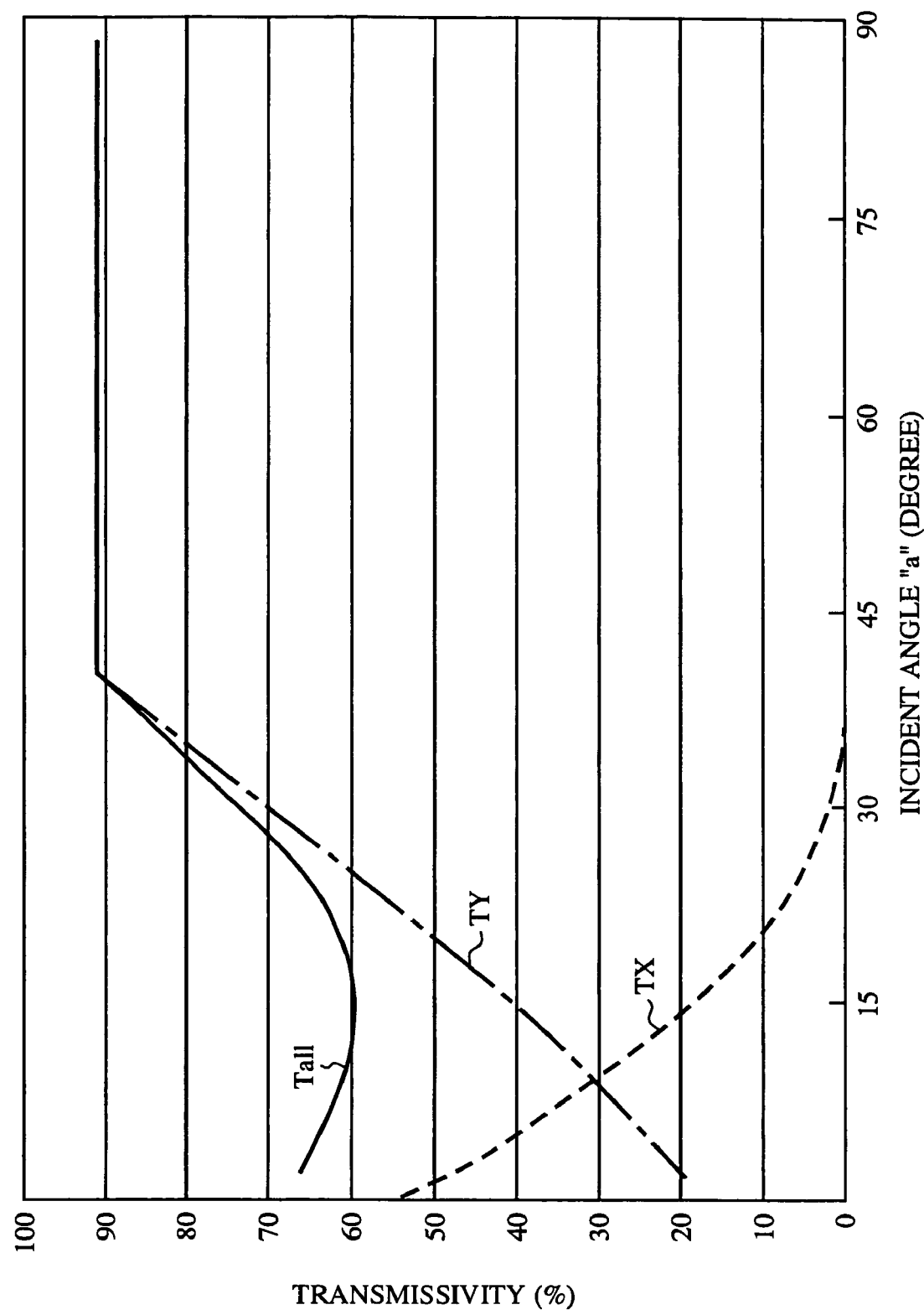
FIG. 8 is a view showing changes of transmissivity in a refraction type prism portion, a total reflection type prism portion and a hybrid type prism portion with respect to incident angle.

Changes of the transmissivity TX, the transmissivity TY and the transmissivity Tall with respect to the incident angle "a" are shown in FIG. 8 according to the equations (1), (2) and (3). The outgoing angle "f"=0 degree, the top blade angle β=45 degrees and the refraction angle n=1.5 are set as calculation conditions.

In FIG. 8, the X-axis indicates the incident angle "a" in degree, and the Y-axis indicates the transmissivity in percentage (%). Also, the transmissivity TX of the refraction type prism portion 3A is indicated by a broken line, the transmissivity TY of the total reflection type prism portion 4A is indicated by a dot-dash line, and the transmissivity Tall of the hybrid type prism portion 2 is indicated by a solid line.

In FIG. 8, the transmissivity TY of the total reflection type prism portion 4A is equal to or higher than 90% in a region of the incident angle "a" equal to or higher than 40 degrees. Also, as the incident angle "a" is decreased from 40 degrees, the transmissivity TY is rapidly decreased. Therefore, it is realized that the transmissivity TY of the total reflection type prism portion 4A depends on the incident angle.

In contrast to the characteristic of the transmissivity TY, as the incident angle "a" is decreased, the transmissivity TX of the refraction type prism portion 3A is increased. Therefore, the transmissivity TX of the refraction type prism portion 3A depending on the incident angle is indicated.

Because the hybrid type prism portion 2 comprises the refraction type prism portion 3A and the total reflection type prism portion 4A having the incident angle dependences different from each other, as shown by the transmissivity Tall in FIG. 8, the transmissivity Tall is equal to or higher than 90% in a region of the incident angle "a" higher than 40 degrees, and the refraction type prism portion 3A compensates for the decrease of the transmissivity TY of the total reflection type prism portion 4A in a region of the incident angle "a" equal to or lower than 40 degrees. Therefore, the transmissivity Tall is equal to or higher than almost 60% in a region of the incident angle "a" from 0 to 90 degrees.

As is described above, in the first embodiment, the ray of incident light Li2 of the incident angle "a" is received at the real incident angle b2 and is refracted as the ray of transmitted light Lt2 on the incident plane 4A, the ray of transmitted light Lt2 is received at an angle larger than the critical angle and is totally reflected as the ray of transmitted light Lt3 on the total reflection plane 4C, and the ray of transmitted light Lt3 is refracted on the outgoing plane 5 and goes out at the outgoing angle "f" as the ray of outgoing light Lo2. The total reflection type prism portion 4A has the sectional shape formed by the incident plane 4A, the total reflection plane 4C and the outgoing plane 5. A part of the rays of ineffective light functioning as ineffective light in the total reflection type prism portion 4A are received at the real incident angle b1 as the rays of transmitted light Li1 and are refracted on the incident plane 3B as the rays of transmitted light Lt1 parallel to the ray of transmitted light Lt3. The refraction type prism portion 3A has the sectional shape formed by the outgoing plane 5 of the total reflection type prism portion 4A, the incident plane 3B and the ineffective plane 3Z intersecting with both the outgoing plane 5 and the incident plane 3B. The Fresnel lens 1 has the hybrid type prism portion 2 for each pitch area, and each hybrid type prism portion 2 is composed of the total reflection type prism portion 4A and the refraction type prism portion 3A. Accordingly, the Fresnel lens 1 having the high transmissivity and the considerably-reduced incident angle dependence can be obtained.

Here, it is not required to arrange the hybrid type prism portions 2 in all pitch areas, and it is applicable that the hybrid type prism portions 2 be used for the Fresnel lens 1 with the conventional refraction type prism portions 131A and the conventional total reflection type prism portions 141A. For example, the Fresnel lens 1 of all pitch areas is divided into three groups of pitch areas corresponding to three types of incident angles different from each other, the conventional refraction type prism portions 131A are arranged in the first group of pitch areas, the hybrid type prism portions 2 are arranged in the second group of pitch areas, and the conventional total reflection type prism portions 141A are arranged in the third group of pitch areas. In this case, because the Fresnel lens has the group of the hybrid type prism portions 2 and the group of the conventional prism portions, one group of prism portions optimum to the incident angle can be selected. Therefore, the incident angle dependence of the Fresnel lens having the high transmissivity can be further reduced, and an image displaying device displaying a bright image on the whole image plane can be provided.

EMBODIMENT 2

In the Fresnel lens 1 of the first embodiment, there are rays of ineffective light received on the ineffective plane 3Z. Because each ray of ineffective light does not go out from the outgoing plane 5 at the outgoing angle "f", the ray of ineffective light causes a loss in the Fresnel lens 1. In a second embodiment, a method of reducing rays of ineffective light will be described.

Figure 9:
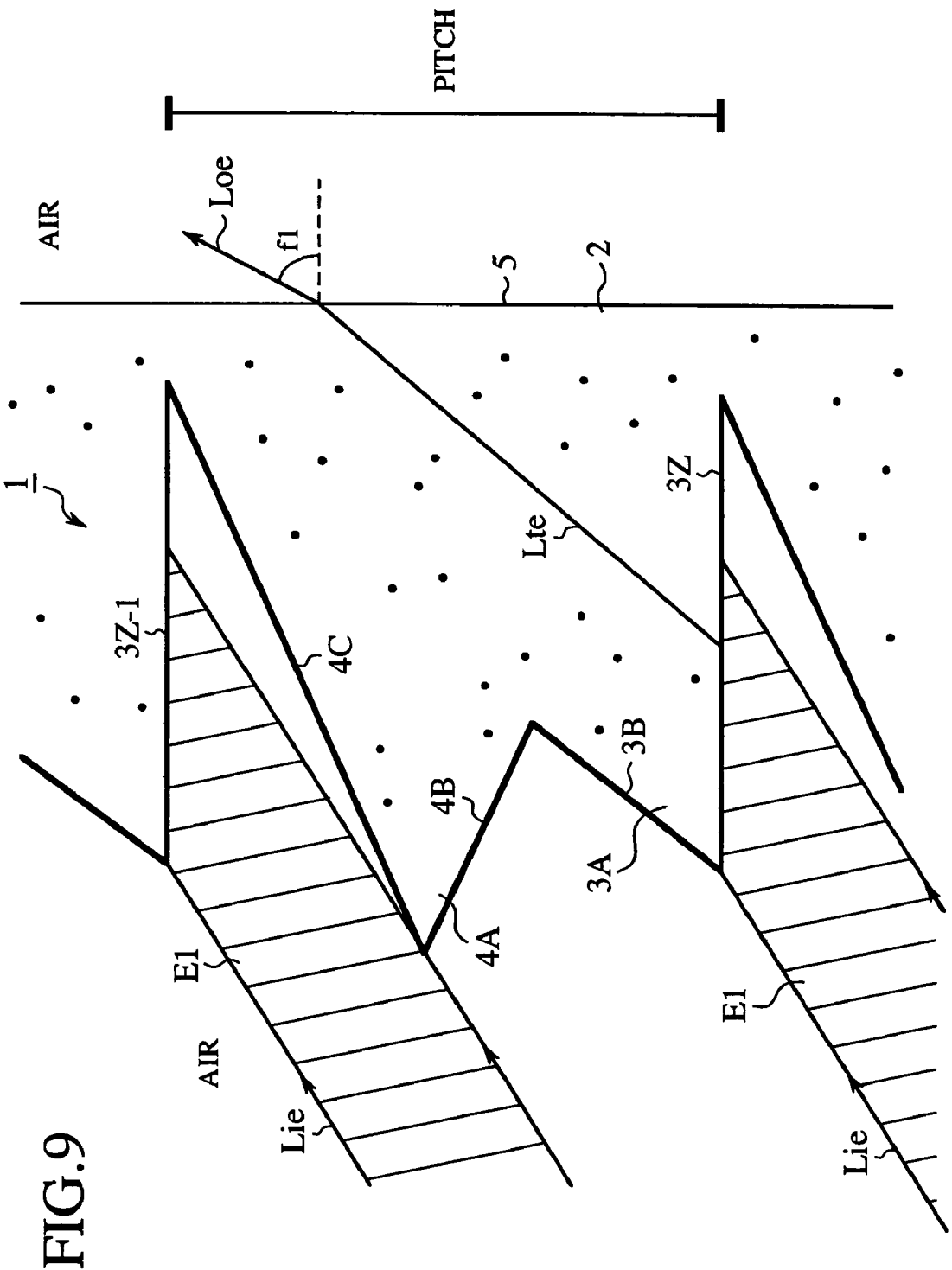
FIG. 9 is a view explaining rays of ineffective light in the Fresnel lens shown in the first embodiment.

FIG. 9 is a view explaining rays of ineffective light occurring in the Fresnel lens of the first embodiment. Each arrow indicates a ray of light. The constituent elements, which are the same as those shown in FIG. 7, are indicated by the same reference numerals as those of the constituent elements shown in FIG. 7.

In FIG. 9, Lie indicates each of a plurality of rays of ineffective light received on the ineffective plane 3Z or an ineffective plane 3Z arranged on another pitch area adjacent to that of the ineffective plane 3Z. Each area E1 indicated by slash marks denotes an ineffective area through which a flux of ineffective light Lie is transmitted. Lte denotes a ray of transmitted light obtained from one ray of ineffective light Lie which is refracted on the ineffective plane 3Z and is transmitted through the Fresnel lens 1. Loe denotes a ray of outgoing light obtained from the ray of transmitted light Lte which is refracted on the outgoing plane 5 and goes out to the air at an outgoing angle "f1" ($\neq$f).

As is realized by viewing FIG. 9, each ray of ineffective light Lie is refracted on the ineffective plane 3Z and is changed to the ray of transmitted light Lte, the ray of transmitted light Lte is refracted on the outgoing plane 5 and is changed to the ray of outgoing light Loe at an outgoing angle "f1" to the outgoing plane 5. Therefore, because the ray of ineffective light Lie transmitted through the ineffective area E1 and received on the ineffective plane 3Z does not go out at the outgoing angle "f", the ray of ineffective light Lie causes a loss in the Fresnel lens 1.

Figure 10:
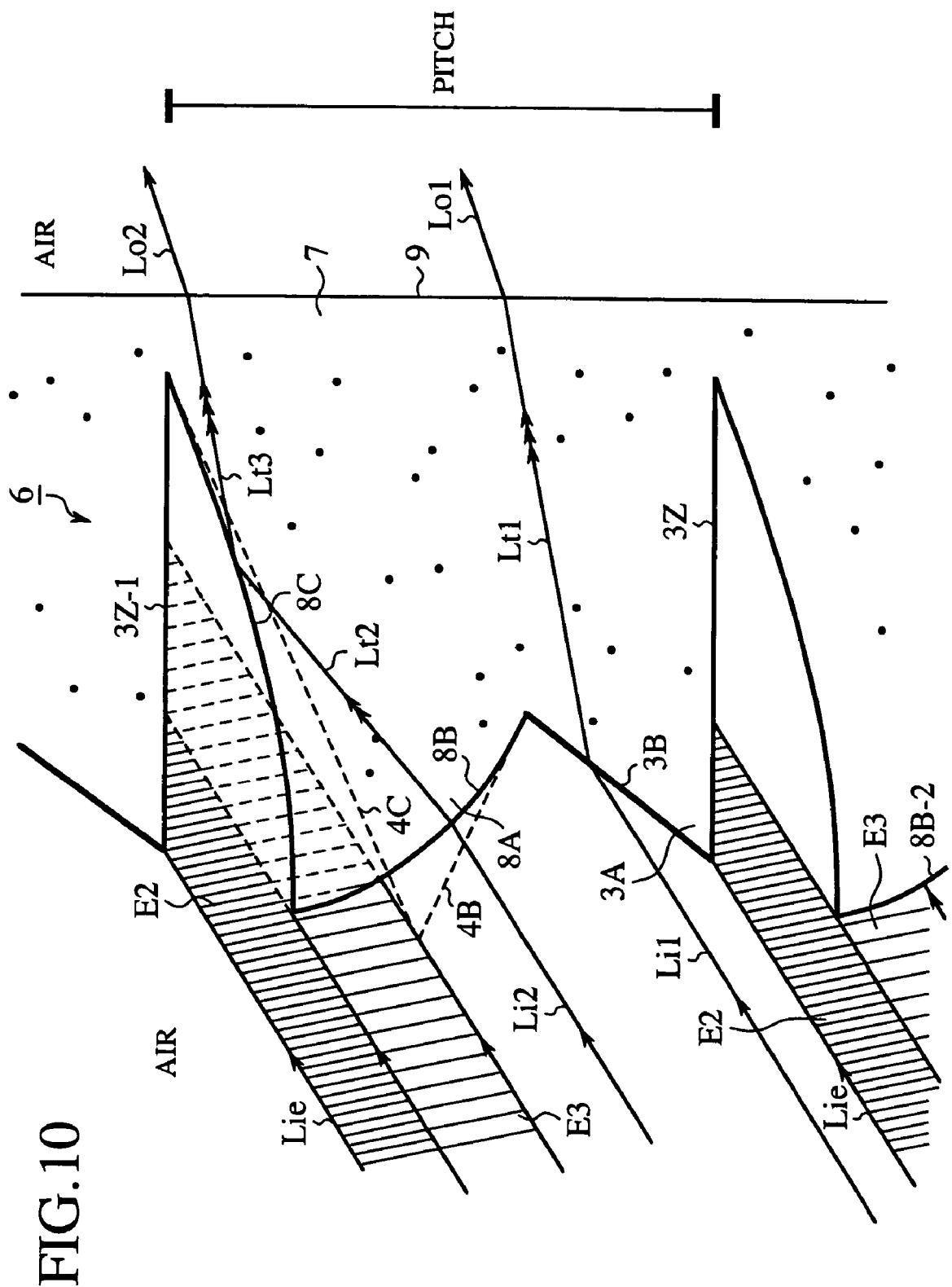
FIG. 10 is an enlarged view of a sectional shape of a Fresnel lens in one pitch area according to a second embodiment of the present invention.

To prevent this problem in the second embodiment, an amount of rays of ineffective light is reduced by using a Fresnel lens which has a prism portion of a sectional shape shown in FIG. 10 for each pitch area.

FIG. 10 is an enlarged view of a sectional shape of a Fresnel lens in one pitch area according to the second embodiment of the present invention. Each arrow indicates a ray of light. The constituent elements, which are the same as those shown in FIG. 7 or FIG. 9, are indicated by the same reference numerals as those of the constituent elements shown in FIG. 7 or FIG. 9.

In FIG. 10, 6 indicates a Fresnel lens according to the second embodiment. 7 indicates a hybrid type prism portion of the Fresnel lens 6. The hybrid type prism portion 7 has the refraction type prism portion 3A in the same manner as the hybrid type prism portion 2 of the first embodiment.

8A indicates a total reflection type prism portion. Each hybrid type prism portion 7 is formed by one total reflection type prism portion 8A and one refraction type prism portion 3A. 8B indicates an incident plane (or a second incident plane) of the total reflection type prism portion 8A. 8C indicates a total reflection plane of the total reflection type prism portion 8A. 9 indicates an outgoing plane of the hybrid type prism portion 7. The outgoing plane 9 is formed in a flat surface shape. 3Z-1 indicates an ineffective plane of another refraction type prism portion formed in a pitch area adjacent to the total reflection type prism portion 8A. 8B-2 indicates an incident plane of another total reflection type prism portion formed in a pitch area adjacent to the refraction type prism portion 3A. Also, E2 indicates an ineffective area through which a flux of the ineffective light Lie is transmitted. E3 indicates an effective area obtained by removing the ineffective area E2 from the ineffective area E1. In short, E1=E2+E3 is satisfied.

A sectional shape of the incident plane 8B is formed so as to make the incident plane 8B conceal a part of the ineffective plane 3Z-1 of the adjacent pitch area from a view seen in a propagation direction of the ray of ineffective light Lie. Therefore, any ray of light transmitted through the effective area E3 among rays of light transmitted through the ineffective area E1 shown in FIG. 9 is not received on the ineffective plane 3Z-1 but is received on the incident plane 8B as a ray of incident light Li2. As a result, it can be realized from FIG. 10 that the ineffective area E1 is narrowed to the ineffective area E2.

Because the sectional shape of the incident plane 8B is formed in a curved line shape to intercept the ray of ineffective light Lie directed to the ineffective plane 3Z-1 of the adjacent pitch area, refraction angles on the incident plane 8B for rays of incident light Li2 passing through optical paths different from each other differ from each other. Therefore, a sectional shape of the total reflection plane 8C is formed in a curved line shape (or a second incident plane compensating shape) so as to totally reflect rays of transmitted light Lt2 corresponding to the refraction angles different from each other as rays of transmitted light Lt3 and so as to make the rays of transmitted light Lt3 be parallel to the ray of transmitted light Lt1 refracted on the incident plane 3B of the refraction type prism portion 3A.

Next, an operation will be described below.

Because the ray of light transmitted through the refraction type prism portion 3A is the same as that of the first embodiment, the description of the ray of light transmitted through the refraction type prism portion 3A is omitted.

A ray of transmitted light Lt2 refracted on the incident plane 8B is totally reflected on the total reflection plane 8C and is transmitted to the outgoing plane 9 as a ray of transmitted light Lt3. Because the shape of the total reflection plane 8C is designed so as to make the ray of transmitted light Lt3, which is obtained by totally reflecting the ray of transmitted light Lt2, be parallel to the ray of transmitted light Lt1 transmitted from the incident plane 3B, the ray of transmitted light Lt3 is refracted on the outgoing plane 9 in the same manner as the ray of transmitted light Lt1 and goes out as a ray of outgoing light Lo2 at an outgoing angle "f".

Therefore, because a part of the rays of ineffective light Lie, which are placed in the effective area E3 and are expected to be received on the ineffective plane 3Z-1 of the pitch area adjacent to the total reflection type prism portion 8A, are received on the incident plane 8B as rays of incident light Li2, the ineffective area E1 can be narrowed to the ineffective area E2, and a light receiving efficiency of the hybrid type prism portion 7 can be heightened.

The ineffective plane 3Z of the hybrid type prism portion 7 is concealed from the rays of ineffective light Lie by the incident plane 8B-2 of the pitch area adjacent to the refraction type prism portion 3A when the ineffective plane 3Z is seen in a propagation direction of the rays of ineffective light Lie. The ineffective planes 3Z in the other pitch areas are also covered with the incident plane in the same manner, the ineffective areas E1 are narrowed over the entire Fresnel lens 6, and a light receiving efficiency of the whole Fresnel lens 6 can be improved.

As is described above, in the second embodiment, the incident plane 8B conceals the ineffective plane 3Z-1 of the pitch area adjacent to the total reflection type prism portion 8A when the ineffective plane 3Z-1 is seen in a propagation direction of the rays of ineffective light Lie, all rays of transmitted light Lt2 refracted on the incident plane 8B are totally reflected and are changed to the rays of transmitted light Lt3 parallel to the rays of transmitted light Lt1 on the total reflection plane 8C, and each total reflection type prism portion 8A has the incident plane 8B and the total reflection plane 8C. Accordingly, the ineffective area E1 can be narrowed, and a light receiving efficiency of the Fresnel lens 6 can be heightened.

Here, because the manufacturing of the Fresnel lens 6 is completed by taking off a forming mold (or a lens forming mold) from hardened synthetic resin, the sectional shape of the total reflection type prism portions 8A is formed so as to be possible to take off the forming mold.

Also, the second embodiment is not restricted to the Fresnel lens having the hybrid type prism portions, and the second embodiment can be applied to a Fresnel lens having the conventional total reflection type prism portions.

EMBODIMENT 3

In the first embodiment, the hybrid type prism portions 2 respectively having both the refraction type prism portion 3A and the total reflection type prism portion 4A are reshaped to obtain the Fresnel lens 1, and the transmissivity of the hybrid type prism portion shown in FIG. 8 is obtained. However, the transmissivity in a region of the small incident angles is slightly low as compared with that in a region of the large incident angles. In a third embodiment, a method of improving the transmissivity in a region of the small incident angles will be described.

Figure 11:
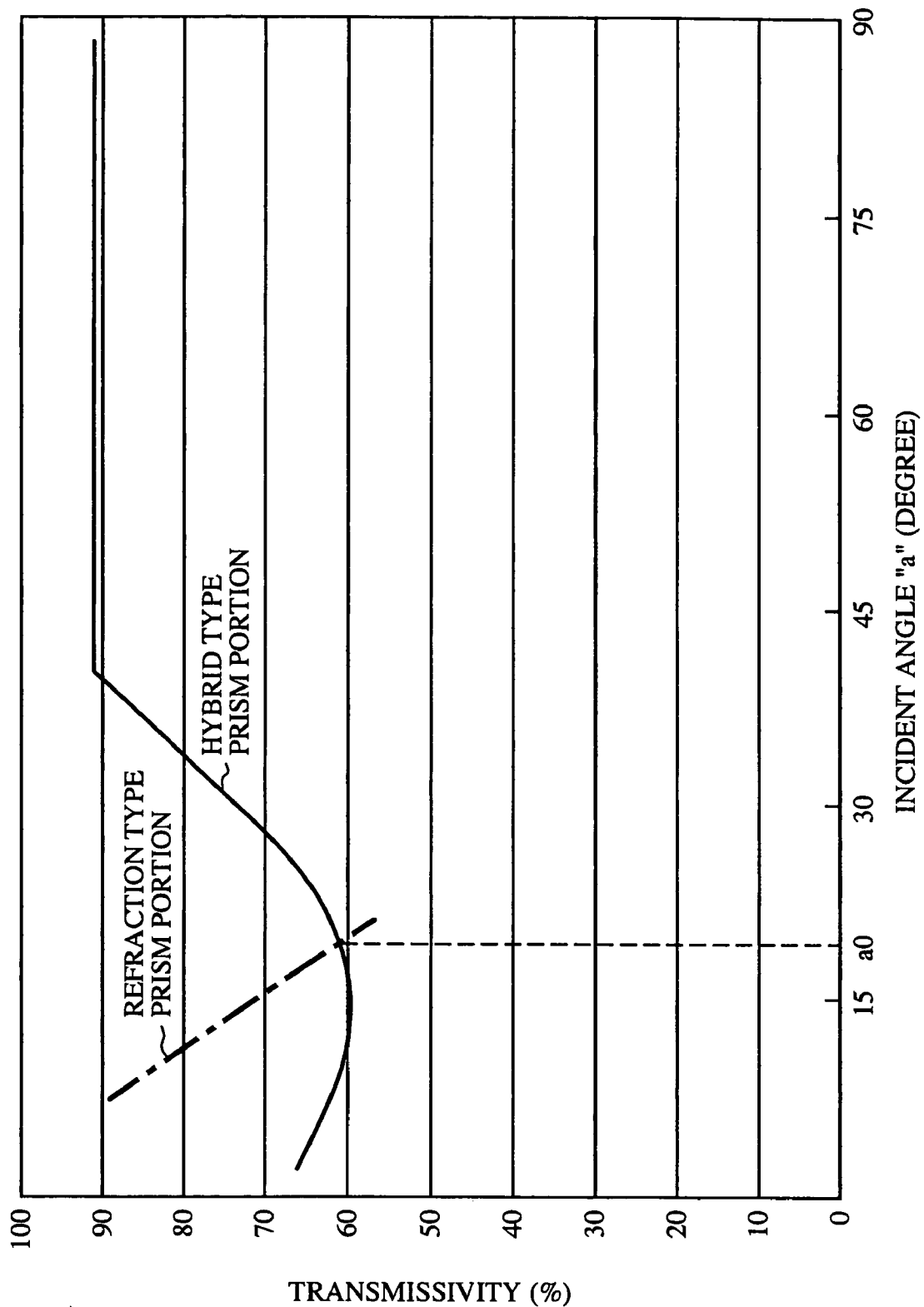
FIG. 11 is a view showing the comparison between the transmissivity of the hybrid type prism portion 2 shown in the first embodiment and the transmissivity of a refraction type prism portion shown in the prior art.

FIG. 11 is a view showing the comparison between the transmissivity of the hybrid type prism portion 2 shown in the first embodiment and the transmissivity of the refraction type prism portion 131A shown in the prior art.

In FIG. 11, in the same manner as in FIG. 8, the X-axis indicates the incident angle "a" in degree, and the Y-axis indicates the transmissivity in percentage (%). The transmissivity of the hybrid type prism portion 2 is indicated by a solid line, and the transmissivity of the refraction type prism portion 131A is indicated by a dot-dash line.

Because the Fresnel lens 131 described with reference to FIG. 4 has an excellent transmissivity in a region of small incident angles, as is realized in FIG. 11, the transmissivity of the refraction type prism portion 131A is high in a region of incident angles smaller than a characteristic changing angle "a0" as compared with the transmissivity of the hybrid type prism portion 2. The characteristic changing angle "a0" is defined as an incident angle at which the transmissivity of the hybrid type prism portion 2 agrees with the transmissivity of the refraction type prism portion 131A.

Therefore, in a third embodiment, the refraction type prism portion 131A is applied to the Fresnel lens 1 having the hybrid type prism portion 2, and the transmissivity of a Fresnel lens in a region of small incident angles is improved.

Figure 12:
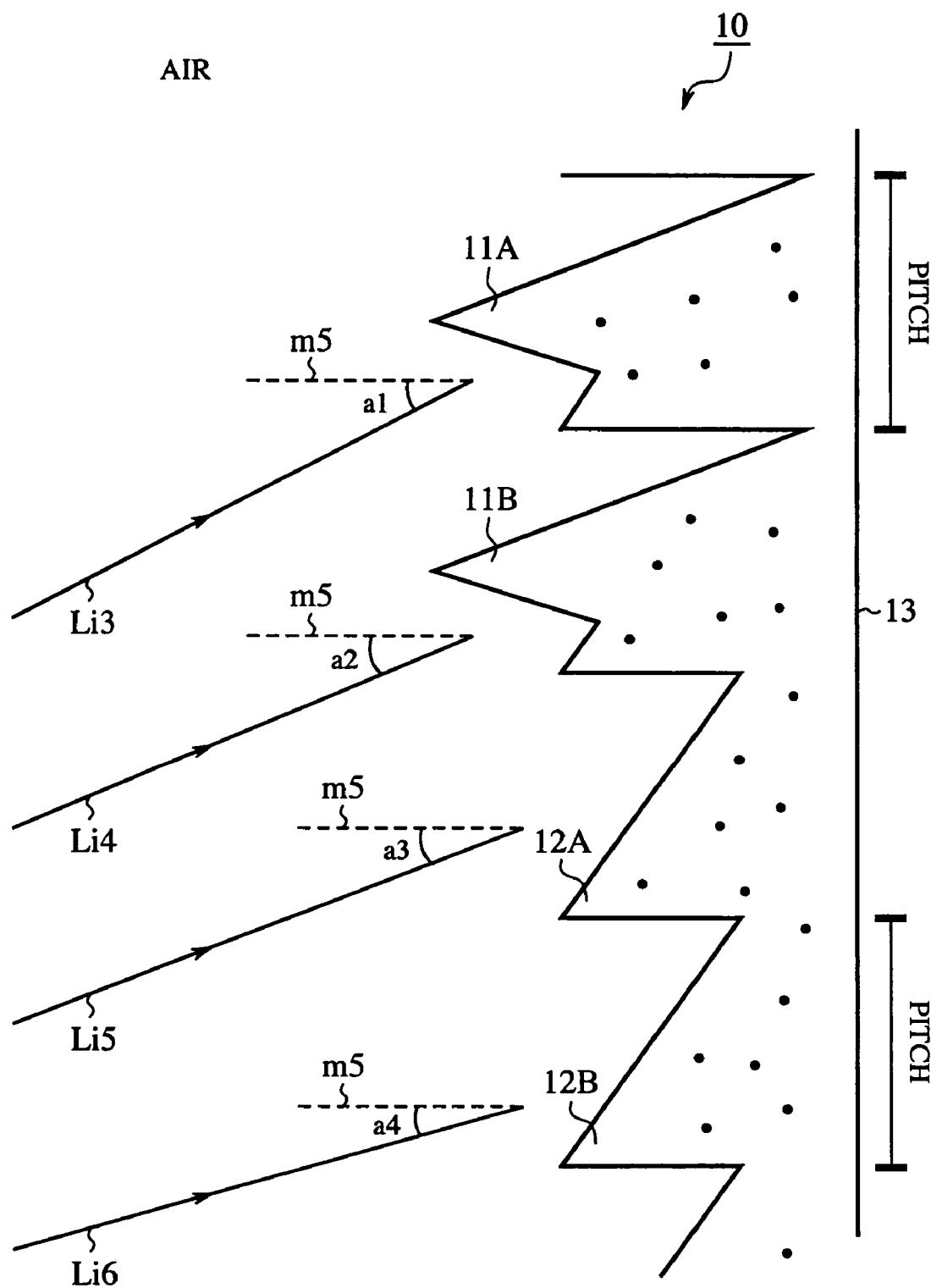
FIG. 12 is an enlarged view of a sectional shape of a Fresnel lens according to a third embodiment of the present invention in a plurality of pitch areas.

FIG. 12 is an enlarged view of a sectional shape of a Fresnel lens in a plurality of pitch areas according to the third embodiment of the present invention. Each arrow denotes a ray of light.

In FIG. 12, 10 indicates a Fresnel lens according to the third embodiment. 11A and 11B indicate hybrid type prism portions of the Fresnel lens 1 described in the first embodiment respectively. 12A and 12B indicate refraction type prism portions of the Fresnel lens 131 described in the prior art respectively. 13 indicates an outgoing plane of the Fresnel lens 10. The outgoing plane 13 is formed in a flat surface shape m5 indicates a normal of the outgoing plane 13.

Li3, Li4, Li5 and Li6 indicate a ray of incident light transmitted to the prism portion 11A at an incident angle "a1" to the normal m5, a ray of incident light transmitted to the prism portion 11B at an incident angle "a2" to the normal m5, a ray of incident light transmitted to the prism portion 12A at an incident angle "a3" to the normal m5 and a ray of incident light transmitted to the prism portion 12B at an incident angle "a4" to the normal m5 respectively.

The incident angles "a1", "a2", "a3" and "a4" and the characteristic changing angle "a0" satisfy the relationship of a1>a2≧a0>a3>a4 (or a1>a2>a0≧a3>a4). Therefore, a most-end portion of the Fresnel lens 10 is placed in an upper direction (or above in FIG. 12) of the prism portion 11A, and an optical axis of the Fresnel lens 10 is placed in a lower direction (or below in FIG. 12) of the prism portion 12B. The hybrid type prism portion 11A or 11B is arranged in each of pitch areas ranging from the most-end portion of the Fresnel lens 10 to the hybrid type prism portion 11B, and the refraction type prism portion 12A or 12B is arranged in each of pitch areas ranging from the refraction type prism portion 12A to the optical axis of the Fresnel lens 10.

In other words, in the Fresnel lens 10 shown in FIG. 12, the hybrid type prism portions 11A and 11B are applied to the pitch areas satisfying the relationship a≧a0 (or a>a0) for the incident angle "a", and the refraction type prism portions 12A and 12B are applied to the pitch areas satisfying the relationship a0>a (or a0≧a) for the incident angle "a".

The characteristic changing angle "a0" denotes a changing point of the sectional shape of the prism portion, the hybrid type prism portions 11A and 11B are arranged in the pitch areas placed in the region of small incident angles smaller than (or equal to or smaller than) the characteristic changing angle "a0", and the refraction type prism portions 12A and 12B are arranged in the pitch areas placed in the region of large incident angles equal to or larger than (or larger than) the characteristic changing angle "a0". Therefore, the transmissivity of the Fresnel lens 10 agrees with the transmissivity of the Fresnel lens 131 shown in FIG. 11 in a region of incident angles smaller than the characteristic changing angle "a0", and the transmissivity of the Fresnel lens 10 agrees with the transmissivity of the Fresnel lens 1 shown in FIG. 11 in a region of incident angles larger than the characteristic changing angle "a0". Accordingly, the transmissivity of the Fresnel lens 10 in a region of the small incident angles can be heightened as compared with the Fresnel lens 1 of the first embodiment.

Also, to smoothly change the transmissivity of the Fresnel lens 10 in the neighborhood of the characteristic changing angle "a0", a following improvement is preferred.

Figure 13:
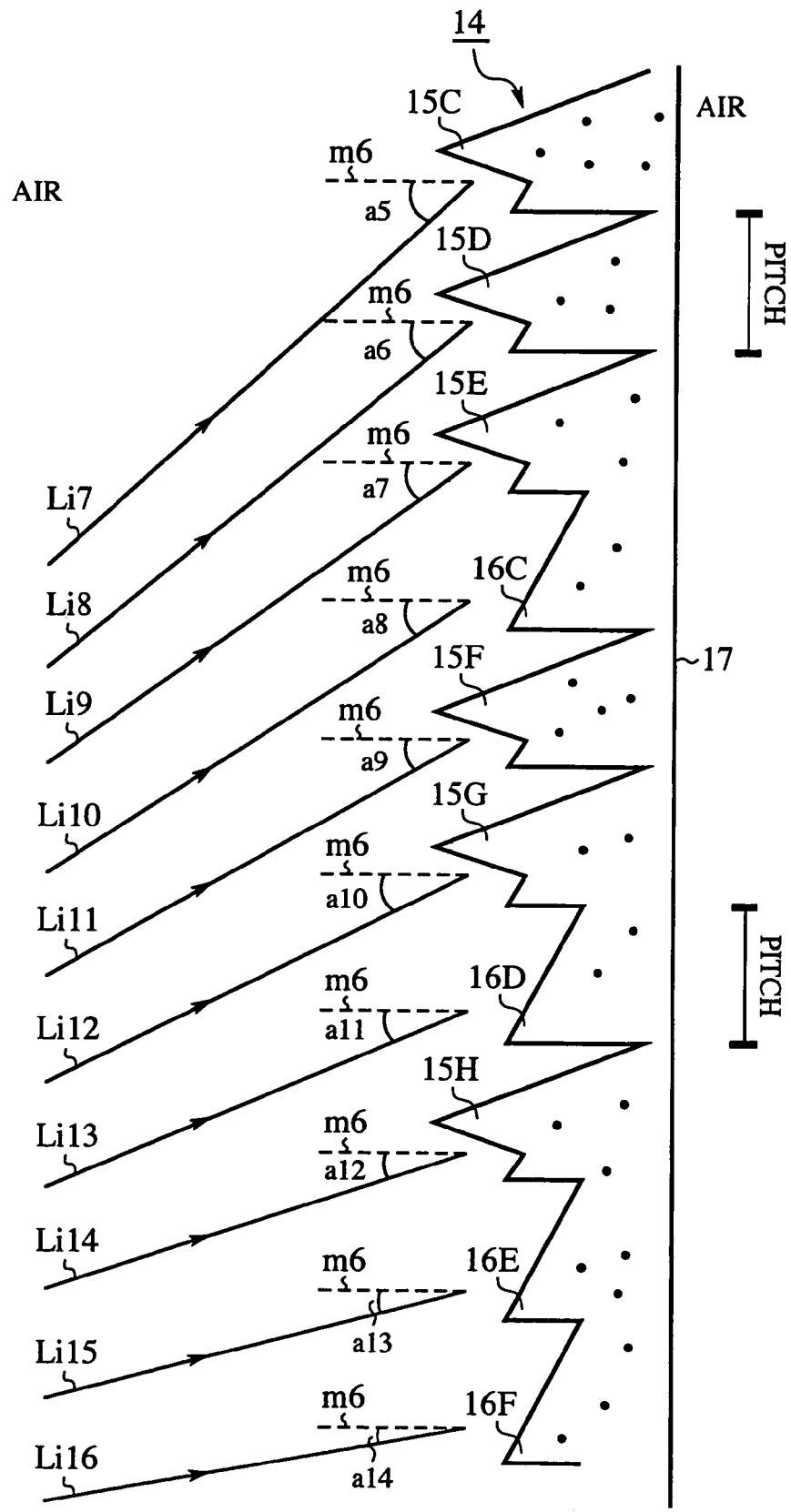
FIG. 13 is an enlarged view of a sectional shape of another Fresnel lens according to the third embodiment of the present invention in a plurality of pitch areas.

FIG. 13 is an enlarged view of a sectional shape of another Fresnel lens in a plurality of pitch areas according to the third embodiment of the present invention. Each arrow denotes a ray of light.

In FIG. 13, 14 indicates another Fresnel lens according to the third embodiment. 15C, 15D, 15E, 15F, 15G and 15H respectively indicate hybrid type prism portions of the Fresnel lens 1 described in the first embodiment. 16C, 16D, 16E and 16F respectively indicate refraction type prism portions of the Fresnel lens 131 described in the prior art. 17 indicates an outgoing plane of the Fresnel lens 14. The outgoing plane 17 is formed in a flat surface shape m6 indicates a normal of the outgoing plane 17.

Li7 indicates a ray of incident light transmitted to the prism portion 15C at an incident angle "a5" to the normal m6, Li8 indicates a ray of incident light transmitted to the prism portion 15D at an incident angle "a6" to the normal m6, Li9 indicates a ray of incident light transmitted to the prism portion 15E at an incident angle "a7" to the normal m6, Li10 indicates a ray of incident light transmitted to the prism portion 16C at an incident angle "a8" to the normal m6, Li11 indicates a ray of incident light transmitted to the prism portion 15F at an incident angle "a9" to the normal m6, Li12 indicates a ray of incident light transmitted to the prism portion 15G at an incident angle "a10" to the normal m6, Li13 indicates a ray of incident light transmitted to the prism portion 16D at an incident angle "a11" to the normal m6, Li14 indicates a ray of incident light transmitted to the prism portion 15H at an incident angle "a12" to the normal m6, Li15 indicates a ray of incident light transmitted to the prism portion 16E at an incident angle "a13" to the normal m6, and Li16 indicates a ray of incident light transmitted to the prism portion 16F at an incident angle "a14" to the normal m6.

The incident angles satisfy the relationship a5>a6> - - - >a13>a14. Therefore, a most-end portion of the Fresnel lens 14 is placed in an upper direction (or above in FIG. 13) of the hybrid type prism portion 15C, and an optical axis of the Fresnel lens 14 is placed in a lower direction (or below in FIG. 13) of the refraction type prism portion 16F.

The hybrid type prism portion is arranged in each of pitch areas ranging from the most-end portion of the Fresnel lens 14 to the hybrid type prism portion 15C, and the refraction type prism portion is arranged in each of pitch areas ranging from the refraction type prism portion 16F to the optical axis of the Fresnel lens 14.

In the Fresnel lens 14 shown in FIG. 13, as the incident angle "a" is decreased in pitch areas corresponding to incident angles (or a characteristic changing region) neighboring to the characteristic changing angle "a0", a ratio (or a mixing ratio) of the number of refraction type prism port ions to the number of hybrid type prism port ions is increased step by step.

For example, it is presumed that the characteristic changing angle "a0" is placed between the incident angle "a10" and the incident angle "a11".

In this case, as shown in FIG. 13, the prism portions corresponding to incident angles neighboring to the characteristic changing angle "a0" are arranged in the mixing ratio of 1 to 3 in the pitch areas corresponding to the hybrid type prism portions 15C to 15E and the refraction type prism portion 16C, are arranged in the mixing ratio of 1 to 2 in the pitch areas corresponding to the hybrid type prism portions 15F, 15G and the refraction type prism portion 16D and are arranged in the mixing ratio of 1 to 1 in the pitch areas corresponding to the hybrid type prism portion 15H and the refraction type prism portion 16E.

Therefore, the hybrid type prism portions 15C to 15H and the refraction type prism portions 16C to 16F are mixed in the pitch areas of the characteristic changing region corresponding to the incident angles neighboring to the characteristic changing angle "a0", and the mixing ratio of the number of refraction type prism portions to the number of hybrid type prism portions is gradually increased as the incident angle "a" is decreased. Accordingly, as compared with the Fresnel lens 10 shown in FIG. 12, the transmissivity of the Fresnel lens 14 shown in FIG. 13 in the neighborhood of the characteristic changing angle "a0" can be smoothly changed.

In this case, it is preferred that the position of the characteristic changing angle "a0" in the relationship of the incident angles, the number of pitch areas in the characteristic changing region and the mixing ratios are determined according to specifications of the Fresnel lens 14.

In addition, the transmissivity of a Fresnel lens in the neighborhood of the characteristic changing angle "a0" can be smoothly changed according to another following improvement.

Figure 14:
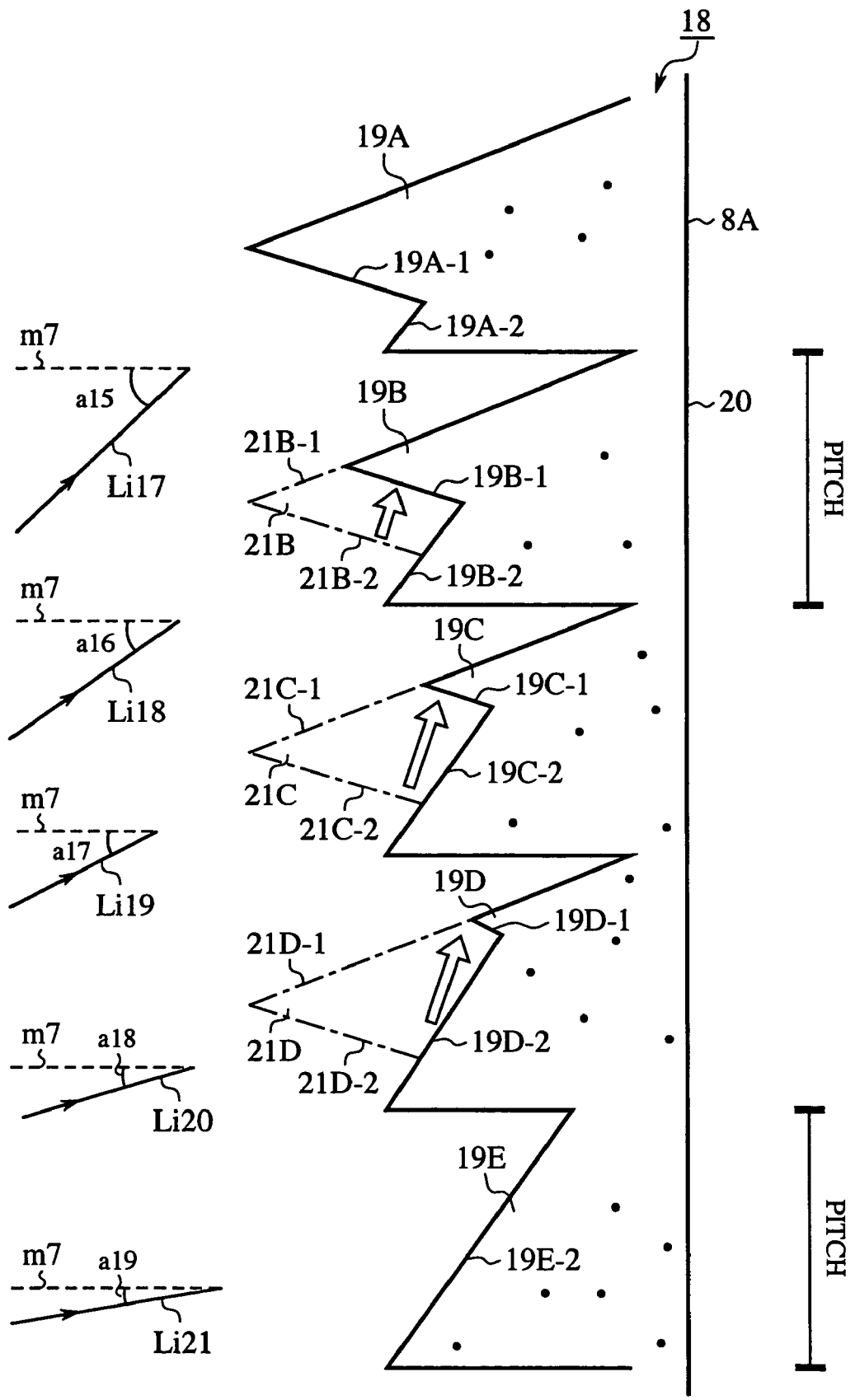
FIG. 14 is an enlarged view of a sectional shape of another Fresnel lens according to the third embodiment of the present invention in a plurality of pitch areas.

FIG. 14 is an enlarged view of a sectional shape of another Fresnel lens in a plurality of pitch areas according to the third embodiment of the present invention. Each arrow denotes a ray of light.

In FIG. 14, 18 indicates another Fresnel lens according to the third embodiment. 19A indicates a hybrid type prism portion of the Fresnel lens 18. 19B, 19C and 19D indicate a plurality of hybrid type prism portions (or a plurality of intermediary prism portions) of the Fresnel lens 18 respectively. 19E indicates are fraction type prism portion. 19A-1, 19B-1, 19C-1 and 19D-1 respectively indicate a plurality of incident planes of a plurality of total reflection type prism portions composing the hybrid type prism portions 19A to 19D. 19A-2, 19B-2, 19C-2 and 19D-2 respectively indicate a plurality of incident planes of a plurality of refraction type prism portions composing the hybrid type prism portions 19A to 19D. 19E-2 indicates an incident plane of the refraction type prism portion 19E. 20 indicates an outgoing plane of the Fresnel lens 18. The outgoing plane 20 is formed in a flat surface shape. m7 indicates a normal of the outgoing plane 20.

Li17 indicates a ray of incident light transmitted to the hybrid type prism portion 19A at an incident angle "a15" to the normal m7, Li18 indicates a ray of incident light transmitted to the hybrid type prism portion 19B at an incident angle "a16" to the normal m7, Li19 indicates a ray of incident light transmitted to the hybrid type prism portion 19C at an incident angle "a17" to the normal m7, Li20 indicates a ray of incident light transmitted to the hybrid type prism portion 19D at an incident angle "a18" to the normal m7, and Li21 indicates a ray of incident light transmitted to the hybrid type prism portion 19E at an incident angle "a19" to the normal m7.

21B, 21C and 21D respectively indicate hybrid type prism portions based on the first embodiment corresponding to the incident angles "a16", "a17" and "a18". The hybrid type prism portion 21B has a total reflection plane 21B-1 and an incident plane 21B-2, the hybrid type prism portion 21C has a total reflection plane 21C-1 and an incident plane 21C-2, and the hybrid type prism portion 21D has a total reflection plane 21D-1 and an incident plane 21D-2. Each of the hybrid type prism portions 21B, 21C and 21D is indicated by a dot-dash line to compare the hybrid type prism portions 21B, 21C and 21D with the hybrid type prism portions 19B, 19C and 19D based on the third embodiment respectively.

The incident angles satisfy the relationship a15>a16>a17>a18>a19. Therefore, a most-end portion of the Fresnel lens 18 is placed in an upper direction (or above in FIG. 14) of the hybrid type prism portion 19A, and an optical axis of the Fresnel lens 18 is placed in a lower direction (or below in FIG. 14) of the refraction type prism portion 19E.

The hybrid type prism portion based on the first embodiment is arranged in each of pitch areas ranging from the most-end portion of the Fresnel lens 18 to the hybrid type prism portion 19A, and the refraction type prism portion based on the prior art is arranged in each of pitch areas ranging from the refraction type prism portion 19E to the optical axis of the Fresnel lens 18.

In the Fresnel lens 18 shown in FIG. 14, an area of each of the incident planes 19B-1 to 19D-1 placed in pitch areas corresponding to incident angles (or a characteristic changing region) neighboring to the characteristic changing angle "a0" is slightly decreased while maintaining a prescribed angle of the incident plane to the ray of incident light, and the area of each of the incident planes 19B-2 to 19D-2 placed in the pitch areas corresponding to the incident angles neighboring to the characteristic changing angle "a0" is slightly increased while maintaining a prescribed angle of the incident plane to the ray of incident light.

In other words, in FIG. 14, the areas of the incident planes 19B-1 to 19D-1 satisfy the relationship of incident plane 19B-1>incident plane 19C-1>incident plane 19D-1, and the areas of the incident planes 19B-2 to 19D-2 satisfy the relationship of incident plane 19B-2>incident plane 19C-2>incident plane 19D-2. As the incident angle is decreased in the order of "a16", "a17" and "a18", the area of the incident plane of the total reflection type prism portion of the hybrid type prism portion is slightly decreased in the order of the incident plane 19B-1, the incident plane 19C-1 and the incident plane 19D-1, and the area of the incident plane of the refraction type prism portion of the hybrid type prism portion is slightly increased in the order of the incident plane 19B-2, the incident plane 19C-2 and the incident plane 19D-2.

In short, in cases where the characteristic changing angle "a0" is placed between the incident angle "a16" and the incident angle "a18" (that is, three pitch areas corresponding to the incident angles "a16" to "a18" denote pitch areas of the characteristic changing region), as the incident angle is decreased in the order of "a16", "a17" and "a18", the areas of the incident planes 19B-1 to 19D-1 are slightly decreased step by step in that order, and the areas of the incident planes 19B-2 to 19D-2 are slightly increased step by step in that order.

In this case, because the prism portion of the Fresnel lens 18 is changed step by step from the hybrid type prism portion 19A to the refraction type prism portion 19E through the hybrid type prism portions 19B to 19D, the transmissivity of the Fresnel lens 18 in the neighborhood of the characteristic changing angle "a0" can be smoothly changed.

Here, it is preferred that the prescribed angles of the incident planes 19B-1 to 19D-1 and the incident planes 19B-2 to 19D-2 to the rays of incident light Li18 to Li20 are determined according to specifications of the Fresnel lens 18.

Also, for example, it is preferred that the incident planes 19B-1 to 19D-1 are slightly decreased step by step in parallel to the incident planes 21B-2 to 21D-2 of the hybrid type prism portion 21B to 21D respectively (refer to blank arrows in FIG. 14) to slightly increase the incident planes 19B-2 to 19D-2 by using the incident planes of the hybrid type prism portions 21B to 21D as the incident planes 19B-2 to 19D-2.

In this embodiment, the three hybrid type prism portions 19B to 19D are used as the intermediary prism portions.

However, the number of intermediary prism portions (that is, the number of pitch areas of the characteristic changing region) is not restricted.

Also, either a degree of the slight decrease of the areas of the incident planes 19B-1 to 19D-1 or a degree of the slight increase of the areas of the incident planes 19B-2 to 19D-2 is not restricted, and it is preferred that the degree of the slight decrease and the degree of the slight increase are determined so as to improve the transmissivity of the Fresnel lens 18.

As is described above, in the third embodiment, the characteristic changing angle "a0" is used as a boundary, the hybrid type prism portion is arranged in the Fresnel lens 18 for each pitch area corresponding to the incident angle larger than (or equal to or larger than) the characteristic changing angle "a0", and the refraction type prism portion is arranged in the Fresnel lens 18 for each pitch area corresponding to the incident angle equal to or smaller than (or smaller than) the characteristic changing angle "a0". Accordingly, the transmissivity of the Fresnel lens 10 in the region of the small incident angles can be improved.

Also, in the third embodiment, the mixing ratio of the refraction type prism portions 16C to 16F to the hybrid type prism portions 15C to 15H is increased in correspondence to the decrease of the incident angle in the pitch areas of the characteristic changing region neighboring to the characteristic changing angle "a0". Accordingly, the transmissivity of the Fresnel lens 14 in the region of the small incident angles can be improved, and the transmissivity of the Fresnel lens 14 in the neighborhood of the characteristic changing angle "a0" can be smoothly changed.

In addition, in the third embodiment, in the neighborhood of the characteristic changing angle "a0", as the incident angle is decreased, the areas of the incident planes 19B-1 to 19D-1 are slightly decreased in that order, the areas of the incident planes 19B-2 to 19D-2 are slightly increased in that order, and the Fresnel lens 18 comprises the hybrid type prism potions 19B to 19D having the incident planes 19B-1 to 19D-1 and the incident planes 19B-2 to 19D-2. Accordingly, the transmissivity of the Fresnel lens 18 in the region of the small incident angles can be improved, and the transmissivity of the Fresnel lens 18 in the neighborhood of the characteristic changing angle "a0" can be smoothly changed.

Here, it is applicable that the third embodiment be applied to the second embodiment.

EMBODIMENT 4

In a fourth embodiment, optimum values of the top blade angle β and the outgoing angle "f" in the hybrid type prism portion 2 described in the first embodiment will be described.

Initially, an optimum value of the top blade angle β between the incident plane 4B and the total reflection plane 4C is described.

Figure 15:
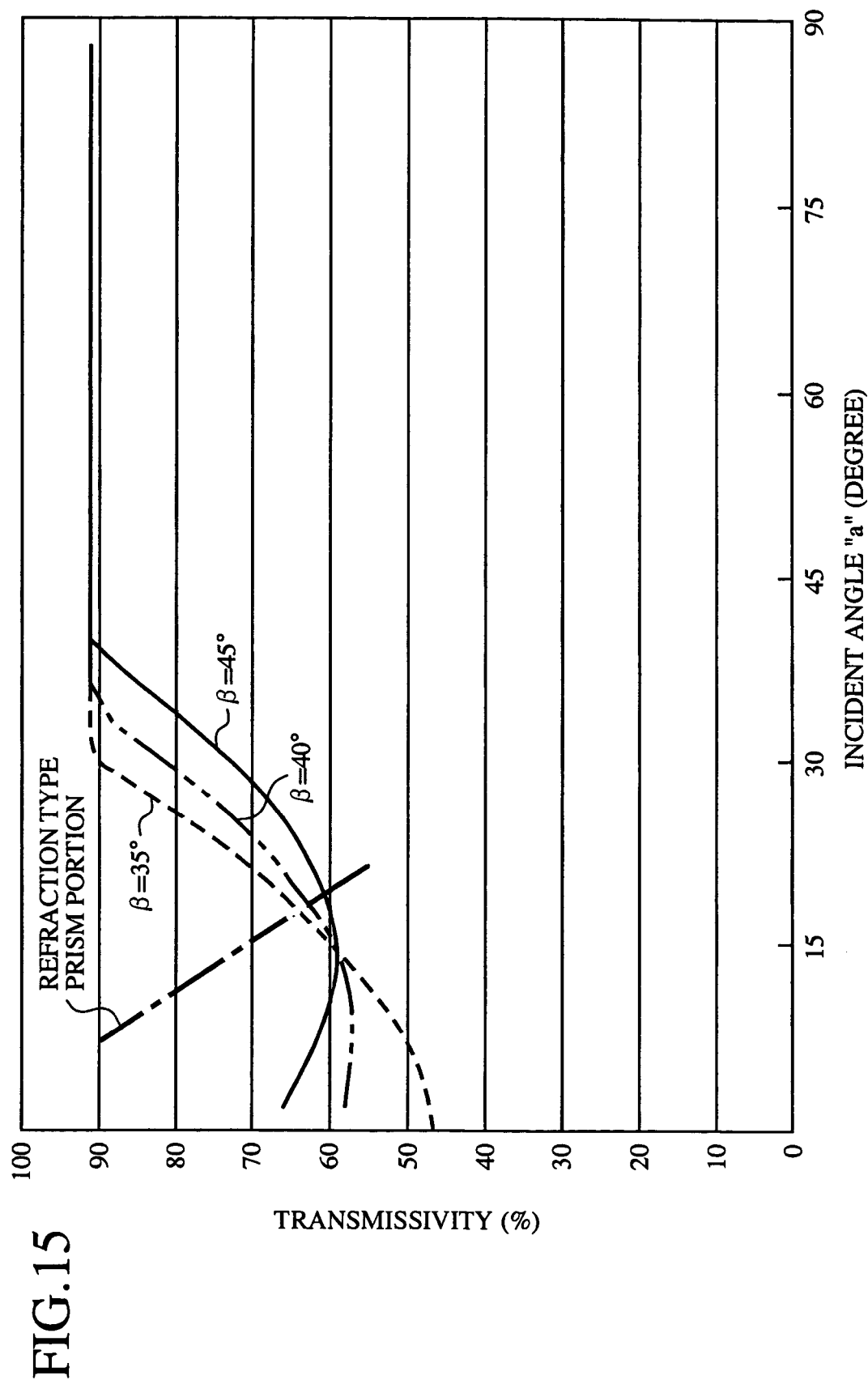
FIG. 15 is a view showing the transmissivity of the hybrid type prism portion in case of top blade angles β set to 45 degrees, 40 degrees and 35 degrees.

FIG. 15 is a view showing the transmissivity Tall of the hybrid type prism portion 2 in case of the top blade angle β set to 45 degrees (solid line), the top blade angle β set to 40 degrees (two-dot-dash line) and the top blade angle β set to 35 degrees (broken line).

As compared with the case of β=45 degrees (the case shown in FIG. 8), in the region of the large incident angle "a" larger than about 40 degrees, the transmissivity at the top blade angle β=40 degrees and the transmissivity at the top blade angle β=35 degrees are the same as that at the top blade angle β=45 degrees and are equal to or higher than 90%.

However, the transmissivity at the top blade angle β=45 degrees is decreased with the decrease of the incident angle "a" in a region of the incident angle "a" equal to or smaller than about 40 degrees. In contrast, as compared with the case of β=45 degrees, it is realized in FIG. 15 that the transmissivity Tall at the top blade angle β=40 degrees is high and is equal to or higher than 90% in a range of the incident angle "a" from 40 degrees to about 35 degrees. Also, in case of the top blade angle β=35 degrees, the transmissivity Tall is further high, and a high transmissivity region is widened toward the incident angle "a" of about 30 degrees.

In short, in the region of the incident angles "a" equal to or smaller than about 40 degrees, in cases where the top blade angle β is set as small as possible, the dependence of the transmissivity Tall on the incident angle can be reduced, and the high transmissivity of the hybrid type prism portion 2 can be obtained in a wide range of the incident angle.

Here, as shown in FIG. 15, the top blade angle β is set to 40 degrees or 35 degrees, the transmissivity is reduced to 60% or less in a region of the incident angles "a" equal to or smaller than about 15 degrees. However, in cases where the top blade angle β is, for example, set to 45 degrees in the hybrid type prism portions 2 corresponding to the region of the incident angles "a" equal to or smaller than about 15 degrees, the top blade angle β set to 45 degrees can prevent the reduction of the transmissivity.

In detail, at the incident angle "a" equal to about 15 degrees, the transmissivity for the top blade angle β set to 40 degrees is equal to the transmissivity for the top blade angle β set to 45 degrees, and a high and low relationship between the transmissivity for the top blade angle β set to 40 degrees and the transmissivity for the top blade angle set to 45 degrees at the incident angle "a" larger than about 15 degrees is inverse to that at the incident angle "a" smaller than about 15 degrees.

Therefore, the hybrid type prism portion 2 having the top blade angle set to 40 degrees is arranged in the region of the incident angles "a" ranging from 15 degrees to 90 degrees, and the hybrid type prism portion 2 having the top blade angle β set to 45 degrees is arranged in the region of the incident angles "a" ranging from 0 degree to 15 degrees. Accordingly, a transmissivity set by combining the transmissivity characteristic (two-dot dash line in FIG. 15) at the top blade angle β set to 40 degrees in the region of the incident angles "a" ranging from 15 degrees to 90 degrees and the transmissivity characteristic (solid line in FIG. 15) at the top blade angle β set to 45 degrees in the region of the incident angles "a" ranging from 0 degree to 15 degrees can be obtained.

Also, it is preferred that the reduction of the transmissivity is prevented by using the method described in the third embodiment. In this case, a transmissivity set by combining the transmissivity characteristic (dot-dash line in FIG. 15) of the refraction type prism portion and the transmissivity characteristic of the hybrid type prism portion at the top blade angle β set to 40 degrees is, for example, obtained.

Therefore, in cases where the Fresnel lens 1 based on the first embodiment is designed, it is preferred that the top blade angle of the hybrid type prism portion 2 is set as acute as possible in correspondence to the value of the incident angle. However, in cases where the top blade angle β is excessively set to a small value, an angle between the incident plane 4B and the outgoing plane 5 in FIG. 7 is changed to an obtuse angle in case of a large incident angle "a", the hybrid type prism portion 2 undesirably has a shape in which it is impossible to take off a forming mold (or a lens forming mold) from the Fresnel lens 1 in the manufacturing of the Fresnel lens 1. Therefore, the top blade angle β of the hybrid type prism portion 2 is set to an optimim value in correspondence to the value of the incident angle while considering the taking-off of the forming mold.

In other words, the top blade angle β of the hybrid type prism portion 2 is set as acute as possible (or set to an acutest angle) in a range in which the acute top blade angle does not adversely influence on the manufacturing of the Fresnel lens 1, and the transmissivity of the Fresnel lens 1 can be further improved. Also, in an incident angle region in which the transmissivity at the top blade angle β set to a value other than that of the acutest angle is higher than the transmissivity at the top blade angle β set to the value of the acutest angle, the top blade angle β is set to a value larger than that of the acutest angle. Therefore, a high transmissivity of the hybrid type prism portion 2 can be obtained over the entire region of the incident angles.

Next, an optimum value of the outgoing angle "f" of the ray of outgoing light in the hybrid type prism portion 2 is described.

Figure 16:
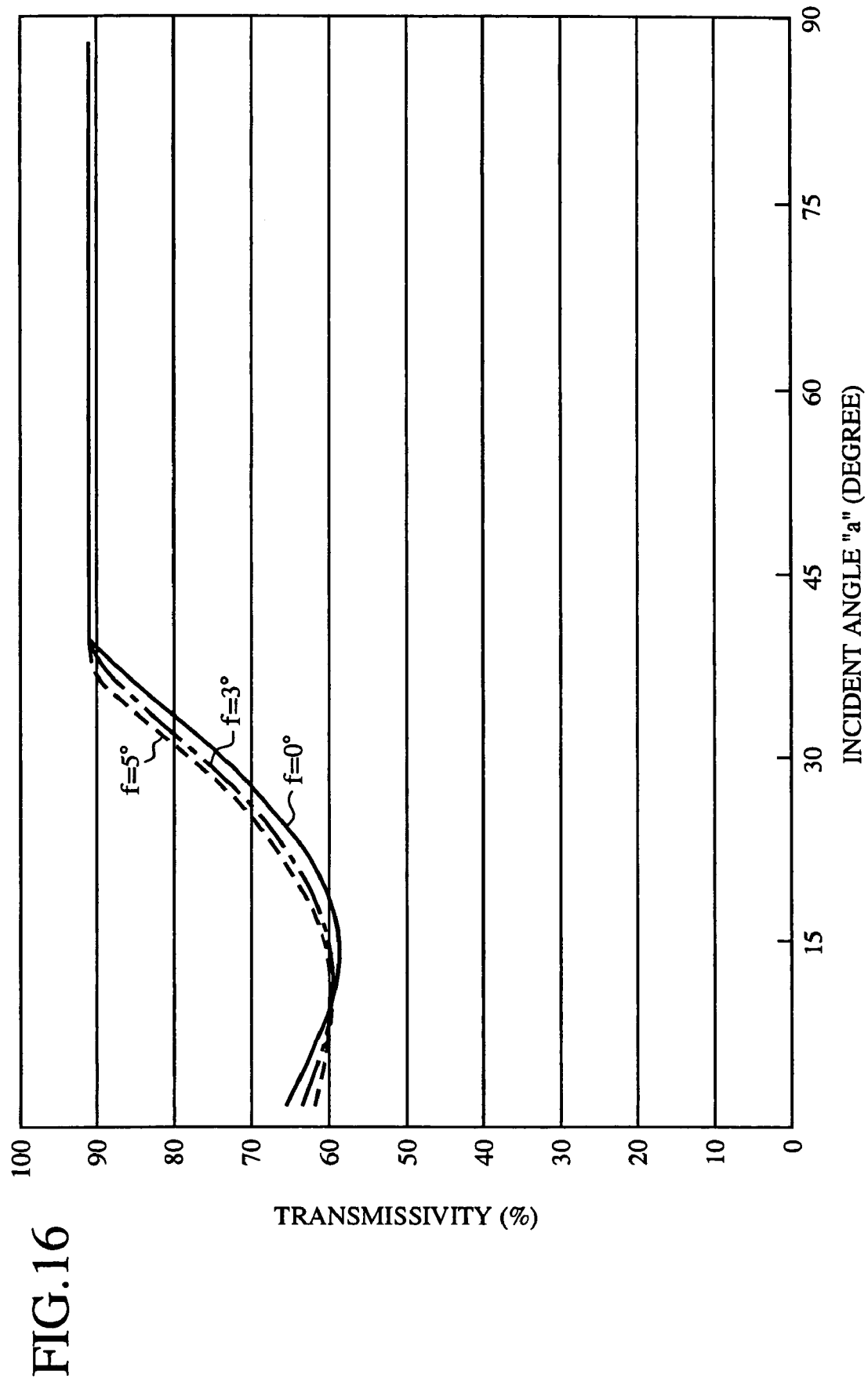
FIG. 16 is a view showing the transmissivity of the hybrid type prism portion in case of outgoing angles "f" set to 0 degree, 3 degrees and 5 degrees.

FIG. 16 is a view showing the transmissivity Tall of the hybrid type prism portion 2 in case of the outgoing angle "f" set to 0 degree (solid line), the outgoing angle "f" set to 3 degrees (two-dot dash line) and the outgoing angle "f" set to 5 degrees (broken line).

As shown in FIG. 16, the transmissivity at the outgoing angle "f" set to 0 degree, the transmissivity at the outgoing angle "f" set to 3 degrees and the transmissivity at the outgoing angle "f" set to 5 degrees are the same as each other and are equal to or higher than 90% in the region of the large incident angles higher than about 40 degrees. In contrast, in the region of the small incident angles equal to or smaller than about 40 degrees, the transmissivity at the outgoing angle "f" set to 3 degrees is improved as compared with the transmissivity at the outgoing angle "f" set to 0 degree, and the transmissivity at the outgoing angle "f" set to 5 degrees is improved as compared with the transmissivity at the outgoing angle "f" set to 3 degrees.

Accordingly, the transmissivity Tall of the hybrid type prism portion 2 can be improved by enlarging the outgoing angle "f" in the region of the small incident angles.

Also, following effects can be obtained by enlarging the outgoing angle "f" in the region of the small incident angles.

FIG. 17A and FIG. 17B are views respectively showing the configuration of an image displaying device in which the Fresnel lens 1 is applied to a screen. FIG. 17A is a constitutional view of the image displaying device seen from a side, and FIG. 17B is a front view of the image displaying device. Each arrow denotes a ray of light.

Figure 31:
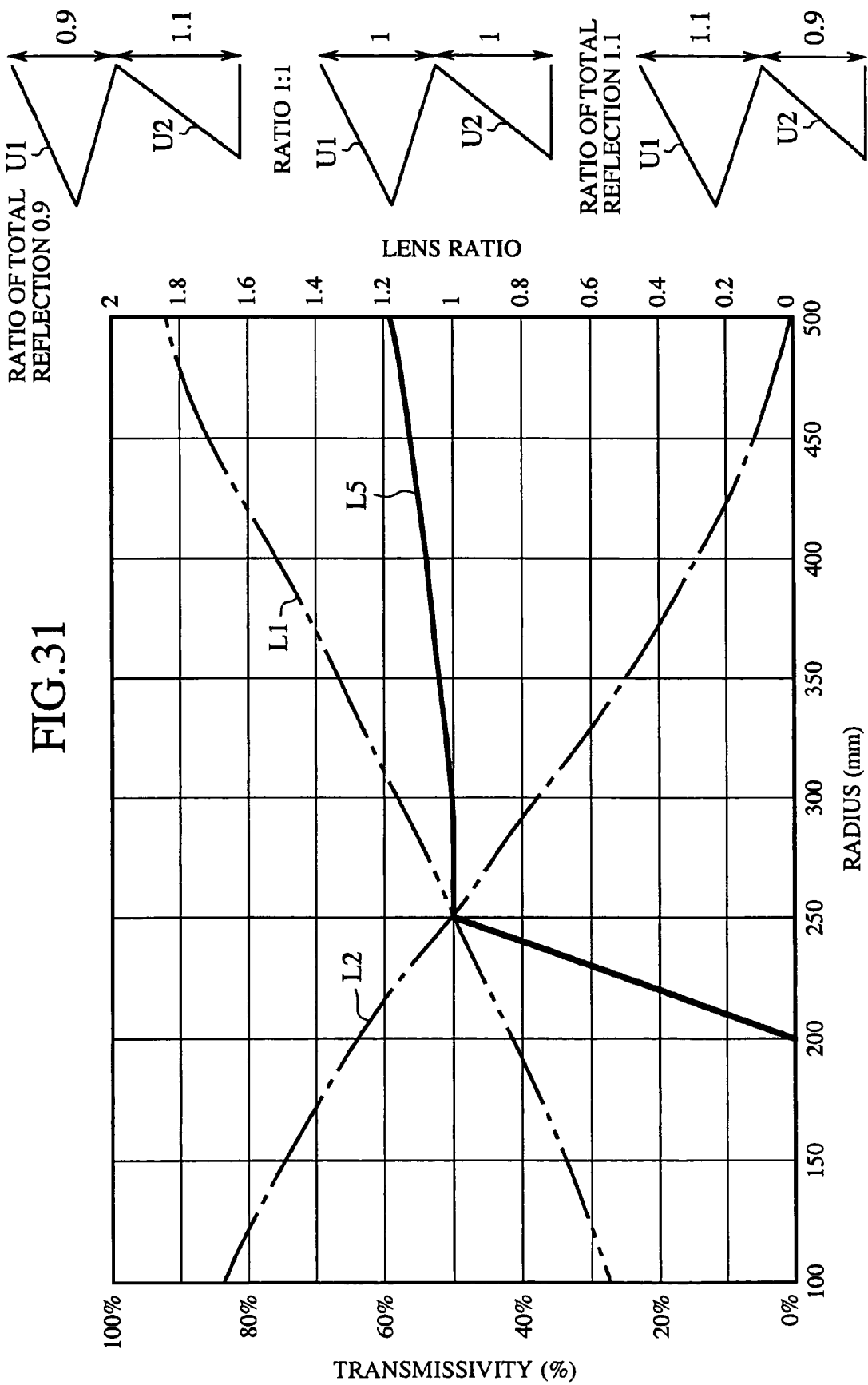
FIG. 31 is a view showing a lens ratio of a total reflection type prism portion to the Fresnel lens 110 shown in FIG. 30.

In FIG. 17A, 31 indicates a light emitting source (or illumination light source means) for emitting a plurality of rays of light. 32 indicates a parabolic mirror (or illumination light source means). The light emitting source 31 is disposed on a focal point of the parabolic mirror 32. 33 indicates a converging lens (or converging optics means) for converging a plurality of rays of light reflected on the parabolic mirror 32. 34 indicates a light bulb (or optical modulating means) formed of liquid crystal. An intensity of each ray of light converged by the converging lens 33 is spatially changed in the light bulb 34 to modulate the converged rays of light.

35 indicates a projection optics lens (or projection optics means) for forming an image from the rays of light of which the intensities are changed for the modulation by the light bulb 34. 36 indicates a rear projection type screen for receiving the image of the rays of light formed by the projection optics lens 35 from the rear side and displaying the image. The rays of light spreading in the projection optics lens 35 are changed in the screen 36 to a plurality of rays of light parallel to each other, the image formed from the rays of light is displayed on the screen 36, and the rays of light are diffused from the screen 36 to a wide area. Therefore, the screen 36 has a function for widening a view field.

In the screen 36, 37 indicates a Fresnel lens described in each embodiment, and 38 indicates a lenticular.

In the Fresnel lens 37, the spreading rays of light sent from the projection optics lens 35 are received according to the function of the Fresnel lens 37 described in each embodiment, and the rays of light go out at a prescribed outgoing angle through a plurality of prism portions of a plurality of pitch areas. In short, the Fresnel lens 37 is used to almost collimate the rays of light spreading in the projection optics lens 35. An image is formed on the lenticular 38 from the rays of light going out from the Fresnel lens 37, and the rays of light are diffused from the lenticular 38.

39 and 40 respectively indicate an optical axis. The optical axis 39 exists for the parabolic mirror 32, the converging lens 33 and the light bulb 34. The optical axis 40 exists for the projection optics lens 35, the Fresnel lens 37 and the lenticular 38, and the optical axis 40 is perpendicular to the outgoing plane of the Fresnel lens 37.

The optical axis 39 and the optical axis 40 do not intersect each other, and the optical axis 39 and the optical axis 40 are independent of each other so as to set an angle between the optical axis 39 and the optical axis 40 to an optimum setting angle depending on the light bulb 34. In other words, the parabolic mirror 32, the converging lens 33 and the light bulb 34 having the same optical axis 39 are arranged so as to shift the center of the parabolic mirror 32, the converging lens 33 and the light bulb 34 from the optical axis 40.

The image displaying device having an optical system shown in FIG. 17A has a front view shown in FIG. 17B. The constituent elements, which are the same as those shown in FIG. 17A, are indicated by the same reference numerals as those of the constituent elements shown in FIG. 17A.

In FIG. 17B, 41 indicates a body of the image displaying device. 42 indicates a plurality of ring bands of each hybrid type prism portion arranged in the Fresnel lens 37. The ring bands 42 are shown to express the relationship of the ring bands 42 to the screen 36. 43 indicates a skirt portion of the image displaying device 41. The parabolic mirror 32, the converging lens 33 and the light bulb 34 are arranged in the skirt portion 43.

Figure 1:
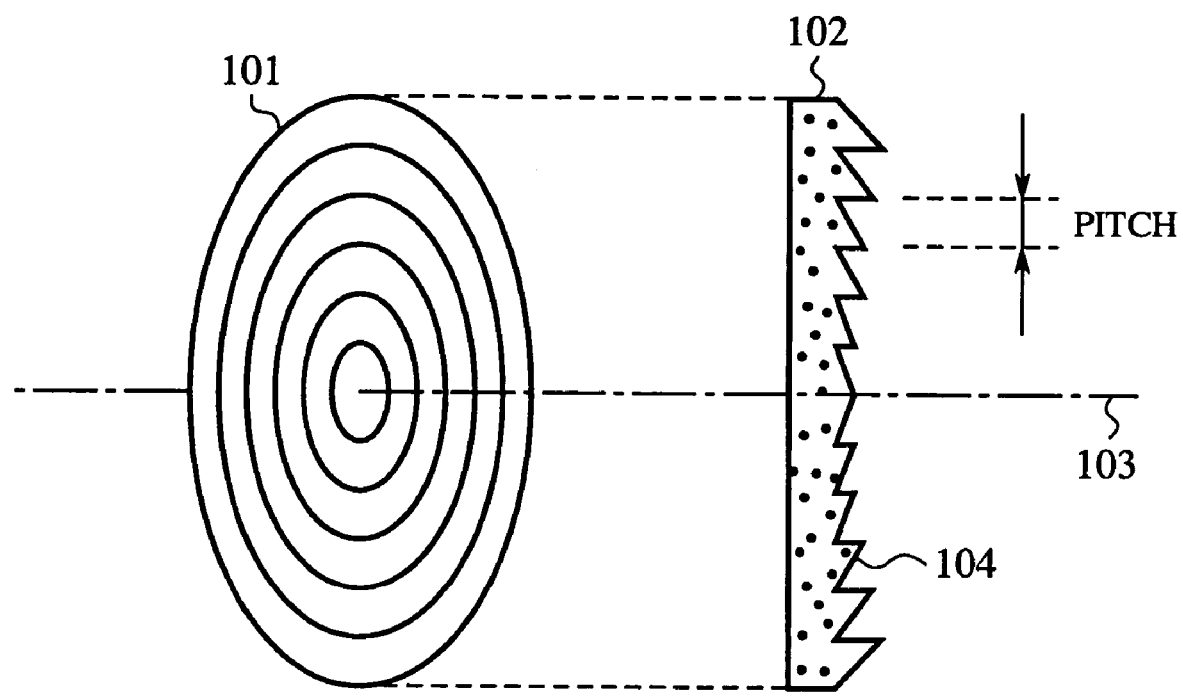
FIG. 1 is a view showing an external appearance of a conventional Fresnel lens.
Figure 2:
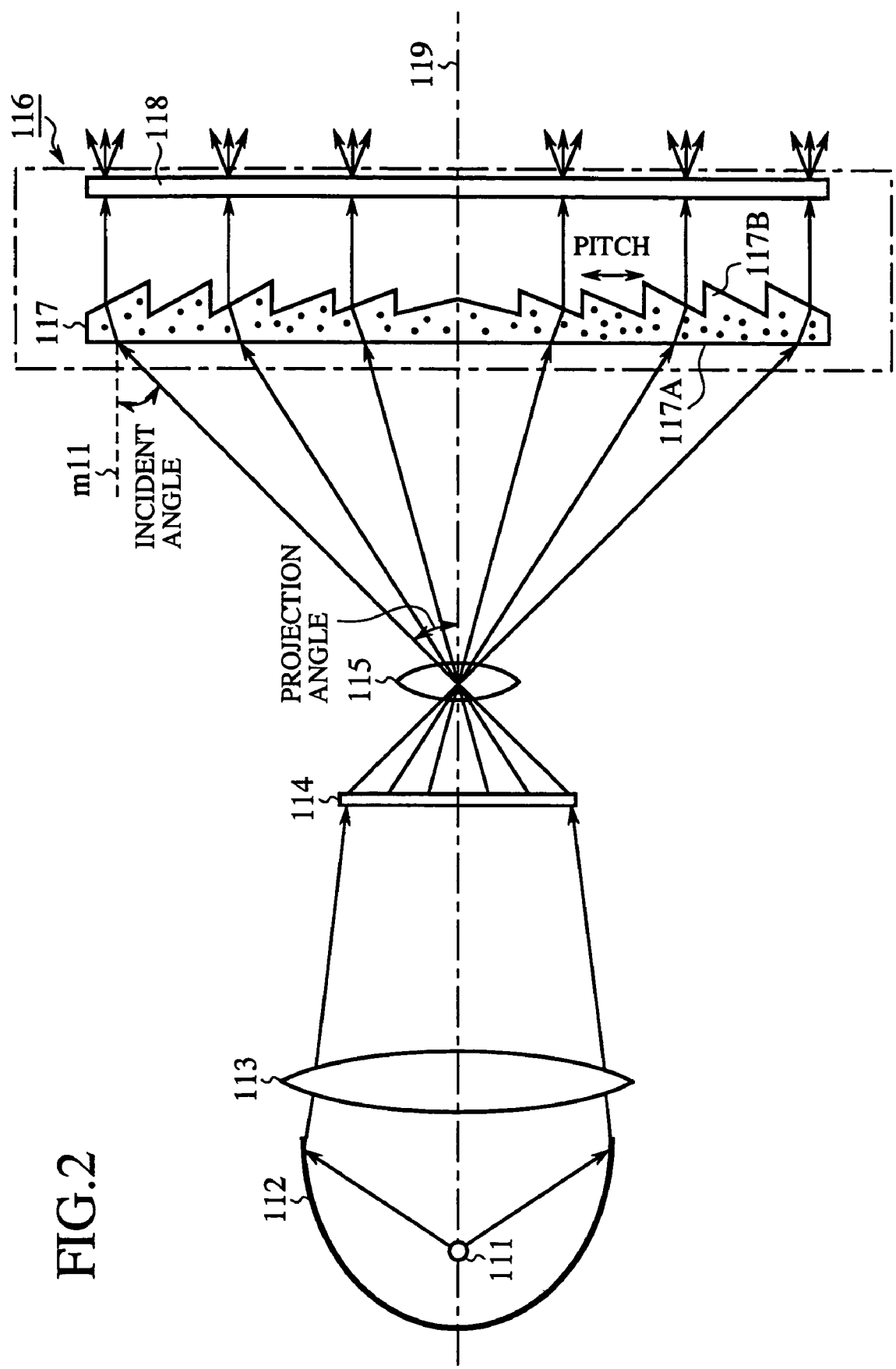
FIG. 2 is a view showing the configuration of an image displaying device in which the conventional Fresnel lens is applied to a screen.
Figure 3A:
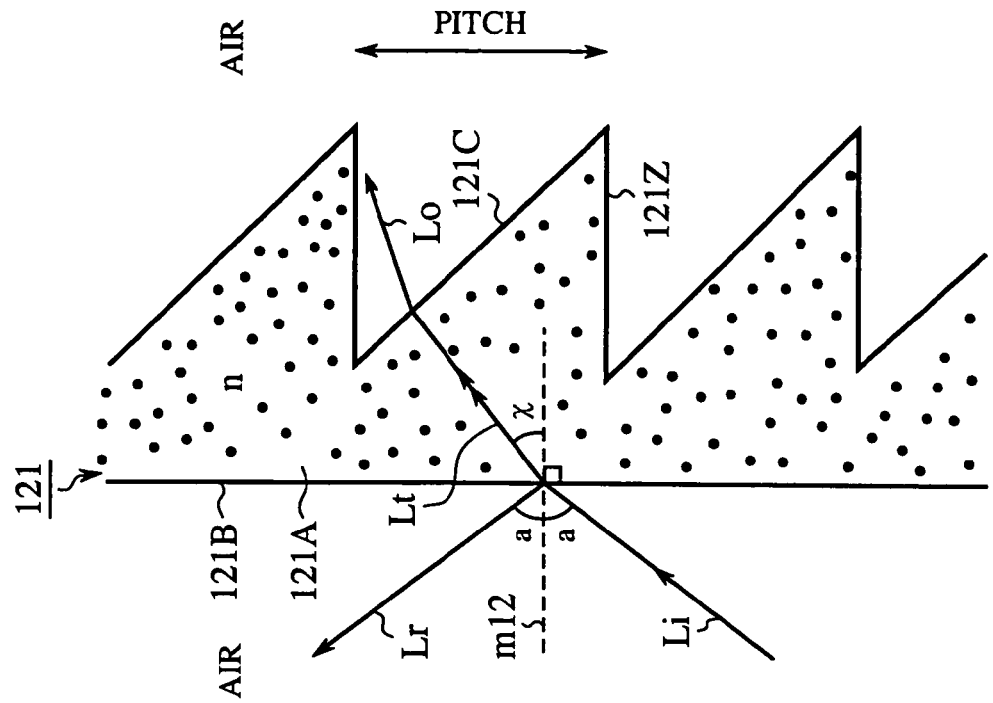
FIG. 3A and FIG. 3B are enlarged views respectively showing a sectional shape of a plurality of prism portions arranged in a plurality of pitch areas of the conventional Fresnel lens.
Figure 3B:
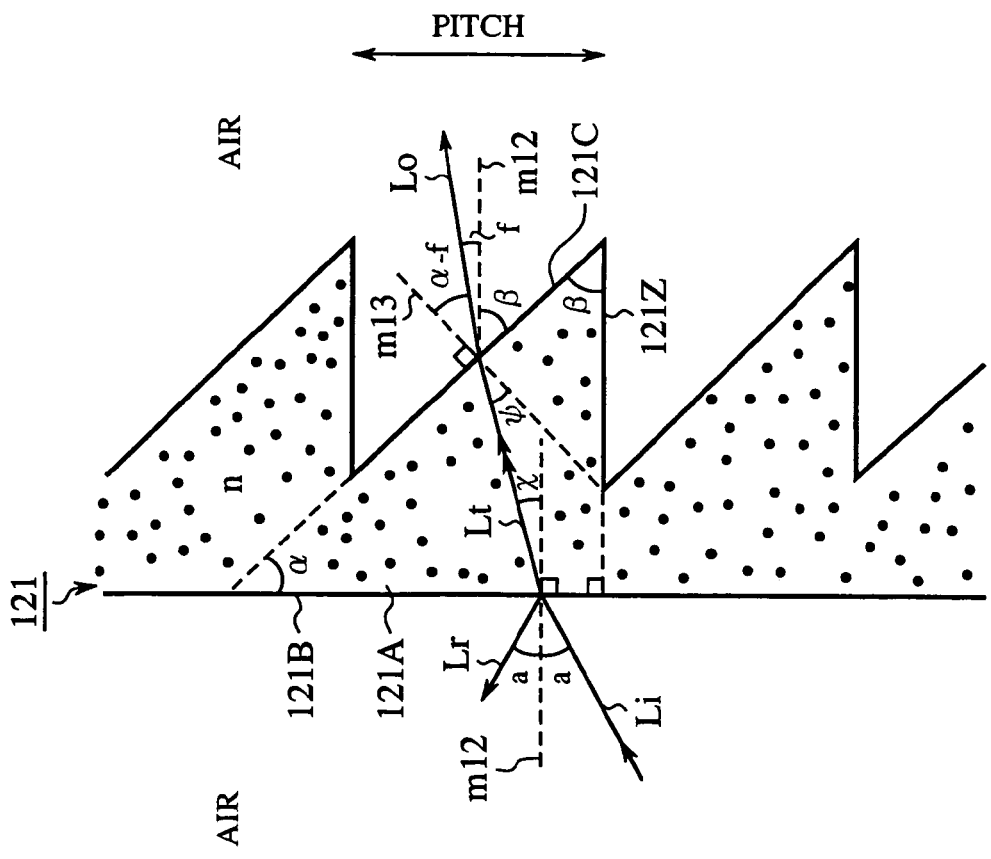

The image displaying device 41 is operated in the same manner as that in the image displaying device shown in FIG. 2 except that rays of light are projected from the light bulb 34 having the center shifted from the optical axis 40 to the screen 36, and the function and operation of the Fresnel lens 37 has been already described above. Therefore, the description of the operation of the image displaying device 41 is omitted.

Even-numbered image displaying devices 41 respectively having the above-described structure are prepared, and a group of even-numbered image displaying devices 41 having a multiple-structure shown in FIG. 18 is often used.

FIG. 18A, FIG. 18B and FIG. 18C are views explaining a method of optimizing the outgoing angle of a ray of outgoing light, and a multiple-structure of two image displaying devices 41 is shown. FIG. 18A is a sectional shape of a Fresnel lens of which the outgoing angle is optimized.

FIG. 18B is a front view of a screen having the Fresnel lens shown in FIG. 18A. FIG. 18C is a view showing the relationship between the image displaying devices 41 having the multiple-structure and a user.

In FIG. 18A, FIG. 18B and FIG. 18C, 36A and 36B indicate a plurality of screens respectively. 37A and 37B indicate a plurality of Fresnel lenses respectively. 38A and 38B indicate a plurality of lenticulars respectively. 40A and 40B indicate a plurality of optical axes of the Fresnel lenses 37A and 37B respectively. 41A and 41B respectively indicate the image displaying device shown in FIG. 17A and FIG. 17B. 42A indicates a ring band of the Fresnel lens 37A, and 42B indicates a ring band of the Fresnel lense 37B. 43A and 43B indicate a plurality of skirt portions of the image displaying devices 41A and 41B. Each of the Fresnel lenses 37A and 37B is formed in a rectangular shape to have four sides, the ring band 42A selected from a plurality of ring bands intersects only one side closest to the optical axis 40A among the four sides of the Fresnel lens 37A and denotes a boundary ring band, and the ring band 42B selected from a plurality of ring bands intersects only one side closest to the optical axis 40B among the four sides of the Fresnel lens 37B and denotes a boundary ring band. In this case, it is admitted that the optical axis 40A is not placed on the side of the Fresnel lens 37A closest to the optical axis 40A, and it is admitted that the optical axis 40B is not placed on the side of the Fresnel lens 37B closest to the optical axis 40B. The ring bands 42A and 42B are determined according to view field characteristics and transmissivity of the screens 36A and 36B respectively.

The image displaying device shown in FIG. 18A, FIG. 18B and FIG. 18C is formed to have a multiplex-structure by making the image displaying device 41A up-side down to place the skirt portion 43A on the upper side and connecting the upper side of the screen 36B of the image displaying device 41B having the skirt portion 43B on the lower side and the upper side of the screen 36A of the image displaying device 41A. Therefore, one image is divided into two, the two divided images are provided for the image displaying devices 41A and 41B respectively, the two divided images integrally formed with each other are displayed on the image displaying devices 41A and 41B as one image. Accordingly, a further large-sized image can be displayed.

44 indicates a user of the image displaying devices 41A and 41B. 45 indicates an angle of view field. Also, Lo3A to Lo7A denote a plurality of rays of outgoing light going out from the pitch areas of the Fresnel lens 37A respectively, and Lo3B to Lo7B denote a plurality of rays of outgoing light going out from the pitch areas of the Fresnel lens 37B respectively. The rays of outgoing light Lo3A to Lo7A are arranged in the order of becoming more distant from the optical axis 40A, and the rays of outgoing light Lo3B to Lo7B are arranged in the order of becoming more distant from the optical axis 40B. As a ray of outgoing light near to the optical axis 40A or 40B, or a ray of outgoing light placed on the inner side (or on the side of the optical axis 40A or 40B) of the ring band 42A or 42B, approaches the optical axis 40A or 40B, the ray of outgoing light is designed so as to go out at a larger outgoing angle.

As is shown in FIG. 18C, the user 44 views an integrally-formed image of the two image displaying devices 41A and 41B having the multiple-structure. In this case, in an image displaying device using a normal Fresnel lens, a plurality of rays of outgoing light going out from the Fresnel lens are parallel to the optical axis. Also, the lenticulars 38A and 38B have view field characteristics. Therefore, in cases where each ray of outgoing light is viewed in a propagation direction of a main ray of outgoing light, the ray of outgoing light is most bright. In contrast, as each ray of outgoing light is viewed in a direction inclined from the propagation direction of the main ray of outgoing light, the ray of outgoing light is darkened. Therefore, because an angle of view field for rays of outgoing light near to the skirt portion 43A or 43B is large and because the user 44 views each ray of outgoing light in a direction deeply inclined from the propagation direction of the main ray of outgoing light going out in a direction normal to the screen according to the angle of view field, the brightness of the rays of outgoing light near to the skirt portion 43A or 43B is usually reduced.

However, in the Fresnel lenses 37A and 37B based on the fourth embodiment, as a pitch area for a ray of outgoing light approaches the optical axis 40A or 40B, or as an incident angle for a pitch area corresponding to a ray of outgoing light becomes smaller, the outgoing angle set for the ray of outgoing light becomes larger (a maximum outgoing angle is set for the rays of outgoing light Lo3A and Lo3B). Therefore, because a main ray of the outgoing light is directed toward the user 44, a light quantity attenuation based on the view field characteristics of the lenticulars 38A and 38B can be reduced. Also, the reduction of the light quantity attenuation compensates for the reduction of the transmissivity of the prism portions near to the skirt portions 43A or 43B, and the outgoing angles for the rays of outgoing light Lo3A to Lo7A and the rays of outgoing light Lo3B to Lo7B can be suitably optimized so as to direct the rays of outgoing light at the angle of view field 45.

As is described above, in cases where the Fresnel lenses 37A and 37B are applied to the image displaying device having the multiple-structure, a bright image can be provided for the user.

Figure 19:
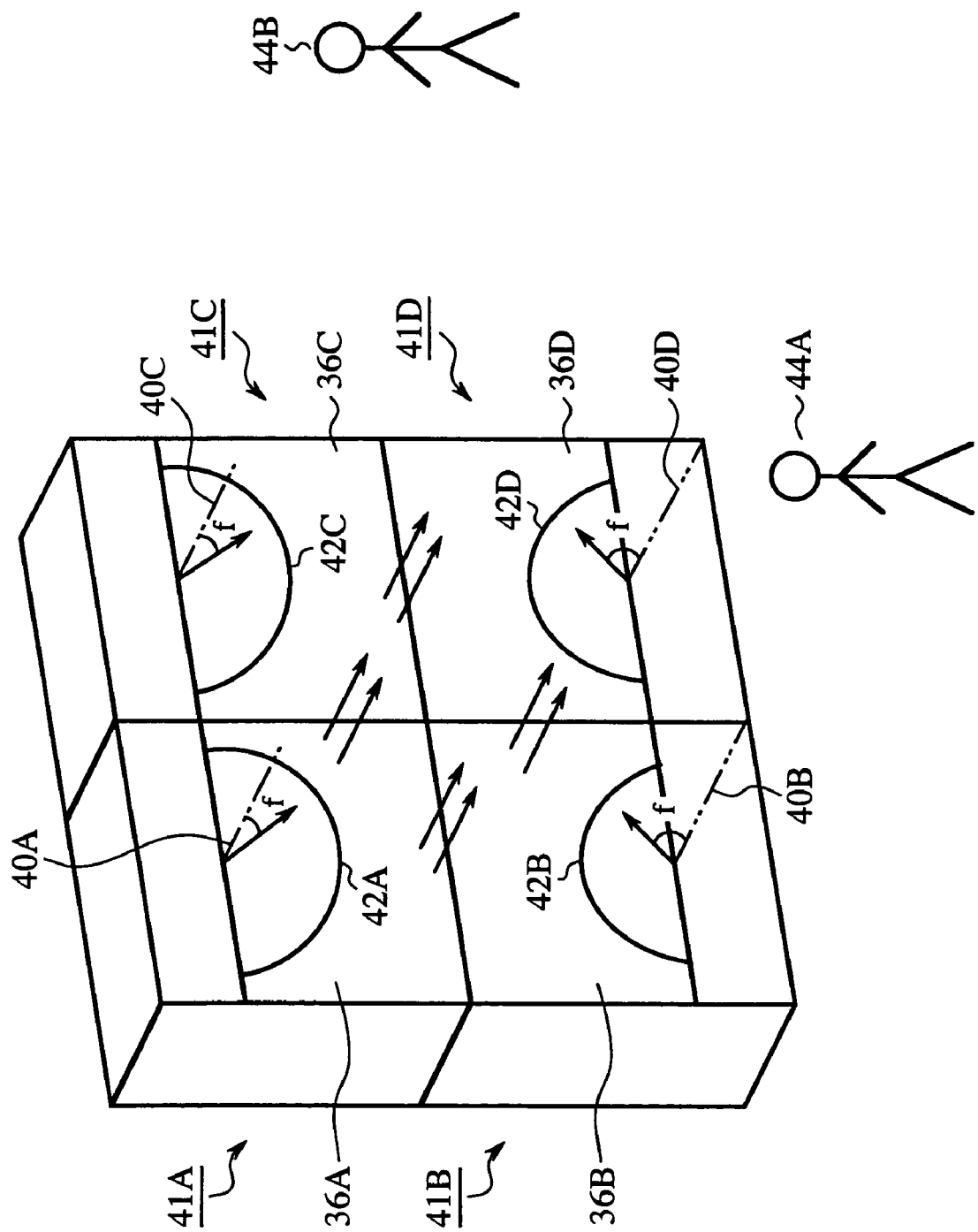
FIG. 19 is a view explaining a method of optimizing the outgoing angle of a ray of outgoing light.

Also, as shown in FIG. 19, in cases where a combination of four image displaying devices 41A, 41B, 41C and 41D is used as an image displaying device having a multiple-structure, the outgoing angles "f" of a plurality of rays of outgoing light going out from pitch areas placed on the inner side (or on the side of an optical axis 40A, 40B, 40C or 40D) of a ring band 42A, 42B, 42C or 42D are set to large values in the image displaying devices 41A, 41B, 41C and 41D. In detail, in the same manner as in FIG. 18A to FIG. 18C, the main rays in the rays of outgoing light going out from pitch areas placed on the inner side of the ring band 42A, 42B, 42C or 42D are directed toward the user 44A. Also, the rays of outgoing light going out from pitch areas placed on the outer side of the ring band 42A, 42B, 42C or 42D are set to be parallel to the optical axis 40A, 40B, 40C or 40D. In the same manner as the case in FIG. 18A to FIG. 18C, each of the ring bands 42A, 42B, 42C and 42D selected from a plurality of ring bands intersects only one side closest to the optical axis 40A, 40B, 40C or 40D among four sides of a rectangular-shaped Fresnel lens composing the screen 36A, 36B, 36C or 36D and denotes a boundary ring band. The ring bands 42A, 42B, 42C and 42D are determined according to view field characteristics and transmissivity of the screens 36A, 36B, 36C and 36D respectively.

In the neighborhood of boundaries among the screens 36A, 36B, 36C and 36D of the image displaying devices 41A, 41B, 41C and 41D integrally formed with each other, it is required to make main rays in the rays of outgoing light be parallel to the optical axis 40A, 40B, 40C or 40D. In detail, in cases where a user 44B views the screens 36A, 36B, 36C and 36D on a slant, the user 44B views boundary areas of each pair of screens adjacent to each other through a boundary on a slant at a certain angle of view field, and the brightness of images displayed on the boundary areas is reduced due to the light quantity attenuation based on the view field characteristics of the screens. However, because a degree of the light quantity attenuation in the boundary area of one screen is the same as that in the boundary area of the other screen, the unevenness of luminance in the boundary areas of each pair of screens adjacent to each other can be prevented, and the user 44B can view images of the screens having the uniform luminance. In addition, because the outgoing angles "f" of the rays of outgoing light going out from pitch areas placed on the inner side of the ring band 42A, 42B, 42C or 42D are set to large values, the luminance of the image lowered on the inner side of the ring band 42A, 42B, 42C or 42D can be improved, and the uniformity of the luminance of the image displayed on the screens 36A, 36B, 36C and 36D can be improved.

As is described above, a Fresnel lens is cut out in a rectangular shape in correspondence to a shape of each screen, a ring band intersecting only one side closest to the optical axis of each Fresnel lens among four sides of the Fresnel lens is set as a boundary ring band, a plurality of rays of outgoing light going out from a plurality of pitch areas placed on the optical axis side of each boundary ring band are set to large values, and a plurality of rays of outgoing light going out from a plurality of pitch areas placed on the lens outer-curcumferential side of each boundary ring band are set to be parallel to the optical axis of the Fresnel lens. Accordingly, in cases where a plurality of Fresnel lenses are applied to the screens of the image displaying device having a multiple-structure, the uniformity of the luminance of the image displayed on the screens can be improved.

As is apparent in FIG. 17A, FIG. 17B, FIG. 18A, FIG. 18B, FIG. 18C, and FIG. 19, it is preferred that a screen comprises the Fresnel lens described in each embodiment and an image forming and diffusing means such as a lenticular used to form an image from light and to diffuse the image. In this case, because projected rays of light at a wide image angle can be received on the screen at a high transmissivity while hardly depending on the incident angle, a screen displaying a large-sized image at a high transmissivity on condition of a specification of a predetermined thickness can be obtained.

Also, in cases where the Fresnel lens described in each embodiment is applied to the screen, it is preferred that the lenticular is integrally formed with the outgoing plane of the Fresnel lens. In this case, a screen having a reduced number of constituent parts can be obtained.

EMBODIMENT 5

Figure 20:
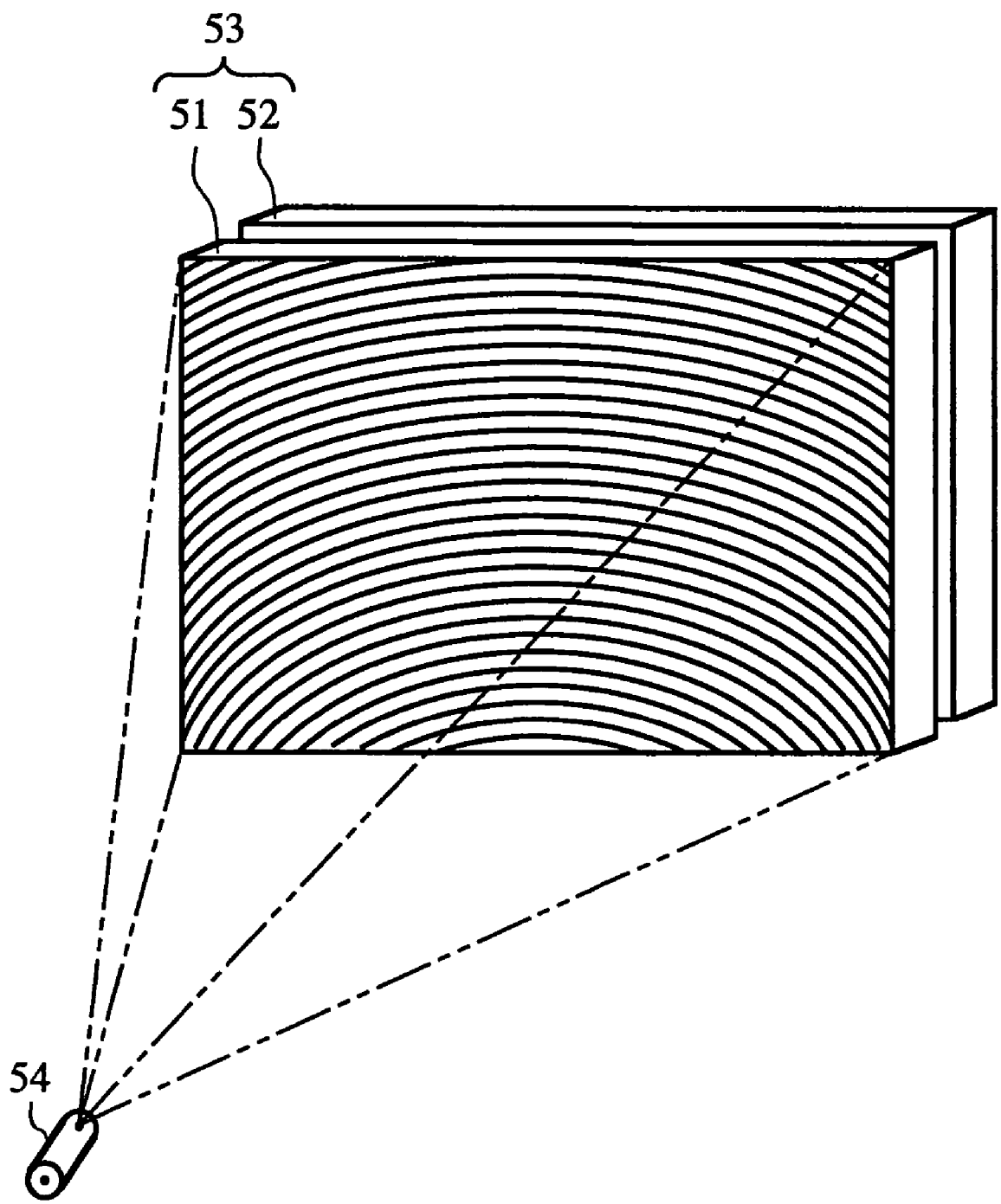
FIG. 20 is a view of the whole structure of a rear projection type image displaying device according to a fifth embodiment of the present invention.

FIG. 20 is a view of the whole structure of a rear projection type image displaying device according to a fifth embodiment of the present invention.

An image displaying device shown in FIG. 20 comprises a screen 53 and an image light source 54. The screen 53 comprises a Fresnel lens 51 and a diffusion plate 52. Rays of image light are injected from the image light source 54 to display an image on the screen 53. An aspect ratio in the screen 53 is set to 4:3, and a size of the screen 53 is set to 50 inches.

Figure 21:
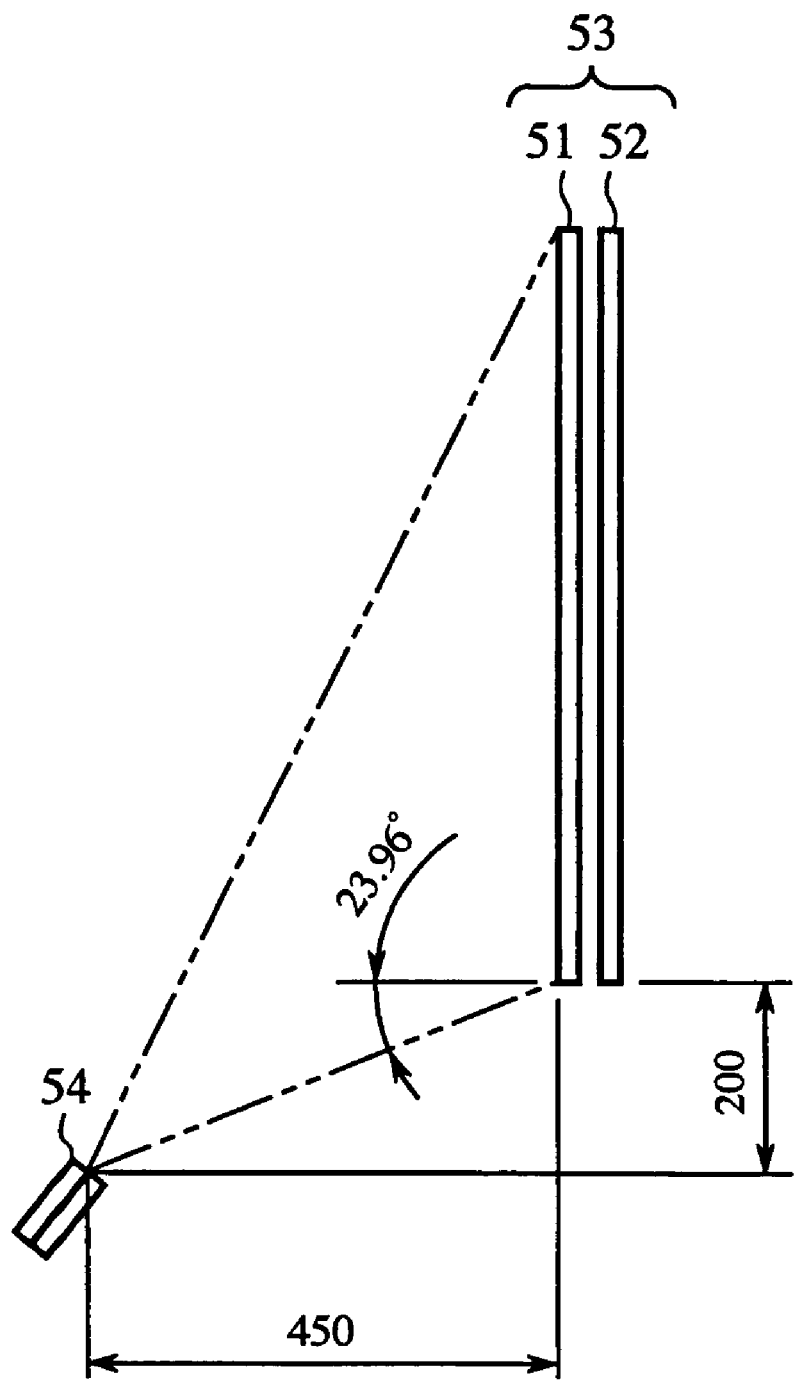
FIG. 21 is a view of the image displaying device shown in FIG. 20 seen from one side.

FIG. 21 is a view of the image displaying device shown in FIG. 20 seen from one side. The screen 53 is arranged so as to set a distance between the screen 53 and the image light source 54 in a horizontal direction to 450 mm and so as to set a distance between a bottom end of the screen 53 and the image light source 54 in a perpendicular direction to 200 mm.

The diffusion plate 52 has a lenticular lens and functions as a light diffusing means for diffusing the rays of image light to a prescribed area.

The Fresnel lens 51 is obtained by arranging a plurality of small unit-prism portions and is formed of a circular type Fresnel lens in which a plurality of unit-prism portions are concentrically arranged. The image light source 54 is disposed on a line which is perpendicular to the Fresnel lens 51 and extends from the center of concentric circles of the Fresnel lens 51, and a portion of an area specified by the concentric circles shifting from the center (called a Fresnel center) of the Fresnel lens 51 is used as the Fresnel lens 51 (refer to FIG. 20).

Figure 22:
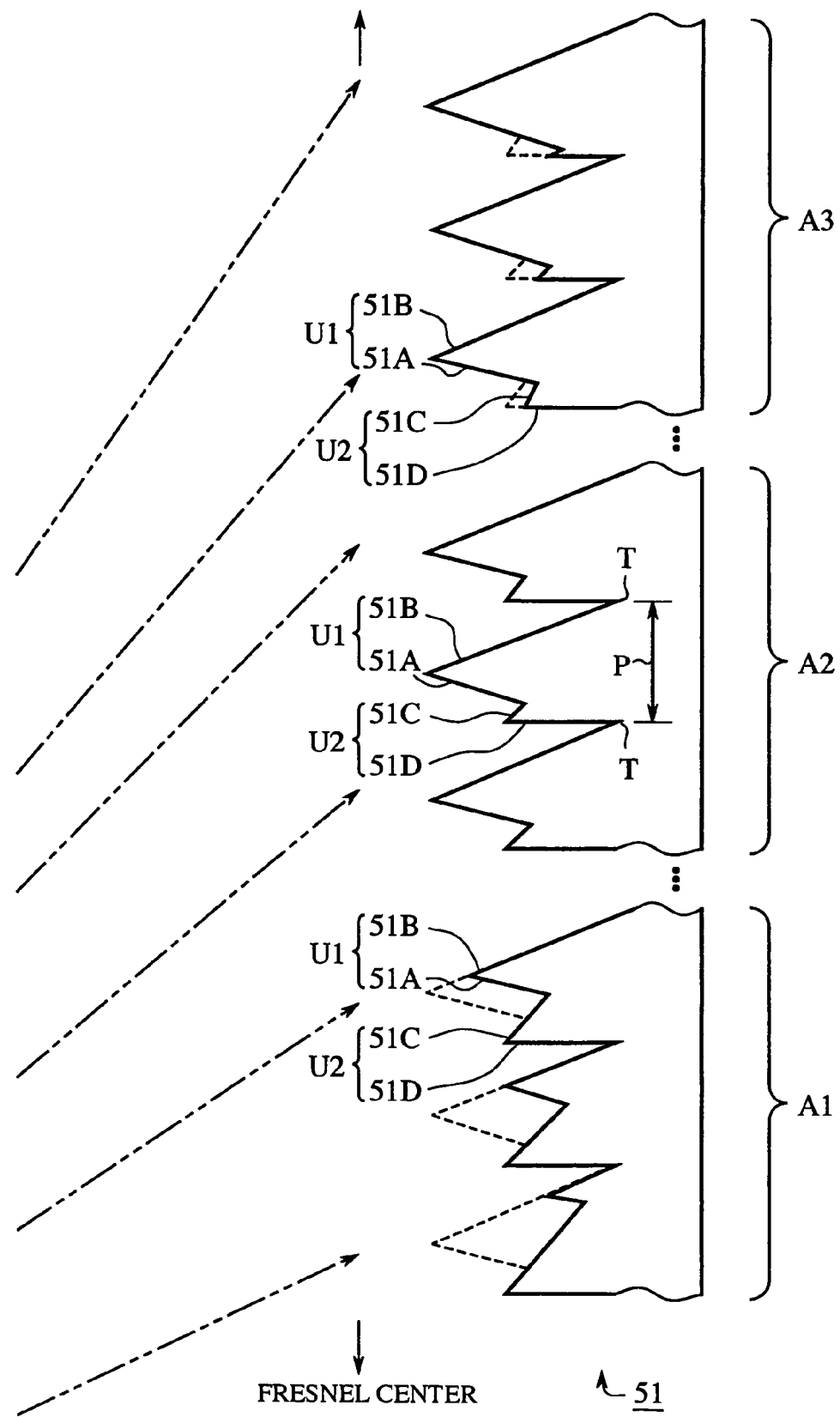
FIG. 22 is a view showing a sectional shape of the Fresnel lens.

FIG. 22 is a view showing a sectional shape of the Fresnel lens 51.

The Fresnel lens 51 can be partitioned into three regions A1, A2 and A3 in a direction from the Fresnel center side to the periphery (called a Fresnel periphery) side of the Fresnel lens 51.

As a basic shape of the Fresnel lens 51, the Fresnel lens 51 of the region A2 will be initially described.

Each unit-prism portion (or a hybrid type prism portion) in the region A2 has a total reflection type prism portion U1 and a refraction type prism portion U2. The total reflection type prism portion U1 has an incident plane (or a second incident plane) 51A and a total reflection plane 51B, and a vertex angle between the planes are set to 40 degrees. The refraction type prism portion U2 has an incident plane (or a first incident plane) 51C and an ineffective plane 51D. The unit-prism portion ranges from a first trough line T to a second trough line T adjacent to the first trough line, and each trough line T is defined as a line on which the ineffective plane 51D of a first unit-prism portion intersects the total reflection plane 51B of a second unit-prism portion adjacent to the first unit-prism portion. A pitch of each unit-prism portion in the region A2 is set to 0.1 mm. Also, a pitch of each unit-prism portion in the region A1 and a pitch of each unit-prism portion in the region A3 are set to the same length as that in the region A2.

Figure 23A:
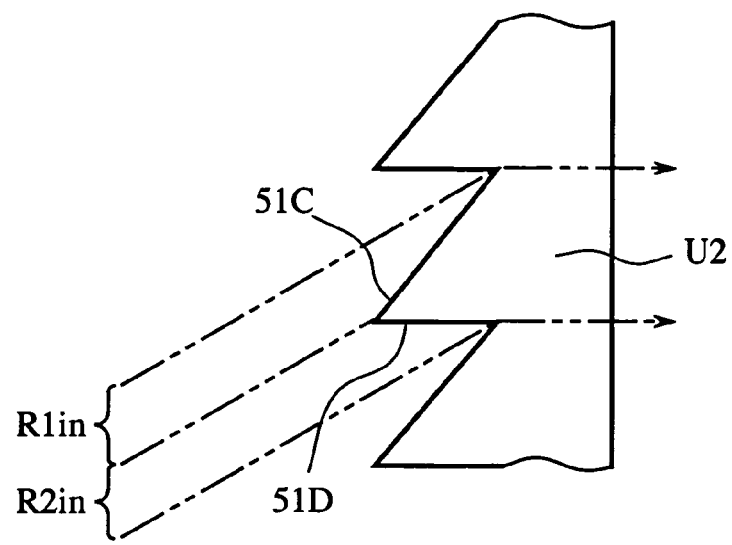
FIG. 23A, FIG. 23B and FIG. 23C are views explaining a total reflection type prism portion U1 and a refraction type prism portion U2.
Figure 23B:
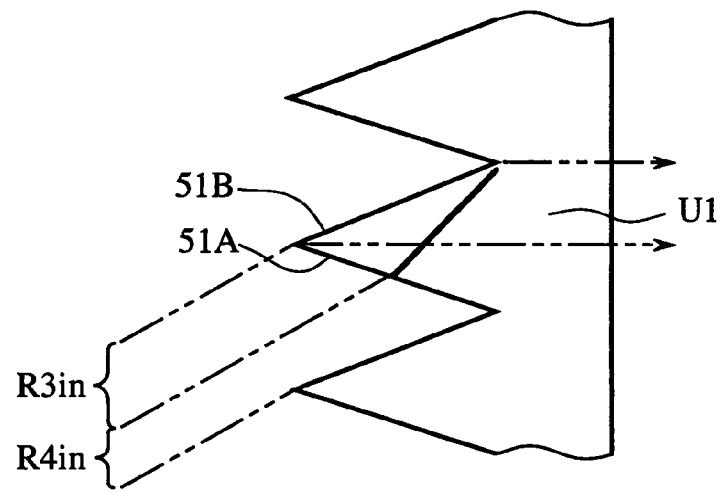
Figure 23C:
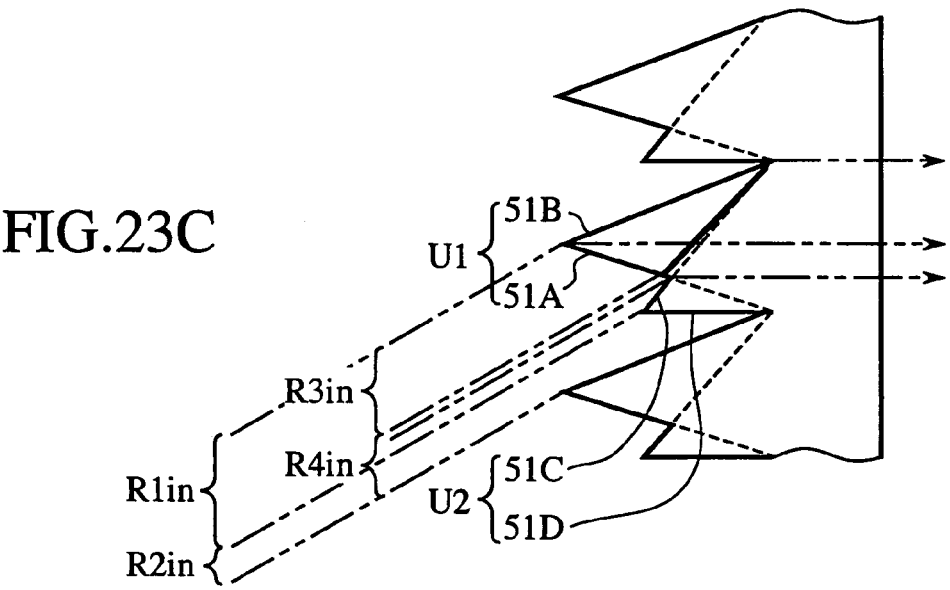

FIG. 23A, FIG. 23B and FIG. 23C are views explaining the total reflection type prism portion U1 and the refraction type prism portion U2.

FIG. 23A shows a Fresnel lens (or a conventional Fresnel lens having only a plurality of refraction type prism portions) formed of a plurality of unit-prism portions respectively having a shape equivalent to the refraction type prism portion U2. As is described above, a flux of light R1in projected on the incident plane 51C is refracted on the incident plane 51C and goes out in a desired direction. However, a flux of light R2 in projected on the ineffective plane 51D is reflected or refracted on the ineffective plane 51D and is undesirably changed to stray light.

FIG. 23B shows a Fresnel lens (or a conventional Fresnel lens having only a plurality of the total reflection type prism portions) formed of a plurality of unit-prism portions respectively having a shape equivalent to the total reflection type prism portion U1. As is described above, a partial flux of light R3in among a flux of light projected on the incident plane 51A is totally reflected on the total reflection plane 51B and goes out in a desired direction. However, the remaining flux of light R4 in projected on the incident plane 51A cannot reach the total reflection plane 51B and is undesirably changed to stray light.

FIG. 23C shows a Fresnel lens 51 according to the fifth embodiment. In the Fresnel lens 51, a unit-prism portion is formed by combining one total reflection type prism portion U1 and one refraction type prism portion U2, and a flux of light impossible to go out in the desired direction in the Fresnel lens of FIG. 23A composed of only the refraction type prism portions U2 or a flux of light impossible to go out in the desired direction in the Fresnel lens of FIG. 23B composed of only the total reflection type prism portions U1 can go out in the desired direction (or a direction almost perpendicular to the outgoing plane of the Fresnel lens 51) in the Fresnel lens 51.

In detail, in the Fresnel lens 51, the refraction type prism portions U2 is arranged on a part of an optical path through which the flux of light R4 in not reaching the total reflection plane 51B of the total reflection type prism portions U1 is projected on the incident plane 51A in the Fresnel lens of FIG. 23B. Therefore, in the Fresnel lens 51, a part of the flux of light R4 in is refracted to deflect the part of the flux of light R4 in and goes out in the desired direction.

This arrangement of the total reflection type prism portions U1 and the refraction type prism portions U2 in the Fresnel lens 51 can be viewed from another angle. That is to say, on a part of an optical path of the flux of light R2 in projected on the ineffective plane 51D of the refraction type prism portion U2 of a first pitch area (or a first unit-prism portion), the total reflection type prism portion U1 of a second pitch area (or a second unit-prism portion) adjacent to the first pitch area on the Fresnel center side is arranged. Therefore, in the Fresnel lens 51, a part of the flux of light R2 in is totally reflected to deflect the part of the flux of light R2 in and goes out in the desired direction. In other words, the refraction type prism portion U2 of the Fresnel lens 51 shown in FIG. 23C is arranged so as to compensate for demerits of the total reflection type prism portions U1 of the Fresnel lens shown in FIG. 23B, and the total reflection type prism portion U1 of the Fresnel lens 51 shown in FIG. 23C is arranged so as to compensate for demerits of the refraction type prism portions U2 of the Fresnel lens shown in FIG. 23A.

Also, in each pitch area (or unit-prism portion) of the region A2 shown in FIG. 22, as shown in FIG. 23C, the total reflection type prism portion U1 and the refraction type prism portion U2 are arranged so as to make an extending plane of the incident plane 51C intersect the trough line T placed on the Fresnel periphery side of the incident plane 51C and so as to make an extending plane of the incident plane 51A intersect the trough line T placed on the Fresnel center side of the incident plane 51A. The reason of the arrangement of the total reflection type prism portions U1 and the refraction type prism portions U2 in the region A2 is based on a manufacturing method of the Fresnel lens 51. Next, a method of manufacturing the Fresnel lens 51 will be described below.

The Fresnel lens 51 is manufactured by forming resin in a specific shape. Therefore, it is required to manufacture a lens forming mold which is formed in a shape obtained by reversing a shape of the Fresnel lens 51.

Figure 24A:
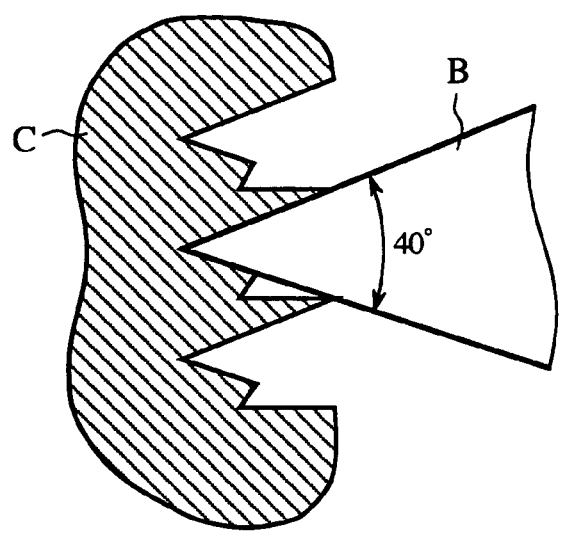
FIG. 24A, FIG. 24B and FIG. 24C are views explaining features of a lens forming mold used for the manufacturing of the Fresnel lens 51.
Figure 24B:
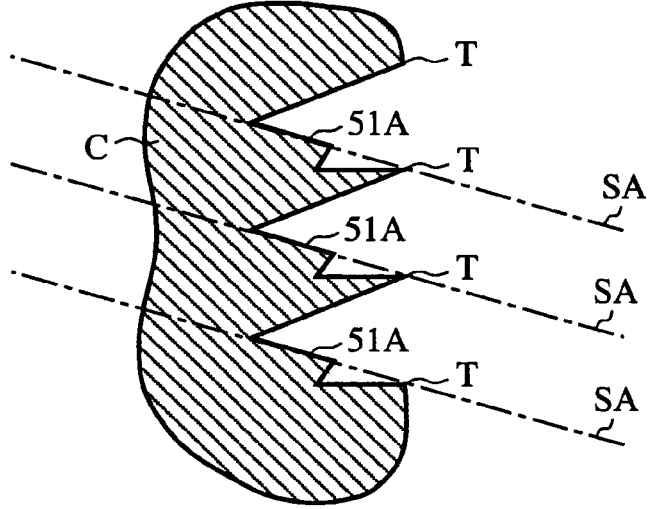
Figure 24C:
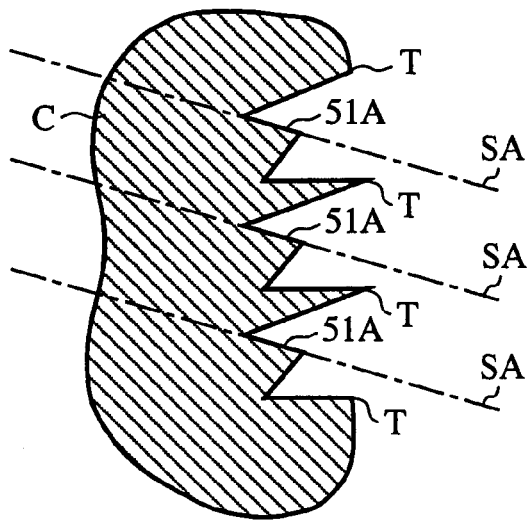
Figure 25A:
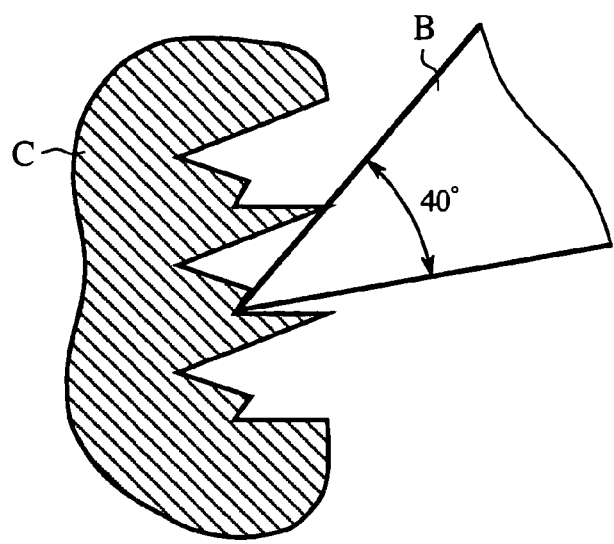
FIG. 25A, FIG. 25B and FIG. 25C are views explaining features of a lens forming mold used for the manufacturing of the Fresnel lens 51.
Figure 25B:
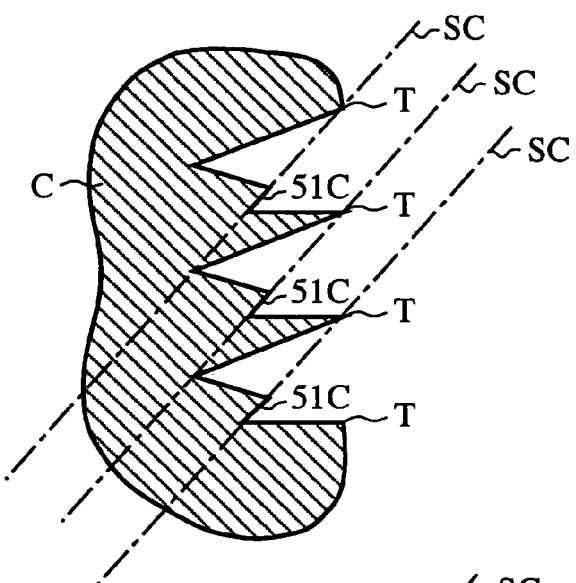
Figure 25C:
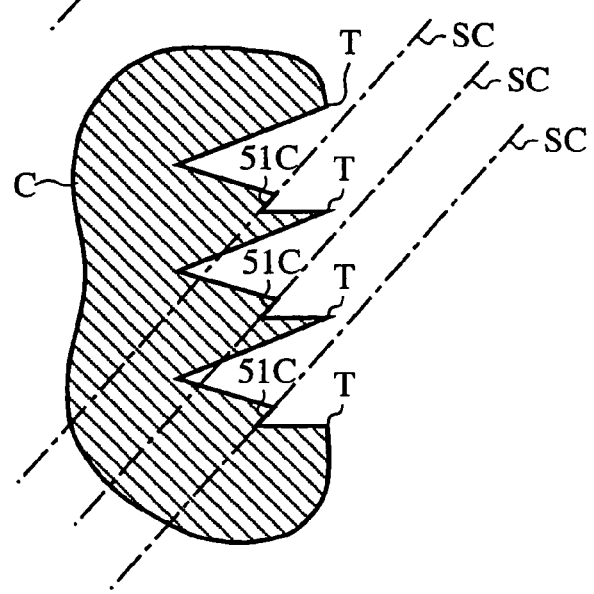

FIG. 24A, FIG. 24B, FIG. 24C, FIG. 25A, FIG. 25B and FIG. 25C are views explaining features of a lens forming mold used for the manufacturing of the Fresnel lens 51. FIG. 24A to FIG. 24C show manufacturing steps of cutting a portion corresponding to the total reflection type prism portions U1, and FIG. 25A to FIG. 25C show manufacturing steps of cutting a portion corresponding to the refraction type prism portions U2.

In FIG. 24A to FIG. 24C and FIG. 25A to FIG. 25C, a symbol C indicates a lens forming mold, and a symbol B indicates a cutting tool (or a bite) such as a diamond bite for cutting the lens forming mold C.

The lens forming mold C is manufactured according to the cutting work using the cutting tool B. In this case, to prevent scratches or irregularity from being generated on the surface of the lens forming mold C, a pointed end (or a corner) of the cutting tool B (or a chip) is not used, but it is required to cut the lens forming mold C by using a cutting blade (or an inclined plane portion) of the cutting tool B. Also, though the pitch of a Fresnel lens is equal to almost 0.1 mm (0.1 mm in case of the Fresnel lens 51), a size of the chip of the cutting tool B ranges from 2 to 3 mm.

Therefore, unless a following cutting condition (A) or (B) is satisfied, a lens forming mold corresponding to the shape of the unit-prism portion cannot be manufactured according to the cutting work.

Cutting Condition (A)

A plane obtained by extending the incident plane 51C intersects the trough line T (refer to FIG. 25B) or passes through a position shifted from the trough line T toward the light outgoing side (refer to FIG. 25C).

Cutting Condition (B)

A plane obtained by extending the incident plane 51A intersects the trough line T (refer to FIG. 24B) or passes through a position shifted from the trough line T toward the light outgoing side (refer to FIG. 24C).

To manufacture the Fresnel lens 51 based on the fifth embodiment, the cutting tool B (or a chip) having a vertex angle of 40 degrees is used, and the cutting work is performed for a portion of the lens forming mold C corresponding to the total reflection type prism portion U1 and the refraction type prism portion U2.

<Manufacturing of Lens Forming Mold>

Figure 26:
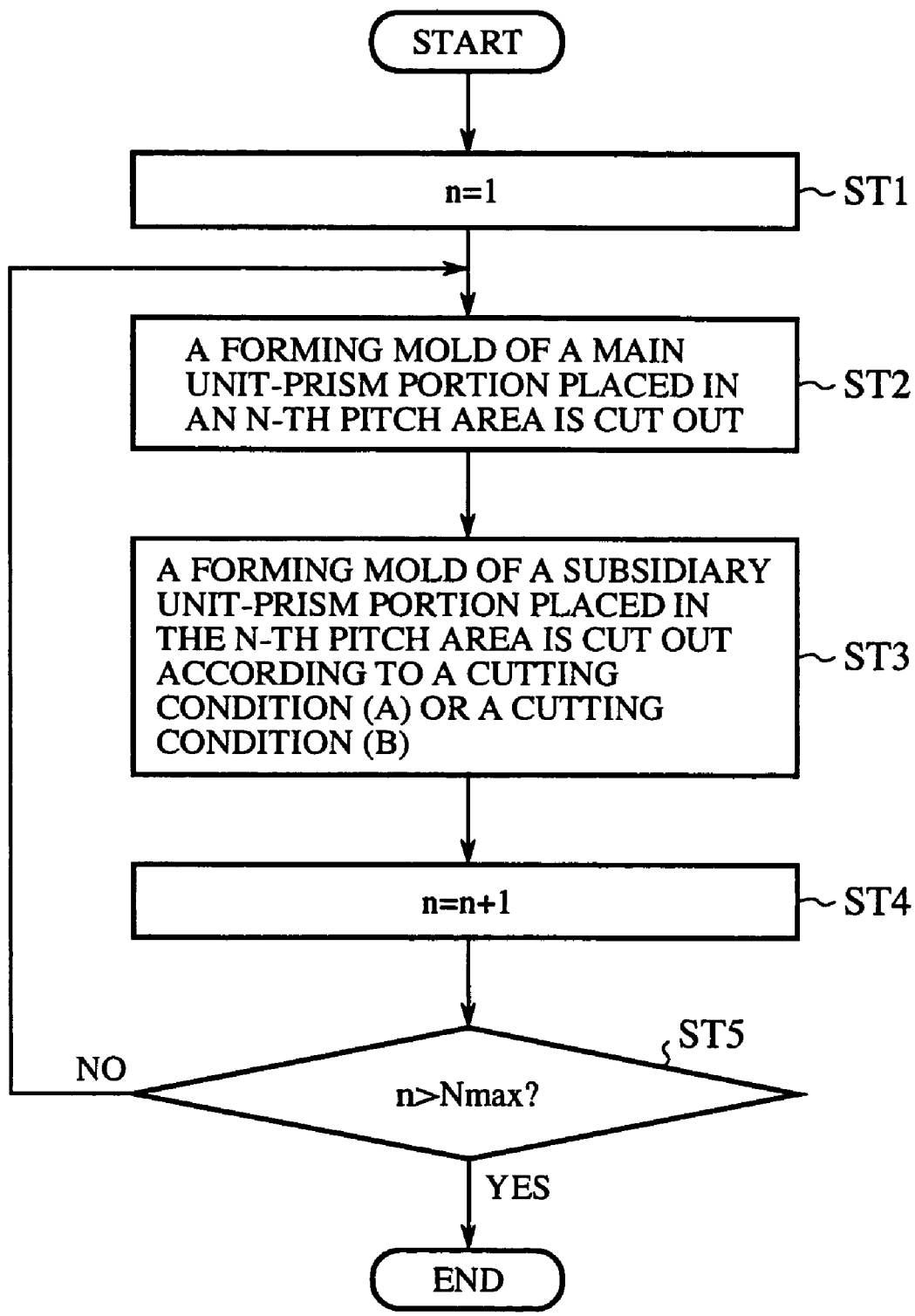
FIG. 26 is a flow chart showing a method of manufacturing a lens forming mold according to the fifth embodiment of the present invention.

FIG. 26 is a flow chart showing a method of manufacturing a lens forming mold according to the fifth embodiment of the present invention. Also, FIG. 27A, FIG. 27B, FIG. 27C and FIG. 27D show steps of a cutting work for the manufacturing of the lens forming mold C using the cutting tool B, and FIG. 28A, FIG. 28B, FIG. 28C and FIG. 28D show steps of another cutting work for the manufacturing of the lens forming mold C using the cutting tool B. FIG. 27A to FIG. 27D correspond to a Fresnel lens in which the refraction type prism portion U2 is regarded as a main unit-prism portion, and FIG. 28A to FIG. 28D correspond to a Fresnel lens in which the total reflection type prism portion U1 is regarded as a main unit-prism portion.

In FIG. 26, a pitch number n=1 is set in a step ST1 (or a cutting start pitch number setting step). When the procedure proceeds from the step ST1 to a step ST2 (or a main unit-prism portion cutting step), a cutting work for a main unit-prism portion placed in the first pitch area (or a cutting pitch area) P1 is performed by using the cutting tool B. This cutting work is shown in FIG. 27A or FIG. 28A, the lens forming mold C is cut in a reversed shape (or a forming mold) of the main unit-prism portion by using the cutting tool B.

When the cutting of the lens forming mold C in the reversed shape of the main unit-prism portion of the first pitch area P1 is completed in the step ST2, the procedure proceeds to a step ST3 (or a subsidiary unit-prism portion cutting step), a cutting work for a portion of the lens forming mold C corresponding to a subsidiary unit-prism portion placed in the first pitch area (or the cutting pitch area) P1 is performed. As is described with reference to FIG. 25A to FIG. 25C and FIG. 26A to FIG. 26C, in cases where the lens forming mold C is cut in a reversed shape (or a forming mold) of the subsidiary unit-prism portion by using the cutting tool B, the cutting work is performed while satisfying the cutting condition (A) or the cutting condition (B). This cutting work is shown in FIG. 27B or FIG. 28B.

For example, as shown in FIG. 27B, in cases where the lens forming mold C, in which a reversed shape of the refraction type prism portion placed in the first pitch has been already formed as a main unit-prism portion, is cut in a reversed shape of the total reflection type prism portion placed in the first pitch area P1, the lens forming mold C is cut according to the cutting condition (B) so as to make an extending plane SA1 of the incident plane 51A intersect the trough line T1 placed on the Fresnel center side of the first pitch area P1 or pass through a position shifted from the trough line T1 of the Fresnel center side toward the light outgoing side.

In the same manner, as shown in FIG. 28B, in cases where the lens forming mold C, in which a reversed shape of the total reflection type prism portion placed in the first pitch has been already formed as a main unit-prism portion, is cut in a reversed shape of the refraction type prism portion placed in the first pitch area P1, the lens forming mold C is cut according to the cutting condition (A) so as to make an extending plane SC1 of the incident plane 51C intersect the trough line T0 placed on the Fresnel periphery side of the first pitch area P1 or pass through a position shifted from the trough line T0 placed on the Fresnel periphery side toward the light outgoing side.

When the cutting work for the first pitch area P1 in the Step ST2 and the step ST3 is completed, the procedure proceeds to a step ST4 (or a pitch number incrementing step), the pitch number "n" is incremented to 2 (n=2). In a next step ST5 (or a cutting completion judging step), the pitch number "n" is compared with a total number N of pitch areas of the lens forming mold C. In case of n≦Nmax, or in cases where a pitch area to be cut remains ("NO" in the step ST5), the procedure returns to the step ST2, and the cutting work (FIG. 27C or FIG. 28C) for a portion of the lens forming mold C corresponding to the main unit-prism portion placed in the second pitch area (or a cutting pitch area) P2 is performed.

Thereafter, in the step ST3, the cutting work (FIG. 27D or FIG. 28D) for a portion of the lens forming mold C corresponding to the subsidiary unit-prism portion placed in the second pitch area (or the cutting pitch area) P2 is performed. In this case, in the same manner as in the first pitch area P1, the cutting work for the second pitch area P2 is performed in the step ST3 so as to satisfy the cutting condition (A) or the cutting condition (B).

For example, in case of the cutting work shown in FIG. 27D, in cases where the lens forming mold C, in which a reversed shape of the refraction type prism portion placed in the second pitch area P2 has been already formed as a main unit-prism portion, is cut in a reversed shape of the total reflection type prism portion placed in the second pitch area P2, the lens forming mold C is cut according to the cutting condition (B) so as to make an extending plane SA2 of the incident plane 51A intersect the trough line T2 placed on the Fresnel center side of the second pitch area P2 or pass through a position shifted from the trough line T2 of the Fresnel center side toward the light outgoing side.

In the same manner, in case of the cutting work shown in FIG. 28D, in cases where the lens forming mold C, in which a reversed shape of the total reflection type prism portion placed in the second pitch area P2 has been already formed as a main unit-prism portion, is cut in a reversed shape of the refraction type prism portion placed in the second pitch area P2, the lens forming mold C is cut according to the cutting condition (A) so as to make an extending plane SC2 of the incident plane 51C intersect the trough line T1 placed on the Fresnel periphery side of the second pitch area P2 or pass through a position shifted from the trough line T1 placed on the Fresnel periphery side toward the light outgoing side.

Thereafter, the pitch number "n" is incremented each time the step ST4 is performed, and the cutting work is repeatedly performed until the pitch number "n" reaches Nmax (n=Nmax). When n=Nmax+1 is obtained in the step ST4, the complement of the cutting work for the lens forming mold C of the Fresnel lens 51 is judged in the step ST5, the manufacturing of the lens forming mold C is completed. As is described above, in the fifth embodiment, the manufacturing of the lens forming mold C can be easily performed by using a normal cutting tool. Also, because the portion corresponding to the main unit-prism portion and the portion corresponding to the subsidiary unit-prism portion are respectively cut for each pitch area, the precision of the manufacturing of the lens forming mold C can be improved. Therefore, the Fresnel lens 51 can be manufactured with high precision, and an optical performance of the Fresnel lens 51 expected in the designing of the Fresnel lens 51 can be obtained.

In the fifth embodiment, as shown in FIG. 27A to FIG. 27D and FIG. 28A to FIG. 28D, the cutting work is performed in the direction from the Fresnel center side to the Fresnel periphery side. However, the cutting direction is not restricted, and it is applicable that the cutting work be performed in the direction from the Fresnel periphery side to the Fresnel center side.

Thereafter, resin is poured into the lens forming mold C manufactured in the above-described method, the resin is hardened, the lens forming mold C is taken off from the hardened resin, and the manufacturing of the Fresnel lens 51 is completed. This Fresnel lens 51 is formed in a shape of a large-sized lens sheet of 50 inches. Also, because rays of image light are projected on the Fresnel lens 51 in an oblique direction, a difference between incident angles of rays of image light depends on incident positions of the rays of image light. In cases where the incident angles of rays of image light incident on the total reflection type prism portion U1 are large, an amount of fluxes of light going out in a desired direction is increased. In contrast, in cases where the incident angles of rays of image light incident on the refraction type prism portion U2 are large, an amount of fluxes of light going out in a desired direction is increased. Accordingly, the total reflection type prism portion U1 is appropriate to the incident position corresponding to the large incident angle, and the refraction type prism portion U2 is appropriate to the incident position corresponding to the small incident angle.

Therefore, as shown in FIG. 22, in the region A1 (or the Fresnel center side) nearest to the image light source 54 in the Fresnel lens 51 based on the fifth embodiment, each refraction type prism portion U2 is set as a main unit-prism portion, and each total reflection type prism portion U1 is set as a subsidiary unit-prism portion, and a ratio of an area occupied by the total reflection type prism portion U1 to one pitch area is set to be smaller than a ratio of an area occupied by the refraction type prism portion U2 to one pitch area.

In contrast, in the region A3 (or the Fresnel periphery side) farthest from the image light source 54, each total reflection type prism portion U1 is set as a main unit-prism portion, and each refraction type prism portion U2 is set as a subsidiary unit-prism portion, and a ratio of an area occupied by the refraction type prism portion U2 to one pitch area is set to be smaller than a ratio of an area occupied by the total reflection type prism portion U1 to one pitch area.

Here, to change an area ratio of the total reflection type prism portions U1 to the refraction type prism portions U2, a cutting depth of the cutting tool B used to cut the lens forming mold C is changed with the incident position, and the height of the total reflection type prism portion U1 and the height of the refraction type prism portion U2 are changed.

Figure 29:
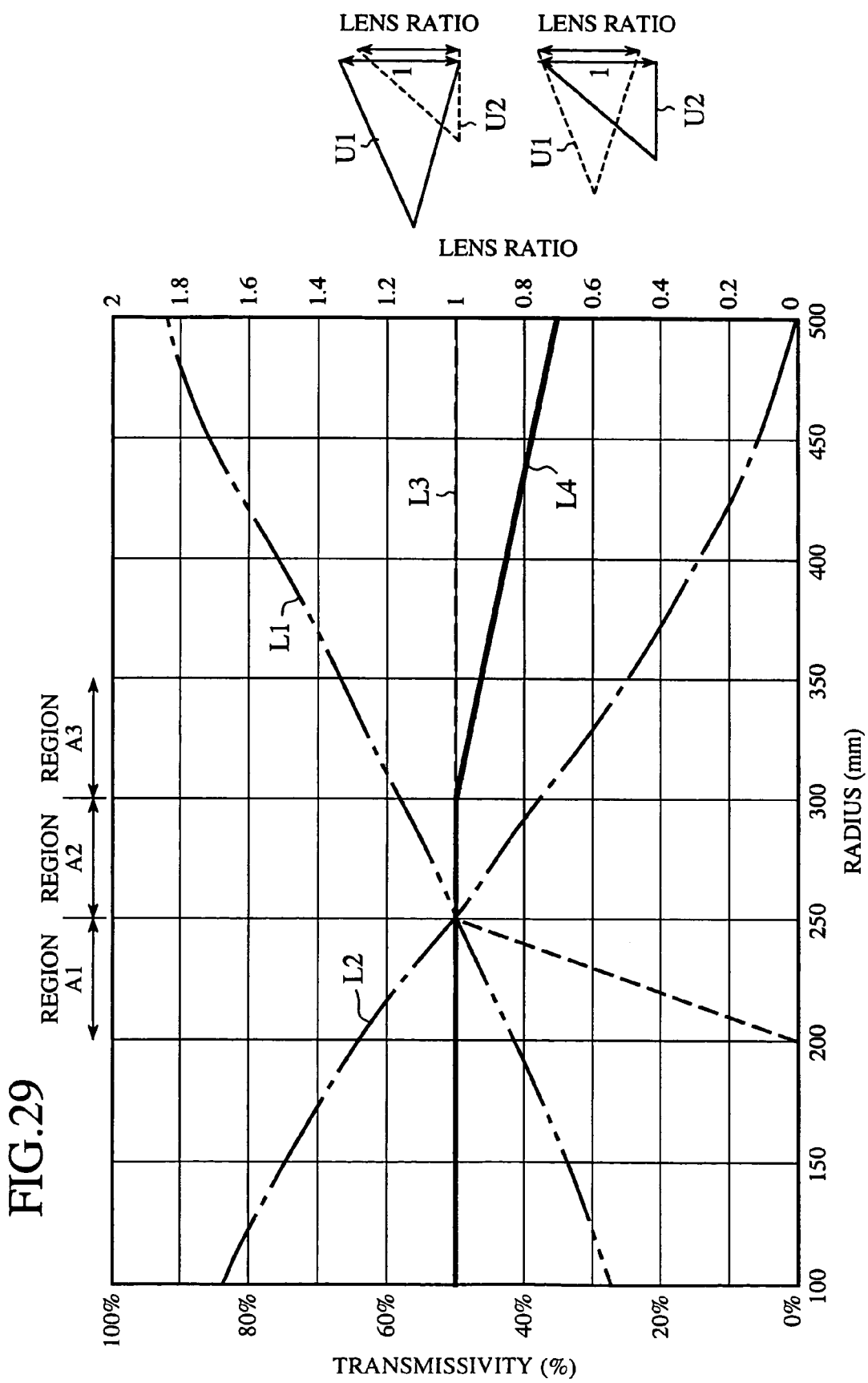
FIG. 29 is a view showing the relationship among a radius of a Fresnel lens measured from the Fresnel center, a ratio of an area occupied by the total reflection type prism portion U1 and a ratio of an area occupied by the refraction type prism portion U2 to the area of the Fresnel lens 51.

FIG. 29 is a view showing the relationship among a radius of the Fresnel lens 51 measured from the Fresnel center, a ratio of an area occupied by the total reflection type prism portion U1 and a ratio of an area occupied by the refraction type prism portion U2 to the area of the Fresnel lens 51. In FIG. 29, a line L1 and a line L2 are additionally shown, the line L1 indicates the transmissivity in the pitch area including only the total reflection type prism portion U1, and the line L2 indicates the transmissivity in the pitch area including only the refraction type prism portion U2. Here, the transmissivity is measured for the Fresnel lens 51 arranged in the same manner as in the rear projection type image displaying device of the fifth embodiment, and a white light source is used. In FIG. 29, an X-axis indicates a radius in millimeter, a Y-axis on the left side indicates the transmissivity in percent (%), and a Y-axis on the right side indicates a lens ratio.

In FIG. 29, the line L1 and the line L2 intersect each other at a position corresponding to the radius of 250 mm, the effect (or the transmissivity) of the refraction type prism portion U2 is higher than that of the total reflection type prism portion U1 at a region smaller than the radius of 250 mm (L1<L2), and the effect (or the transmissivity) of the total reflection type prism portion U1 is higher than that of the refraction type prism portion U2 at a region larger than the radius of 250 mm (L1>L2). In the Fresnel lens 51, a ratio of an area occupied by the total reflection type prism portion U1 to one pitch area and a ratio of an area occupied by the refraction type prism portion U2 to one pitch area are respectively changed by setting a standard of the ratio at the radius of 250 mm.

In FIG. 29, the height of the total reflection type prism portion U1 or the refraction type prism portion U2 at the region A2 is set to unity, and a ratio of an area occupied by the total reflection type prism portion U1 to one pitch area or a ratio of an area occupied by the refraction type prism portion U2 to one pitch area is indicated by a ratio of the height of the total reflection type prism portion U1 or the refraction type prism portion U2 at an arbitrary position to unity set for the region A2. The ratio is called a lens ratio. In FIG. 29, a lens ratio for the total reflection type prism portion U1 is indicated by a line L3, and a lens ratio for the refraction type prism portion U2 is indicated by a line L4. Here, the area ranging from the radius of 200 mm to the radius of 1078 mm are used as the Fresnel lens 51. However, in FIG. 29, the lines L1 to L4 are indicated in a region ranging from the radius of 100 mm to the radius of 500 mm because the difference between the lines L1 and L2 and the difference between the lines L3 and L4 are clearly indicated in the region.

As is realized with reference to FIG. 29, the total reflection type prism portion U1 does not exist in a region smaller than the radius of 200 mm, the increase of a ratio of an area occupied by the total reflection type prism portion U1 to one pitch area is started at the radius of 200 mm, the lens ratio for the total reflection type prism portion U1 reaches unity (which is equal to the ratio at the region A2) at the radius of 250 mm, and the lens ratio for the total reflection type prism portion U1 is kept to unity in a region larger than the radius of 250 mm.

In contrast, the lens ratio for the refraction type prism portion U2 is equal to unity (which is equal to the ratio for the region A2) in a region smaller than the radius of 300 mm, and the lens ratio for the refraction type prism portion U2 is gradually decreased in a region equal to or larger than the radius of 300 mm.

Because a ratio of an area occupied by the total reflection type prism portion U1 to one pitch area and a ratio of an area occupied by the refraction type prism portion U2 to one pitch area are respectively changed in the Fresnel lens 51, a region smaller than the radius of 250 mm is set as the region A1, a region ranging from the radius of 250 mm to the radius of 300 mm is set as the region A2, and a region larger than the radius of 300 mm is set as the region A3.

Here, it is applicable that the lens ratio for the refraction type prism portion U2 be gradually decreased in a region larger than the radius of 250 mm to omit the region A2 from the Fresnel lens 51. However, in the fifth embodiment, the pitch areas of the region A2 are arranged in the Fresnel lens 51 to smoothly change the lens ratio and to lessen a luminance difference in an image displayed on the screen.

<Comparison of Transmission>

The Fresnel lens 51 based on the fifth embodiment is manufactured, and it is ascertained that the transmissivity of the Fresnel lens 51 is improved as compared with that in the prior art.

Figure 6:
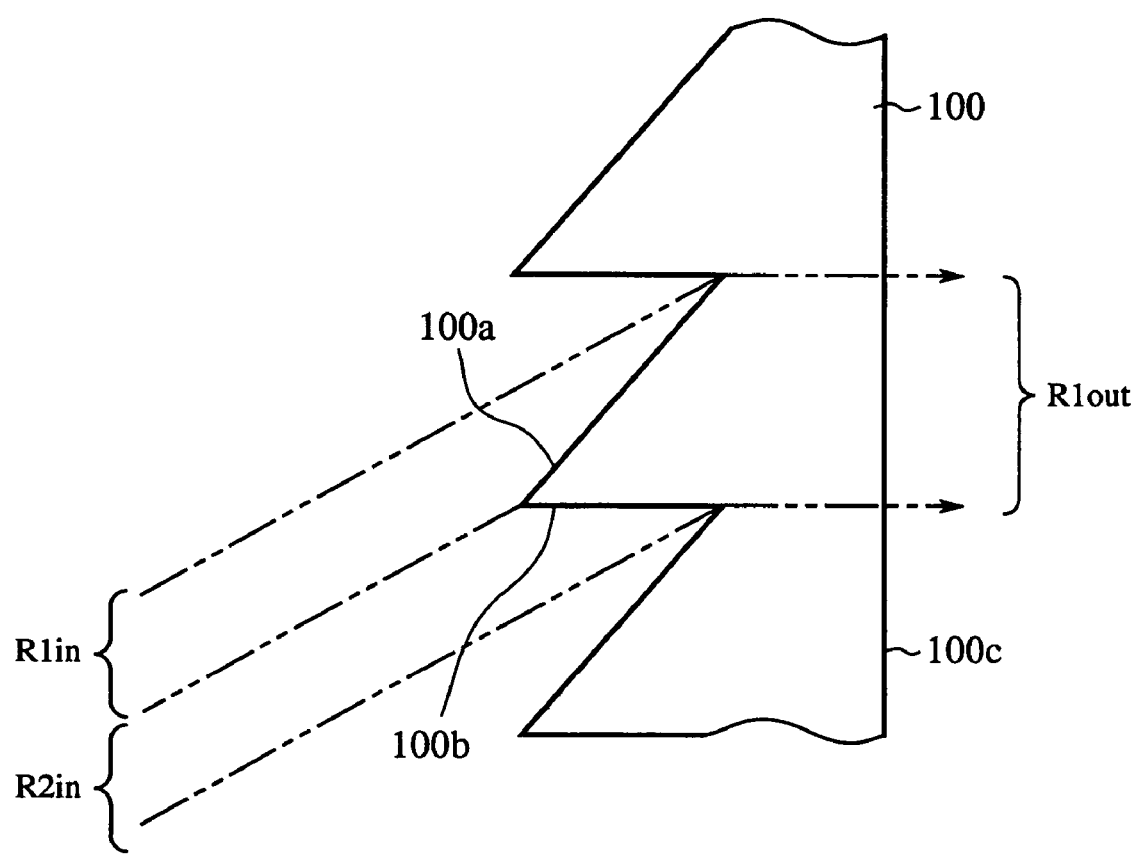
FIG. 6 is a view of a conventional Fresnel lens on which image light is projected on a slant.

Here, to compare the Fresnel lens 51 based on the fifth embodiment with a Fresnel lens 110 based on the prior art shown in FIG. 6 according to the method disclosed in Published Unexamined Japanese Patent Application No. S61-52601 of 1986, specifications other than shape in the Fresnel lens 51 are set to be the same as those in the Fresnel lens 110, and the Fresnel lens 51 is manufactured.

Figure 30:
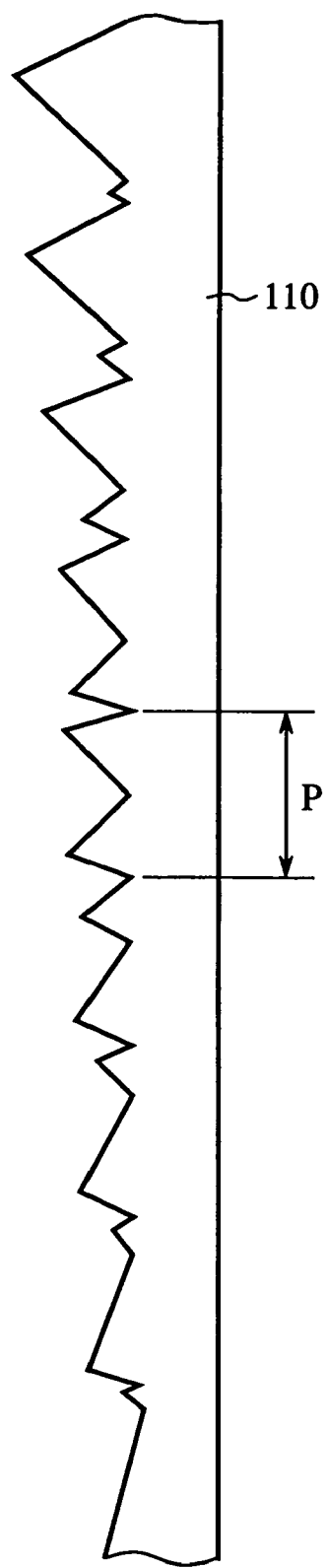
FIG. 30 is a view showing the configuration of a Fresnel lens 110 according to the prior art.

FIG. 30 is a view showing the configuration of the Fresnel lens 110 according to the prior art. A basic shape of a total reflection type prism portion and a basic shape of a refraction type prism portion in the Fresnel lens 110 are set to the same as those in the Fresnel lens 51, and the pitch P in the Fresnel lens 110 is set to 0.1 mm which is the same as that in the Fresnel lens 51.

FIG. 31 is a view showing a lens ratio for a total reflection type prism portion in the Fresnel lens 110 shown in FIG. 30, and the lens ratio is indicated by a line L5. In the Fresnel lens 110, a total reflection type prism portion U1 and a refraction type prism portion U2 are arranged independent of each other, and a lens ratio for the total reflection type prism portion U1 and a lens ratio for the refraction type prism portion U2 are shown in an out-of-graph area on a right side in FIG. 31. Here, the lines L1 and L2 in FIG. 31 are the same as those in FIG. 29.

FIG. 32 is a view showing the transmissivity of the Fresnel lens 51 based on the fifth embodiment and the transmissivity of the Fresnel lens 110 based on the prior art. In FIG. 32, the transmissivity of the Fresnel lens 51 is indicated by a line L6, and the transmissivity of the Fresnel lens 110 is indicated by a line L7. Also, the lines L1 and L2 are shown in the same manner as in FIG. 29 and FIG. 31. The transmissivity indicated by the line L6 is high in the whole region as compared with those indicated by the lines L1, L2 and L7. Therefore, the inventors ascertain that the transmissivity of the Fresnel lens 51 is high.

As is described above, in the fifth embodiment, a ratio of an area occupied by the total reflection type prism portion U1 to one pitch area and a ratio of an area occupied by the refraction type prism portion U2 to one pitch area are respectively changed, and the total reflection type prism portion U1 and the refraction type prism portion U2 are combined as a unit-prism portion. Therefore, the total reflection type prism portion U1 of the unit-prism portion can compensate for demerits of the refraction type prism portion U2, and the refraction type prism portion U2 of the unit-prism portion can compensate for demerits of the total reflection type prism portion U1. Accordingly, the Fresnel lens 51 having the high transmissivity in the whole region including the regions A1 to A3 can be obtained.

Also, in the fifth embodiment, because the cutting work for the manufacturing of the lens forming mold C can be performed by using only one cutting tool, the Fresnel lens 51 can be easily manufactured.

Accordingly, the screen 53 using the Fresnel lens 51 has high transmissivity as a whole, an image displayed on the rear projection type image displaying device can be made bright, and the rear projection type projected image displaying device can be obtained at low cost.

The fifth embodiment is not restricted to the above-described Fresnel lens 51, and various modifications and changes can be allowed for the Fresnel lens 51.

<First Modification>

In the above-described Fresnel lens 51, the Fresnel lens 51 having the three regions A1, A2 and A3 is described as an example. However, the fifth embodiment is not restricted to the Fresnel lens 51 having the three regions A1, A2 and A3, and it is applicable that the combination of the three regions A1, A2 and A3 be appropriately changed. For example, it is applicable that the Fresnel lens 51 have only both the region A1 and the region A2, or it is applicable that the Fresnel lens 51 have only the region A1, the region A2 or the region A3.

<Second Modification>

In the above-described Fresnel lens 51, the outgoing plane of the Fresnel lens 51 is flat. However, the fifth embodiment is not restricted to the Fresnel lens 51 having the flat outgoing plane. For example, it is applicable that an element having a fresnel lens shape be added to the Fresnel lens 51, or it is applicable that a diffusing means such as a very small irregularity element be added to the Fresnel lens 51.

<Third Modification>

In the above-described Fresnel lens 51, rays of image light emitted from the image light source 54 are directly injected onto the Fresnel lens 51. However, the fifth embodiment is not restricted to this Fresnel lens 51. For example, it is applicable that an optical means such as a mirror or a prism be arranged to change the optical path of rays of image light emitted from the image light source 54 by the reflection or refraction and to project the rays of image light onto the Fresnel lens 51.

EMBODIMENT 6

In cases where the lens forming mold is manufactured according to the method of manufacturing the lens forming mold, distortion occurs in the lens forming mold due to malleability of metal. Because the distortion of the lens forming mold causes distortion of an optical plane of a Fresnel lens, the optical performance of the Fresnel lens is degraded due to the distortion of the optical plane of the Fresnel lens.

In the sixth embodiment, the occurrence of distortion in the lens forming mold is initially described, and a method of manufacturing the lens forming mold is described on condition that the method prevents distortion from occurring in the lens forming mold and guarantees the optical performance of the Fresnel lens. Also, a method of manufacturing the lens forming mold is described on condition that an excellent optical performance is obtained in a Fresnel lens, in which the intermediary prism portions corresponding to incident angles neighboring to the characteristic changing angle described in the third embodiment are used, even though the distortion of the lens forming mold influences on the Fresnel lens.

FIG. 33A to FIG. 33F are views explaining distortion occurring in a plurality of manufacturing steps of the lens forming mold, and the manufacturing steps are based on the method of manufacturing the lens forming mold described in the fifth embodiment. The constituent elements, which are the same as those shown in FIG. 28, are indicated by the same reference numerals as those of the constituent elements shown in FIG. 28. The cutting work is performed in the manufacturing steps shown in FIG. 33A to FIG. 33F in the direction from the Fresnel center to the Fresnel periphery for each pitch area. After a forming mold (or a reversed shape) of the total reflection type prism portion functioning as a main unit-prism portion is produced in the cutting work, a forming mold (or a reversed shape) of the refraction type prism portion functioning as a subsidiary unit-prism portion is produced in the cutting work.

Figure 33A:
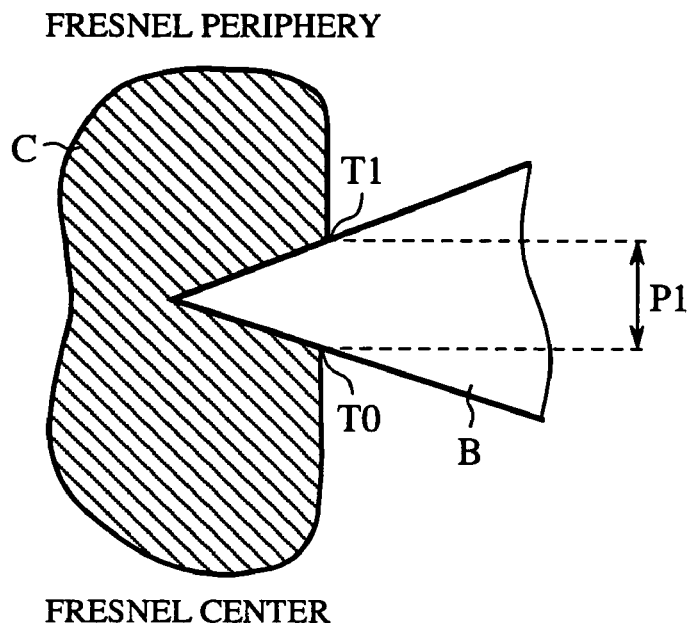
FIG. 33A to FIG. 33F are views explaining distortion occurring in a plurality of manufacturing steps of the lens forming mold.
Figure 33B:
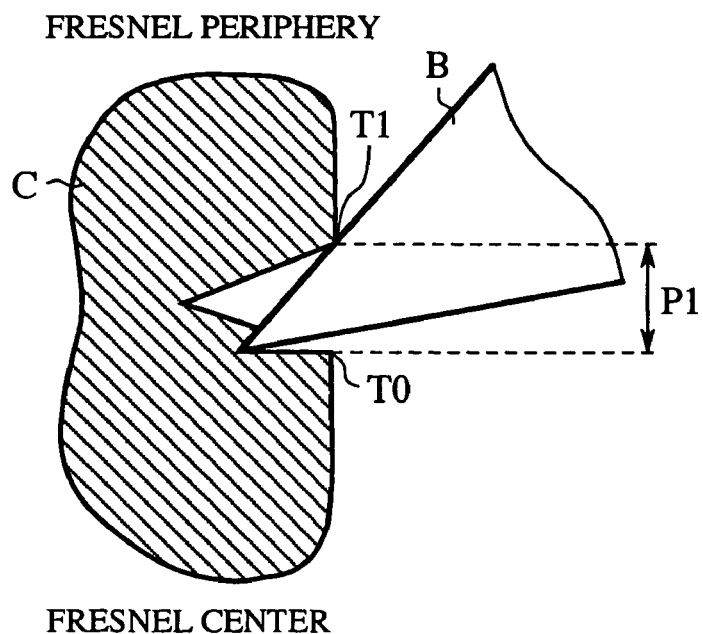

Initially, the lens forming mold is cut with the cutting tool B to form a forming mold of a total reflection type prism portion (hereinafter, called a total reflection type prism portion forming mold) corresponding to the first pitch area P1 (FIG. 33A). Thereafter, the lens forming mold is cut with the cutting tool B to form a forming mold of a refraction type prism portion (hereinafter, called a refraction type prism portion forming mold) corresponding to the first pitch area P1 (FIG. 33B). Therefore, the production of a forming mold of a hybrid type prism portion (hereinafter, called a hybrid type prism portion forming mold) corresponding to the first pitch area P1 is completed. In this case, the cutting conditions are the same as those described in the fifth embodiment.

Figure 33C:
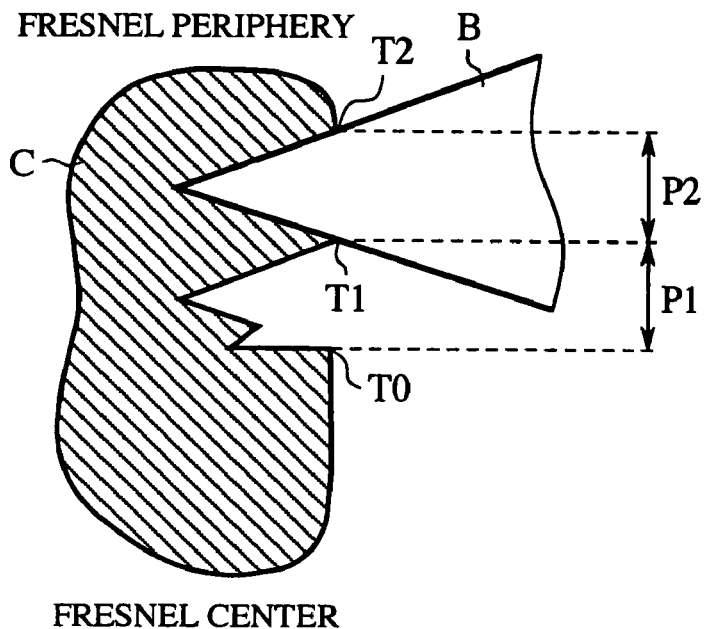

Next, the procedure proceeds to the cutting work for the second pitch area P2. A total reflection type prism portion forming mold corresponding to the second pitch area P2 is formed by the cutting work and is shown in FIG. 33C. In this case, a sharp tip portion placed on the trough line T1 is generated between the total reflection plane of the total reflection type prism portion forming mold corresponding to the first pitch area P1 and the incident plane of the total reflection type prism portion forming mold corresponding to the second pitch area P2.

Figure 33D:
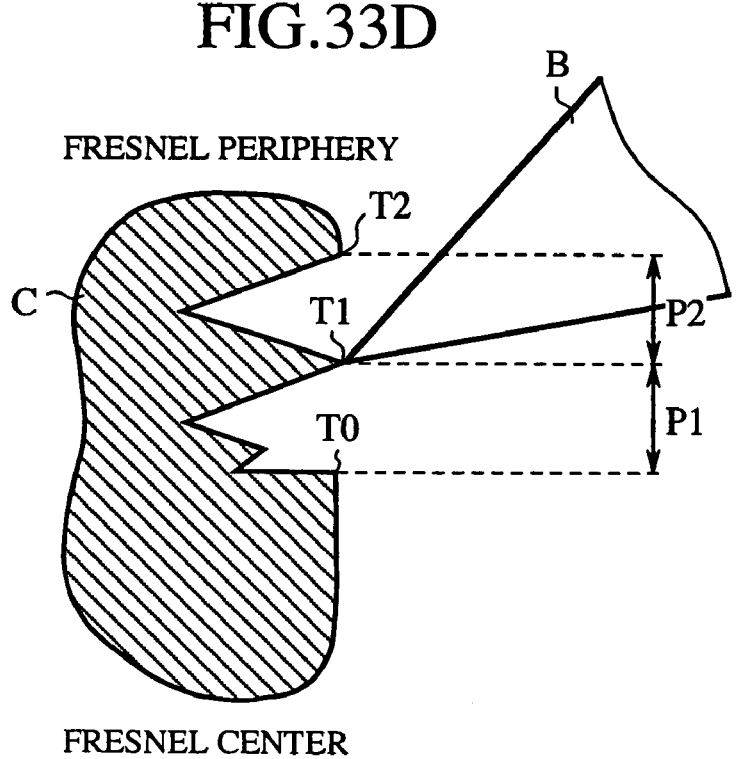

Thereafter, as shown in FIG. 33D, the cutting tool B is attached to and pushed toward the tip portion placed on the trough line T1, and the lens forming mold C is cut to form the refraction type prism portion forming mold corresponding to the second pitch area P2. The distortion of the lens forming mold C described in the opening paragraph of this sixth embodiment occurs when the lens forming mold C is cut to form the refraction type prism portion forming mold corresponding to the second pitch area P2.

In detail, because the width of the tip portion placed on the trough line T1 is narrowed toward the vertex of the tip portion, the strength of the tip portion on the trough line T1 is weakened toward the vertex of the tip portion. Therefore, as shown in FIG. 33E, when the cutting tool B is attached to and pushed toward the sharp tip portion placed on the trough line T1, a pushing force generated in the direction from the second pitch area P2 to the first pitch area P1 becomes larger as a position of the tip portion on the trough line T1 pushed by the cutting tool B approaches the vertex of the tip portion placed on the trough line T1, and the distortion of the lens forming mold C occurs due to malleability of metal within an area indicated by a dotted circle NG of FIG. 33E.

Figure 33E:
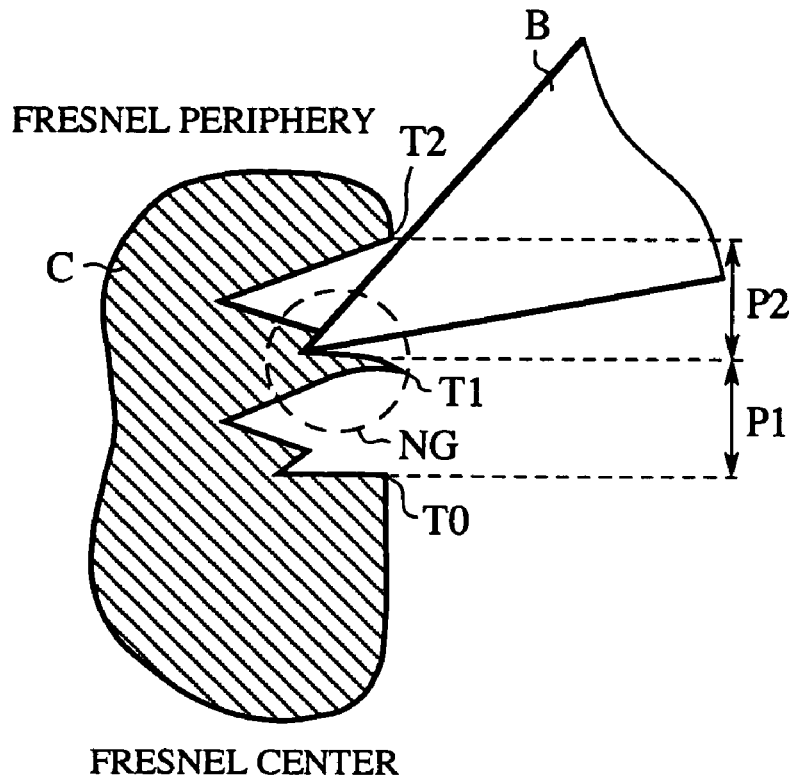
Figure 33F:
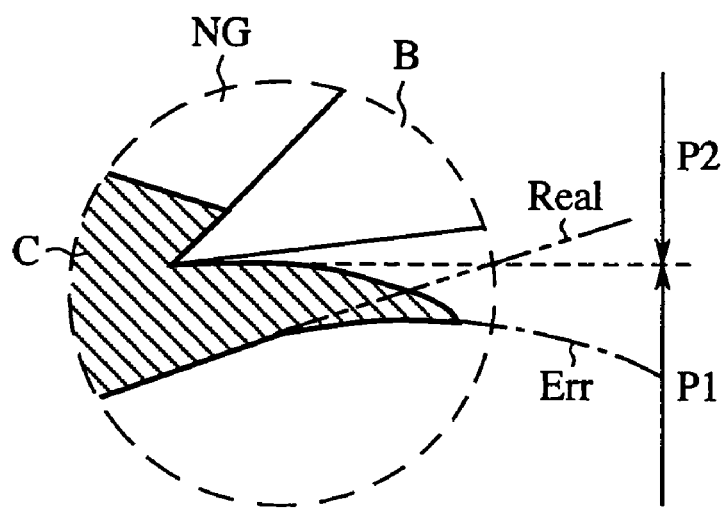

FIG. 33F is an enlarged view of the tip portion on the trough line T1 placed within the dotted circle NG of FIG. 33E.

In FIG. 33F, the pushing force of the cutting tool B in the direction from the second pitch area P2 to the first pitch area P1 becomes stronger as the tip portion on the trough line T1 pushed by the cutting tool B approaches the vertex of the tip portion placed on the trough line T1. Therefore, distortion occurs in the total reflection plane having a cut shape in the first pitch area P1. For example, in cases where a cut shape of the total reflection plane according to the design is indicated by a two-dot dash line Real, distortion of the lens forming mold C is indicated by a dot-dash curved line Err.

In the same manner, the same cutting work is repeated for the third pitch area P3 and pitch areas following the third pitch area P3. Therefore, when the lens forming mold C is cut to form a refraction type prism portion forming mold of the (n+1)-th pitch area Pn+1 (n is a natural number), distortion undesirably occurs in the tip portion on a trough line Tn placed between the n-th pitch area Pn already cut and the (n+1)-th pitch area Pn+1 currently cut. In the Fresnel lens manufactured from the lens forming mold C as is described above, the shape of each total reflection plane is deformed to a certain degree corresponding to a degree of the distortion occurring in the tip portion placed on the corresponding trough line, and the optical performance is degraded. Therefore, for example, loss of rays of light is increased. In cases where the degrees of distortion in the pitch areas are distributed in random, the rays of outgoing light are unnaturally and discontinuously distributed in strength.

By considering the occurrence of the distortion in the lens forming mold C, the method of manufacturing the lens forming mold is improved as follows.

Figure 34:
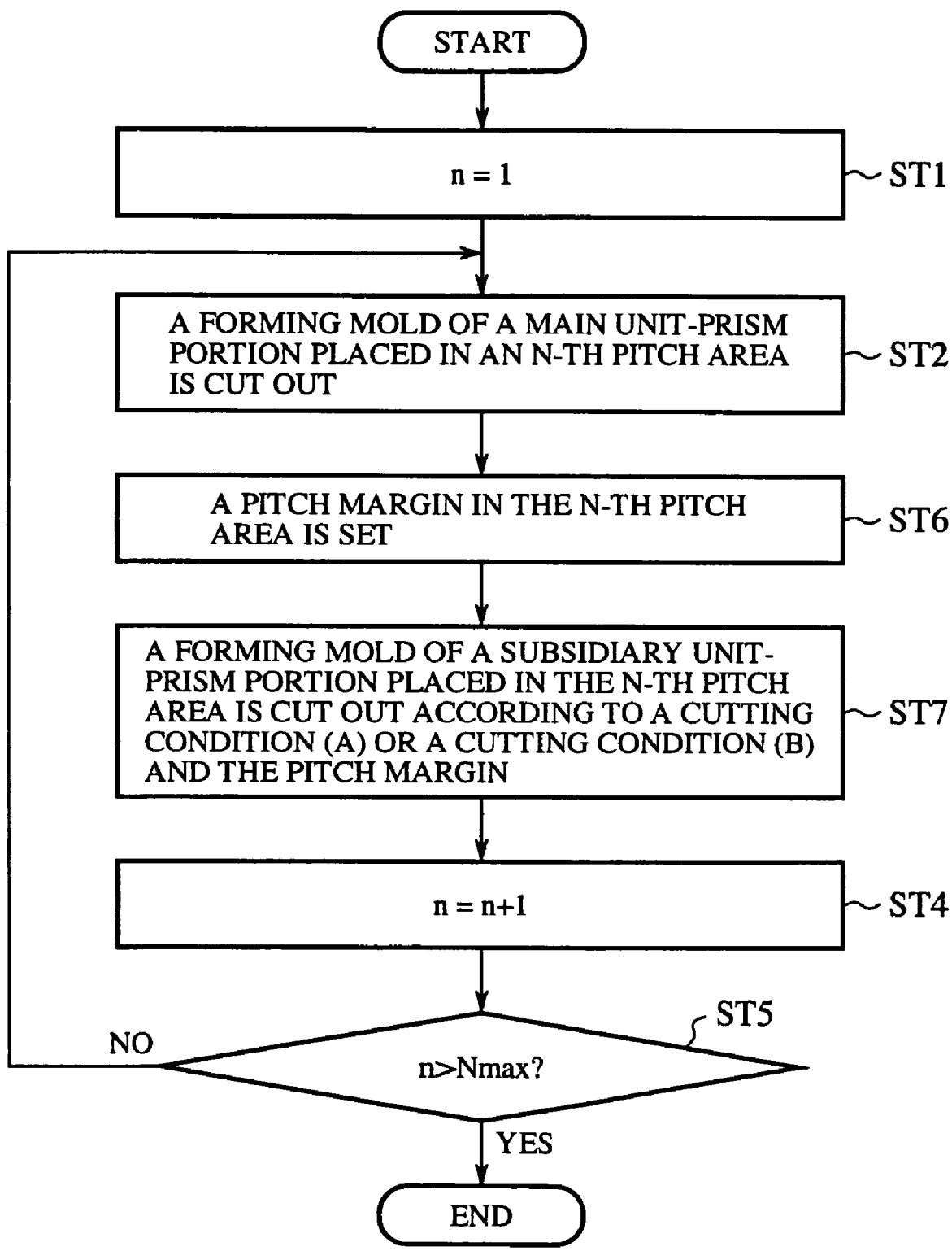
FIG. 34 is a flow chart showing a method of manufacturing a lens forming mold according to a sixth embodiment of the present invention.

FIG. 34 is a flow chart showing a method of manufacturing a lens forming mold according to the sixth embodiment of the present invention. The steps, which are the same as those shown in FIG. 26, are indicated by the same symbols as those of the steps shown in FIG. 26. Also, FIG. 35A to FIG. 35F are views showing the shape of the lens forming mold C cut step by step according to the method of manufacturing a lens forming mold shown in FIG. 34. The constituent elements, which are the same as those shown in FIG. 28 or one of FIG. 33A to FIG. 33F, are indicated by the same reference numerals as those of the constituent elements shown in FIG. 28 or one of FIG. 33A to FIG. 33F. In the same manner as in FIG. 33A to FIG. 33F, the cutting work is performed from the Fresnel center to the Fresnel periphery in the order of a total reflection type prism portion forming mold and a refraction type prism portion forming mold.

In FIG. 34, in the same manner as in the fifth embodiment, a pitch number n=1 is set in a step ST1 (or a cutting start pitch number setting step).

Figure 35A:
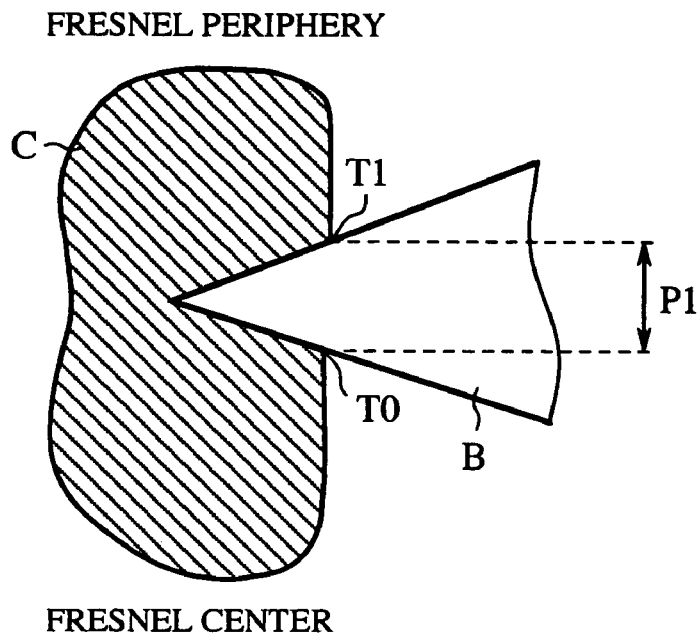
FIG. 35A to FIG. 35F are views showing the shape of the lens forming mold cut step by step according to the method of manufacturing a lens forming mold shown in FIG. 34.

In a step ST2 (or a main unit-prism portion cutting step), the lens forming mold C is cut with the cutting tool B to form a total reflection type prism portion forming mold placed in the first pitch area P1 (FIG. 35A).

Thereafter, a step ST6 (or a pitch margin setting step) is performed.

The step ST6 performed after the step ST2 denotes the feature of the sixth embodiment. In the step ST6, a pitch margin ΔP1 in the first pitch area P1 is set. Here, a pitch margin ΔPn+1 in the (n+1)-th pitch area Pn+1 currently cut denotes a distance in a cutting work repeating direction from a contacting point of the cutting tool B to a boundary point placed between the n-th pitch area Pn already cut and the (n+1)-th pitch area Pn+1. The vertex of the cutting tool B first comes in contact with the lens forming mold C at the contacting point when the lens forming mold C is cut with the cutting tool B to form a refraction type prism portion forming mold (or a subsidiary unit-prism portion forming mold forming mold) placed in the (n+1)-th pitch area Pn+1.

Figure 35B:
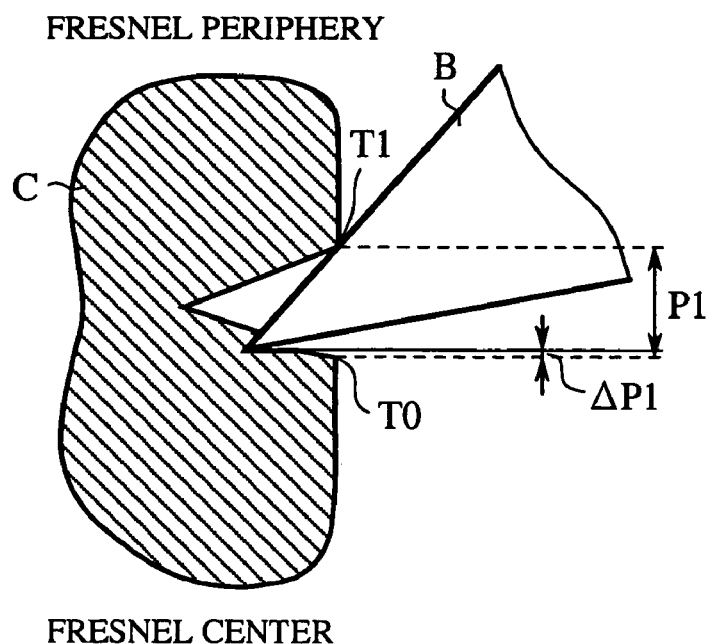

After the pitch margin ΔP1 is set in the step ST6, the procedure proceeds to a step ST7 (or a subsidiary unit-prism portion cutting step), the lens forming mold C is cut with the cutting tool B to form a refraction type prism portion forming mold of the first pitch area P1 according to the cutting condition (A) or the cutting condition (B) and the pitch margin ΔP1. In this step ST7, the cutting work is performed as is shown in FIG. 35B. As is realized by comparing the cutting work shown in FIG. 35B with the cutting work shown in FIG. 33B, the refraction type prism portion forming mold is formed so as to shift the refraction type prism portion forming mold in the direction from the Fresnel center to the Fresnel periphery by the pitch margin ΔP1.

Figure 35C:
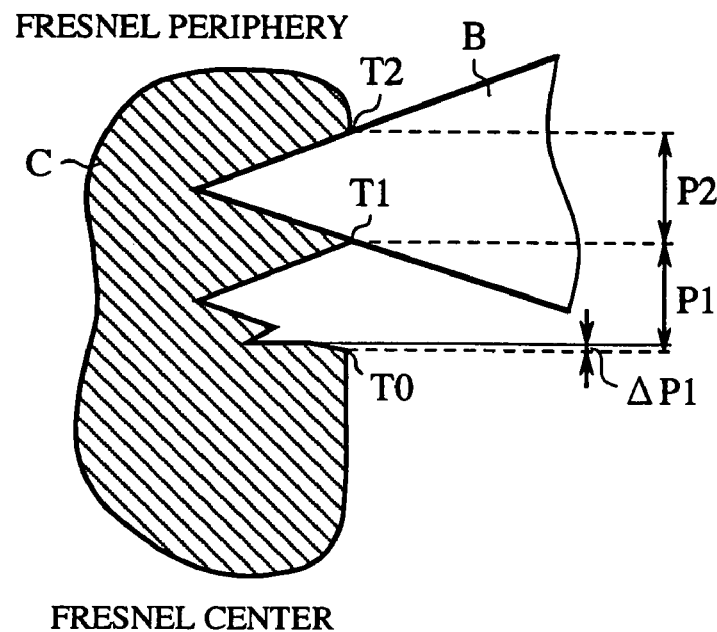

The pitch number n=2 is set in a step ST4. When the procedure returns from the step ST5 to the step ST2, the cutting work for the second pitch area P2 is performed, and the lens forming mold C is cut with the cutting tool B to form a total reflection type prism portion forming mold in the step ST2. The cutting work for the production of the total reflection type prism portion forming mold is shown in FIG. 35C. In the same manner as the cutting work shown in FIG. 33C, a sharp tip portion placed on a trough line T1 is generated in this cutting work between the first pitch area P1 and the second pitch area P2.

Figure 35D:
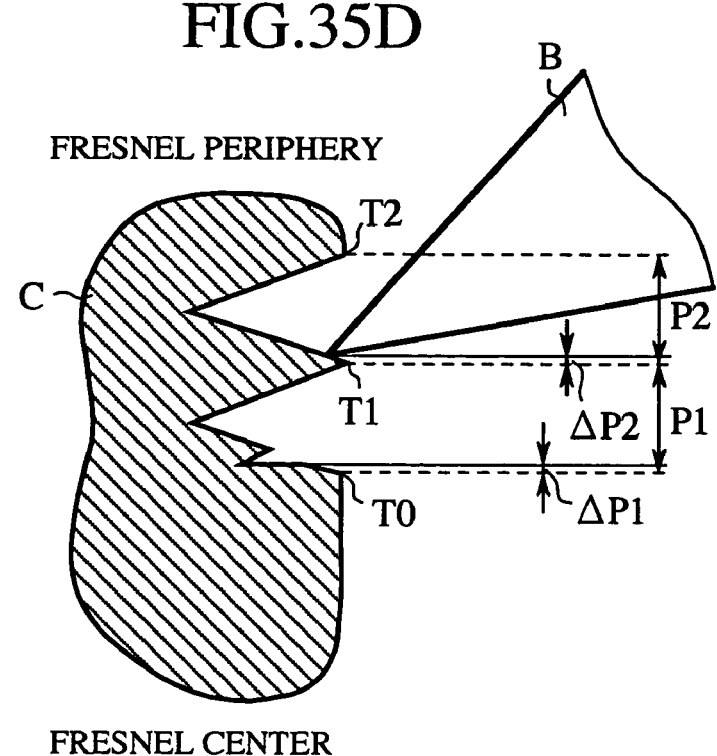
Figure 35E:
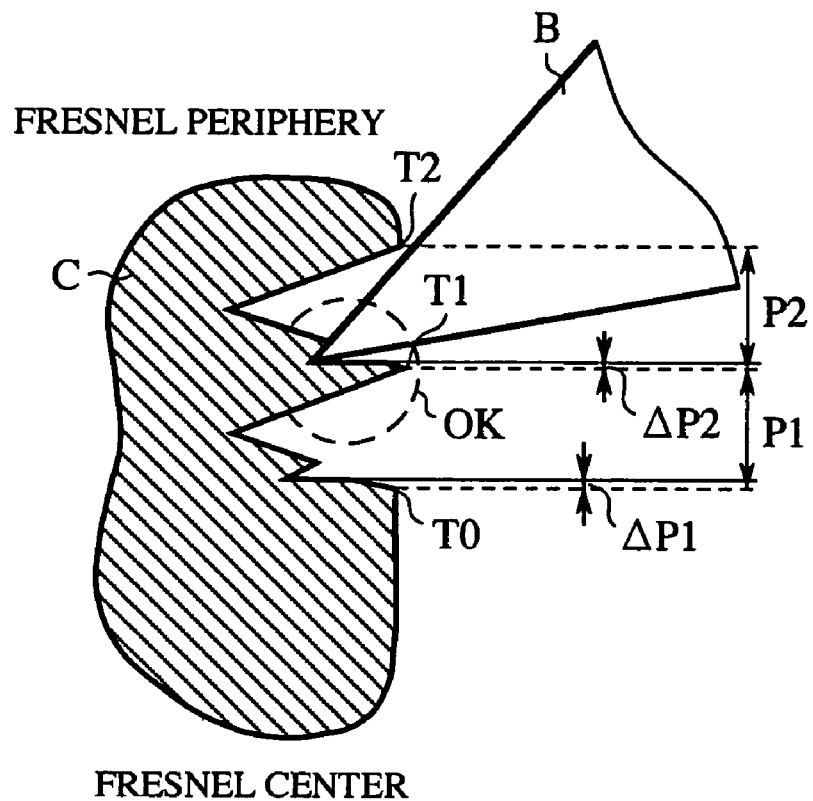

In the step ST6, a pitch margin ΔP2 (≧0) of the second pitch area P2 is set (refer to FIG. 35D), and the lens forming mold C is cut with the cutting tool B to form a refraction type prism portion forming mold according to the pitch margin ΔP2 in the step ST7 (refer to FIG. 35E). In this cutting work, the reason for setting a pitch margin in the step ST6 becomes apparent.

Figure 35F:
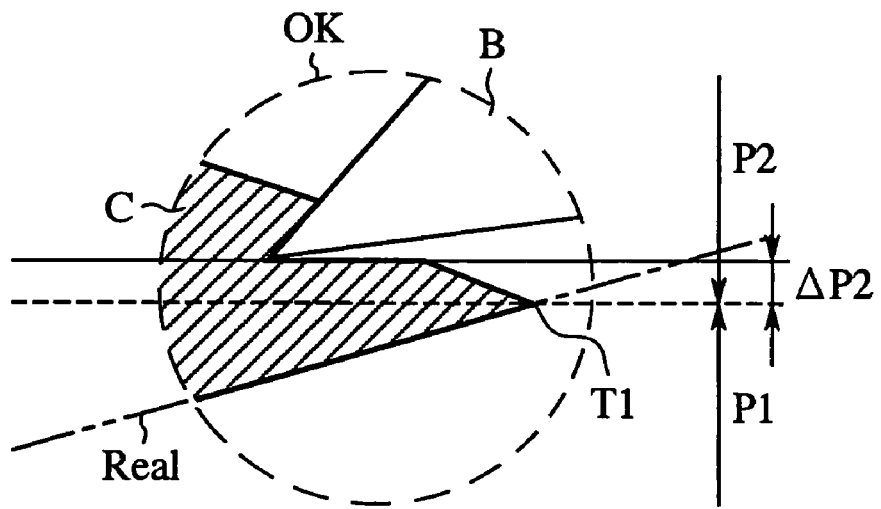

In detail, as is realized in FIG. 35D and FIG. 35E, a cutting start position is shifted in the direction from the Fresnel center to the Fresnel periphery by the pitch margin ΔP2 of a small width, and the lens forming mold C is cut with the cutting tool B to form the refraction type prism portion forming mold of the second pitch area P2. Therefore, the tip portion on the trough line T1 shown within a dotted circle OK (of which an enlarged view is shown in FIG. 35F) of FIG. 35E is strengthened to a certain degree corresponding to the pitch margin ΔP2. Therefore, even though the pushing force of the cutting tool B is exerted on the tip portion on the trough line T1 in the direction from the second pitch area P2 to the first pitch area P1 in the same manner as in FIG. 33D and FIG. 33E, the tip portion placed on the trough line T1 can have the strength resisting the pushing force of the cutting tool B.

Thereafter, until the completion of the cutting work is judged in the step ST5, the lens forming mold C is cut with the cutting tool B at a pitch margin ΔPn to form a refraction type prism portion forming mold of each pitch area Pn. Therefore, because no distortion occurs in the lens forming mold C in cases where the method of manufacturing a lens forming mold shown in FIG. 34 is adopted, the total reflection plane of each pitch area in the Fresnel lens manufactured from the lens forming mold C can be formed in the shape determined in the design, and the optical performance of the Fresnel lens can be guaranteed.

As additional description, it is applicable that the pitch margins A Pn in arbitrary n-th pitch areas Pn be set to a fixed small value or be set to certain small values different from each other respectively.

Also, in the above drawings, as an example, the total reflection type prism portion is set to the main unit-prism portion, and the refraction type prism portion is set to the subsidiary unit-prism portion, and the lens forming mold C is cut in the direction from the Fresnel center to the Fresnel periphery. However, the sixth embodiment is not restricted to this example. For example, it is applicable that the refraction type prism portion and the total reflection type prism portion be set to the mainunit-prismportionandthesubsidiaryunit-prismportionrespectively and the lens forming mold C be cut in the direction from the Fresnel periphery to the Fresnel center.

Next, a method of suppressing the influence of distortion, which is obtained by forming a dummy prism portion forming mold in a lens forming mold for the Fresnel lens having the intermediary prism portions (refer to the third embodiment), will be described.

Figure 36A:
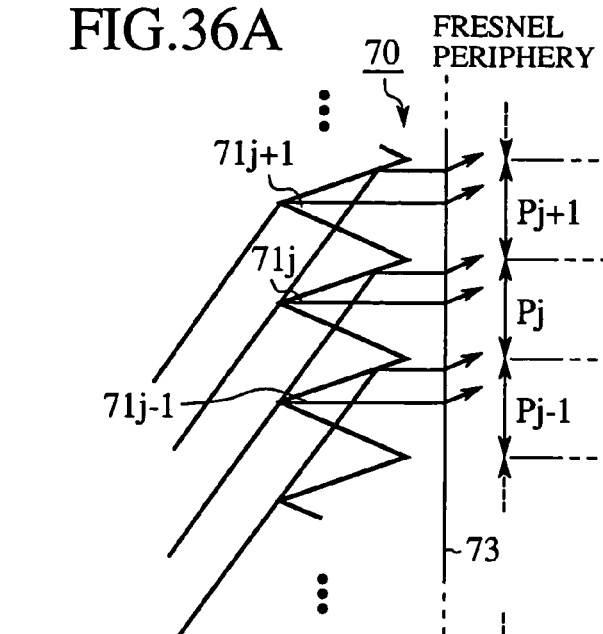
FIG. 36A and FIG. 36B are views explaining the configuration and operation of a Fresnel lens having no dummy prism portion.
Figure 36B:
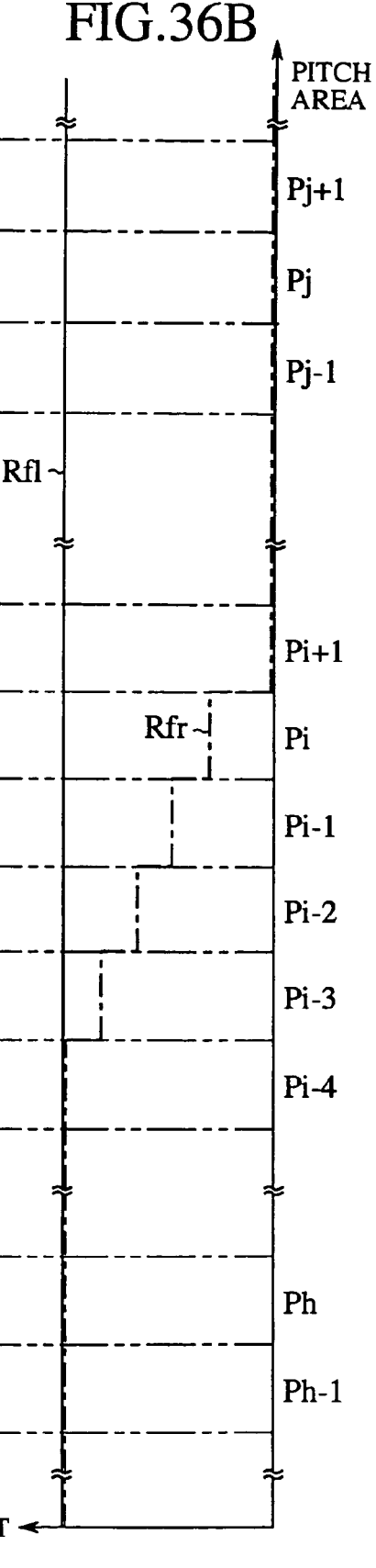

FIG. 36A and FIG. 36B are views explaining the configuration and operation of a Fresnel lens having no dummy prism portion, and FIG. 37A and FIG. 37B are views explaining the configuration and operation of a Fresnel lens having dummy prism portions.

In FIG. 36A and FIG. 37A, enlarged sectional shapes of the Fresnel lenses of FIG. 36A and FIG. 37A are respectively shown. Also, the height Rfl (indicated by a solid line) of the total reflection type prism portion of FIG. 36A and the height Rfr (indicated by a dot-dash line) of there fraction type prism portion of FIG. 36A are shown in FIG. 36B for each pitch area, and the height Rfl (indicated by a solid line) of the total reflection type prism portion of FIG. 37A and the height Rfr (indicated by a dot-dash line) of the refraction type prism portion of FIG. 37A are shown in FIG. 37B for each pitch area. The height denotes a cutting depth of a prism portion in an optical axis direction of the Fresnel lens. In FIG. 36A, FIG. 36B, FIG. 37A and FIG. 37B, the below in the drawing is directed toward the Fresnel center, and the above in the drawing is directed toward the Fresnel periphery.

In FIG. 36A and FIG. 37A, 70 indicates a Fresnel lens. Ph−1, Ph, - - -, Pi−4, - - -, Pi+1, - - -, Pj−1, - - -, and Pj+1 indicate a plurality of pitch areas of the Fresnel lens 70 respectively.

Also, 71h−1, 71h, - - -, 71i−4, - - -, 71i+1, - - -, 71j−1, - - -, and 71j+1 indicate a plurality of total reflection type prism portions placed in the pitch areas Ph−1 to Pj+1 respectively. 72h−1, 72h, - - -, 72i−4, - - -, and 72i indicate a plurality of refraction type prism portions placed in the pitch areas Ph−1 to Pi respectively. 73 indicates an outgoing plane of the Fresnel lens 70.

Also, only in FIG. 37A, 72i+1, - - -, 72j−1 and 72j indicate a plurality of refraction type prism portions (or dummy prism portions) placed in the pitch areas Pi+1, - - -, Pj−1 and Pj respectively. The heights Rfr of the refraction type prism portions 72i+1 to 72j are set to a low value (Rfr=0) as compared with the heights Rfl of the total reflection type prism portions 71i+1 to 71j, and the refraction type prism portions 72i+1 to 72j have no participation in the reception of rays of incident light.

In FIG. 36A and FIG. 37A, because the Fresnel lens 70 is manufactured by using the lens forming mold C manufactured without any pitch margin, it is realized that distortion (within dotted circles NG) occurs in the total reflection planes of the total reflection type prism portions 71h−1 to 71i−1 when the refraction type prism portions 72h−1 to 72i are cut (in the drawings, the shape of each distorted portion is linearly shown).

In addition, in the Fresnel lens 70 shown in FIG. 37A, the refraction type prism portions 72hi+1 to 72j are additionally arranged. Therefore, in addition to the distortion of the total reflection type prism portions 71h−1 to 71i−1, distortion (within dotted circles NG) occurs in the total reflection planes of the total reflection type prism portions 71i to 71j−1. The refraction type prism portions 72i+1 to 72j are intentionally arranged in the pitch areas Pi+1 to Pj. The existence of the refraction type prism portions 72i+1 to 72j denotes the difference between the Fresnel lens 70 shown in FIG. 36A and the Fresnel lens 70 shown in FIG. 37A.

In FIG. 36A, rays of light are incident at comparatively small incident angles on a group of center side pitch areas ranging from the pitch area Pi−4 to the Fresnel center. Therefore, a plurality of hybrid type prism portions having the total reflection type prism portions 71i−4, - - -, 71h, 71h−1, - - - and the refraction type prism portions 72i−4, - - -, 72h, 72h−1, - - - are formed in the group of center side pitch areas. As shown in FIG. 36A, the ratio of the height RFl to the height RFr in the group of center side pitch areas having the total reflection type prism portions 71i−4, - - -, 71h, 71h−1, - - - and the refraction type prism portions 72i−4, - - -, 72h, 72h−1, - - - is set to 1:1.

In contrast, in FIG. 36A, rays of light are incident at comparatively large incident angles on a group of periphery side pitch areas ranging from the pitch area Pi+1 to the Fresnel periphery. Because a refraction type prism portion hardly functions as a lens due to the deterioration of the transmissivity for a large incident angle, the height Rfr of the refraction type prism portion is set to zero (refer to FIG. 36B). Therefore, only the total reflection type prism portions 71i+1, - - -, 71j−1, 71j, 71j+1, - - - are formed in the group of periphery side pitch areas.

Also, as shown in FIG. 36B, in a group of intermediary pitch areas ranging from the pitch area Pi−3 to the pitch area Pi which are placed in a transient region from the group of center side pitch areas to the group of periphery side pitch areas shown in FIG. 36A, the height Rfr of each of the refraction type prism portions 72i−3 to 72i is gradually decreased in the direction from the Fresnel center side pitch area to the Fresnel periphery side pitch area, and a plurality of hybrid type prism portions (or a plurality of intermediary prism portions) having the refraction type prism portions 72i−3 to 72i are formed. The reason for gradually decreasing the height Rfr is to smoothly change transmissivity characteristics of the hybrid type prism portions in the transient region from the group of center side pitch areas to the group of periphery side pitch areas. Because the group of intermediary prism portions is arranged in the Fresnel lens 70 shown in FIG. 36A, transmissivity characteristics of the hybrid type prism portions can be smoothly changed fundamentally.

However, because distortion indicated within the dotted circles NG occurs in the total reflection planes of the total reflection type prism portions 71h−1 to 71i−1, discontinuity between the transmissivity of the pitch area Pi−1 and the transmissivity of the pitch area Pi becomes large in the Fresnel lens 70 shown in FIG. 36A. Therefore, in cases where the Fresnel lens 70 shown in FIG. 36A is applied to a screen, an unnatural boundary line is undesirably generated in the brightness of an image displayed on the screen.

In contrast, in the Fresnel lens 70 shown in FIG. 37A, it is presumed that distortion indicated within the dotted circles NG occurs in the total reflection planes of the total reflection type prism portions of the Fresnel lens 70 shown in FIG. 37A, and the refraction type prism portions 72i+1 to 72j are intentionally arranged in addition to the configuration of the Fresnel lens 70 shown in FIG. 36A. Therefore, discontinuity in transmissivity between pitch areas can be avoided in the Fresnel lens 70 shown in FIG. 37A in the different manner from that in the Fresnel lens 70 shown in FIG. 36A.

The difference between the Fresnel lens 70 of FIG. 37A and the Fresnel lens 70 of FIG. 36A will be described in more detail.

Figure 38A:
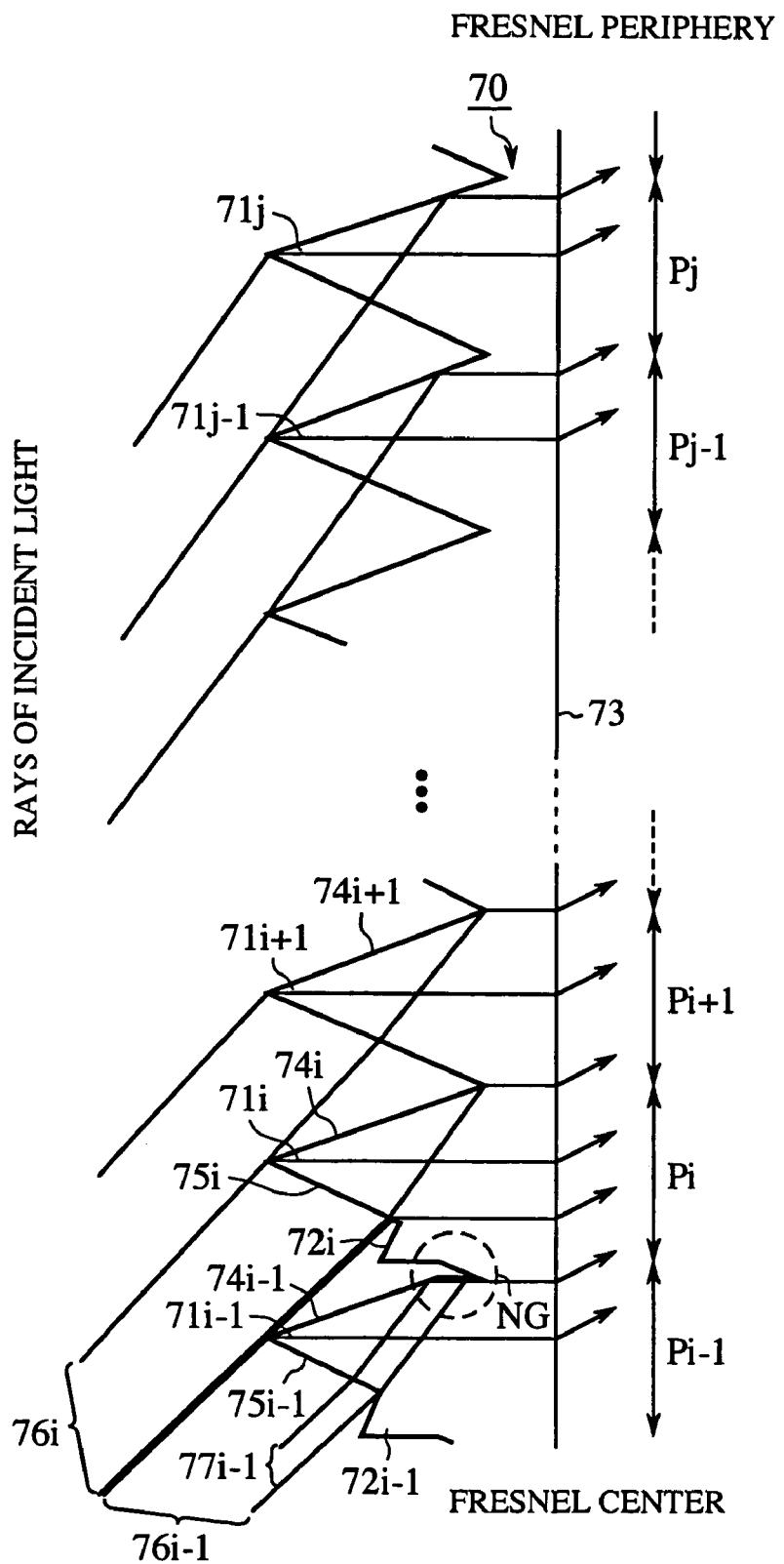
FIG. 38A and FIG. 38B are views explaining the difference between the Fresnel lens of FIG. 36A and the Fresnel lens of FIG. 37A.
Figure 38B:
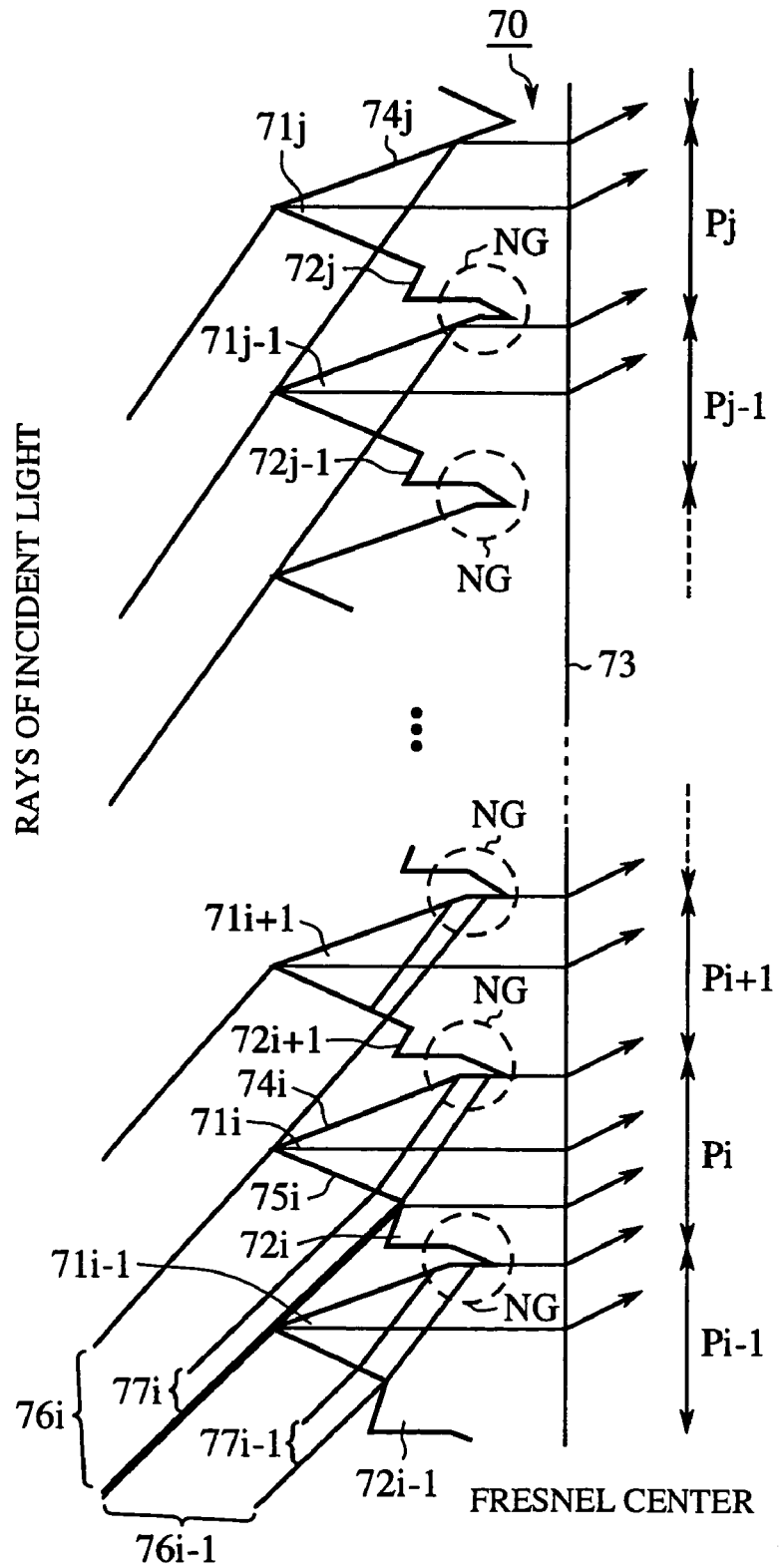

FIG. 38A and FIG. 38B are views explaining the difference between the Fresnel lens 70 of FIG. 37A and the Fresnel lens 70 of FIG. 36A. FIG. 38A is an enlarged view of the pitch areas Pi−1 to Pj in the Fresnel lens 70 of FIG. 36A, and FIG. 38B is an enlarged view of the pitch areas Pi−1 to Pj in the Fresnel lens 70 of FIG. 37A. The constituent elements, which are the same as those shown in FIG. 36A or FIG. 37A, are indicated by the same reference numerals as those of the constituent elements shown in FIG. 36A or FIG. 37A.

In the pitch area Pi−1 of FIG. 38A, because the final refraction type prism portion 72i is arranged in the pitch area Pi adjacent to the pitch area Pi−1 on the Fresnel periphery side, distortion indicated by a dotted circle NG occurs in the total reflection plane 74i−1 of the total reflection type prism portion 71i−1. Therefore, all the flux of incident light 76i−1 received on the incident plane 75i−1 of the total reflection type prism portion 71i−1 is not totally reflected on the total reflection plane 74i−1 to go out from the outgoing plane 73. In other words, a part of the flux of incident light 76i−1 refracted on the incident plane 75i−1 is scattered on the total reflection plane 74i−1 due to the distortion indicated by the dotted circle NG in a direction different from a total reflection direction originally set. Therefore, loss of the light is caused in the pitch area Pi−1.

In contrast, in the pitch area Pi of FIG. 38A, because no refraction type prism portion 72i is arranged in the pitch area Pi+1 adjacent to the pitch area Pi on the Fresnel periphery side, no distortion occurs in the total reflection plane 74i of the total reflection type prism portion 71i. Therefore, all the flux of incident light 76i received on the incident plane 75i of the total reflection type prism portion 71i is totally reflected on the total reflection plane 74i and goes out from the outgoing plane 73. Therefore, no loss of the light is caused in the pitch area Pi in the different manner from that in the pitch area Pi−1.

In the same manner, in the pitch areas Pi+1, - - - of FIG. 38A, no distortion occurs in the total reflection planes 74i+1, - - - . Therefore, discontinuity in the transmissivity between the pitch area Pi−1 having the loss of the light due to the distortion and the pitch area Pi having no loss of the light becomes large.

In contrast to the case of FIG. 38A, in the Fresnel lens 70 shown in FIG. 38B, it is presumed that distortion indicated within a dotted circle NG occurs in the total reflection plane 74i, and the refraction type prism portion 72i+1 having no participation in the reception of light is intentionally arranged in the pitch area Pi+1 adjacent to the pitch area Pi on the Fresnel periphery side. Therefore, a partial flux of light 77i is refracted on the incident plane 75i and is scattered on the total reflection plane 74i due to the distortion indicated by the dotted circle NG in a direction different from a total reflection direction originally set. Therefore, loss of the light is caused in the pitch area Pi in the same manner as in the pitch area Pi−1, and discontinuity in the transmissivity is avoided.

In the same manner, the refraction type prism portions 72i+2, - - - , 72j−1 and 72j having no participation in the reception of light are arranged in the pitch areas Pi+2, - - - , Pj−1 and Pj placed on the Fresnel periphery side of the pitch area Pi+1, and discontinuity in the transmissivity is avoided. Also, because incident angles of rays of incident light in remaining pitch areas placed on the Fresnel periphery side of the pitch areas Pi+2, - - - , Pj−1 and Pj become sufficiently large in the Fresnel lens 70, no total reflection is performed on the whole total reflection plane of each remaining pitch area. Therefore, each remaining pitch area has no dummy refractive type prism portion.

The pitch area Pj of FIG. 38B just corresponds to no total reflection on the whole total reflection plane. Because the incident angles of the rays of incident light are sufficiently large in the pitch area Pj, a portion of the total reflection plane 74j, in which the occurrence of distortion indicated by a dotted circle NG is expected, is not used for the total reflection of the incident light. Therefore, the difference in the light loss between the pitch area Pj and an adjacent pitch area Pj−1 has no connection with the existence of distortion indicated by a dotted circle NG.

Accordingly, because the refraction type prism portions 72i+1, - - - , 72j−1 and 72j having no participation in the reception of light are arranged in the pitch areas Pi+1, - - - , Pj−1 and Pj in which the total reflection type prism portions 71i+1, - - - , 71j−1 and 71j are arranged, discontinuity in the transmissivity due to the distortion indicated by the dotted circles NG can be prevented.

As is described above, in the sixth embodiment, the step ST6 for setting the pitch margin ΔPn is set after the step ST2, a cutting start position is shifted in a cutting performing direction by the pitch margin ΔP2, and each subsidiary unit-prism portion is cut in the step ST7. Therefore, when the subsidiary unit-prism portion is cut, distortion of the lens forming mold C occurring in the tip portion of the trough line Tn placed between main unit-prism portions for each pitch area can be prevented. Accordingly, the lens forming mold C can be formed in a shape determined in the design step, and the optical performance of the Fresnel lens manufactured from the lens forming mold C can be guaranteed.

Also, in the sixth embodiment, the hybrid type prism portions having the total reflection type prism portions and the refraction type prism portions are formed in the group of Fresnel center side pitch areas, only the total reflection type prism portions are formed in the group of Fresnel periphery side pitch areas, the height of each total reflection type prism portion is set to a fixed value in the group of intermediary pitch areas, and the height of each of the refraction type prism portions is gradually decreased in the group of intermediary pitch areas in the direction from the group of Fresnel center side pitch areas to the group of Fresnel periphery side pitch areas. In cases where the group of Fresnel center side pitch areas, the group of Fresnel periphery side pitch areas and the group of intermediary pitch areas are manufactured, the refraction type prism portions having a minimum height in the group of intermediary pitch areas and having no participation in the reception of the light are formed by the cutting work as dummy prism portions in the pitch areas ranging from the group of intermediary pitch areas to a part of the group of Fresnel periphery side pitch areas. Accordingly, discontinuity in the transmissivity due to the light loss caused by the distortion of the total reflection planes can be prevented.

In the sixth embodiment, the dummy prism portions are formed by the cutting work in the pitch areas ranging from the group of intermediary pitch areas to the group of Fresnel periphery side pitch areas. However, the sixth embodiment is not restricted to this feature. For example, in cases where the shape of the prism portion is changed for each pitch area to transfer from the shape of the hybrid type prism portion (including the intermediary prism portion) to the shape of either the refraction type prism portion or the total reflection prism portion or to transfer from the shape of either the refraction type prism portion or the total reflection prism portion to the shape of the hybrid type prism portion (including the intermediary prism portion), dummy prism portions are successively arranged in a part of the group of pitch areas in which the shape of the prism portion is changed. Therefore, a rapid disappearance and occurrence of a manufacturing error occurring by the change of the shape of the prism portion can be suppressed, and a rapid change of the optical performance such as transmissivity can be relieved.

EMBODIMENT 7

As is described in the first embodiment, the refraction type prism portion has the ineffective plane, the flux of incident light (or a group of rays of ineffective light) received on the ineffective plane is changed to stray light in the inside of the Fresnel lens, and the stray light goes out from the outgoing plane. Therefore, the ineffective plane generates ghosts on the screen. Also, according to conditions of the incident angle of the incident light, there is a case where there is a group of rays of light which is transmitted through the total reflection type prism portion but is not totally reflected on the total reflection plane. The group of rays is vulgarly expressed as striking-at-the-air rays not striking at the total reflection plane. The group of rays is also changed to stray light, and ghosts are generated on the screen. In a seventh embodiment, a Fresnel lens having a structure of absorbing stray light and reducing ghosts on the incident side or the outgoing side will be described.

Figure 39:
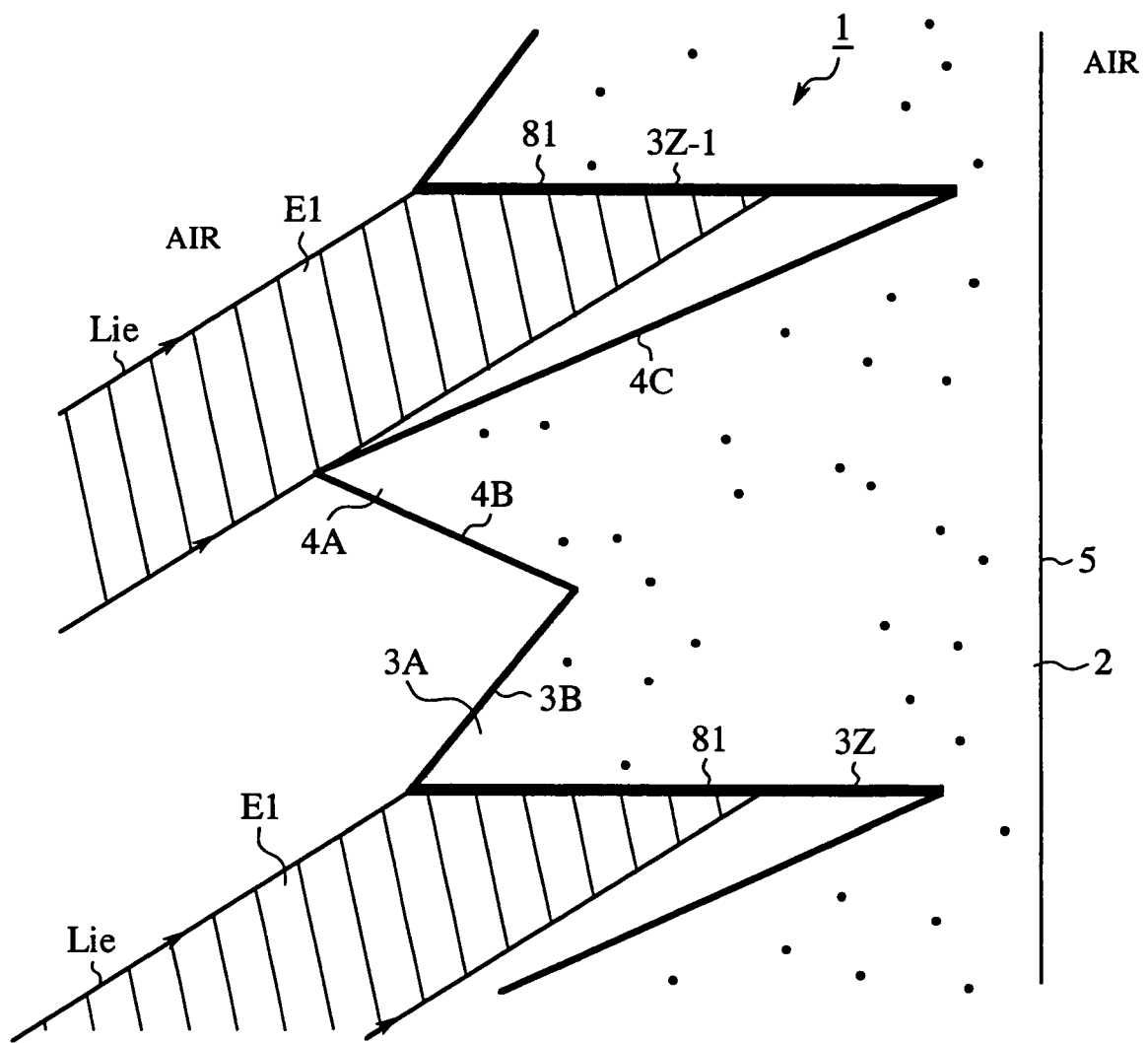
FIG. 39 is a view showing a sectional shape of a Fresnel lens according to a seventh embodiment of the present invention.

FIG. 39 is a view showing a sectional shape of a Fresnel lens according to a seventh embodiment of the present invention. A structure of reducing ghosts caused from rays of ineffective light is arranged on the incident side of the Fresnel lens 1. The constituent elements, which are the same as those shown in FIG. 9, are indicated by the same reference numerals as those of the constituent elements shown in FIG. 9.

In FIG. 39, 81 indicates a light absorbing layer arranged in each of the ineffective planes 3Z, 3Z-1, - - - of the refractive type prism portions 3A, - - - .

The light absorbing layer 81 absorbs rays of ineffective light Lie incident on each of the ineffective planes 3Z, 3Z-1, - - - of the pitch areas. Because the light absorbing layers 81 are arranged on the ineffective planes 3Z, 3Z-1, - - - respectively, the generation of stray light in the inside of the Fresnel lens 1 can be prevented, and ghosts generated on the screen can be reduced.

Figure 40:
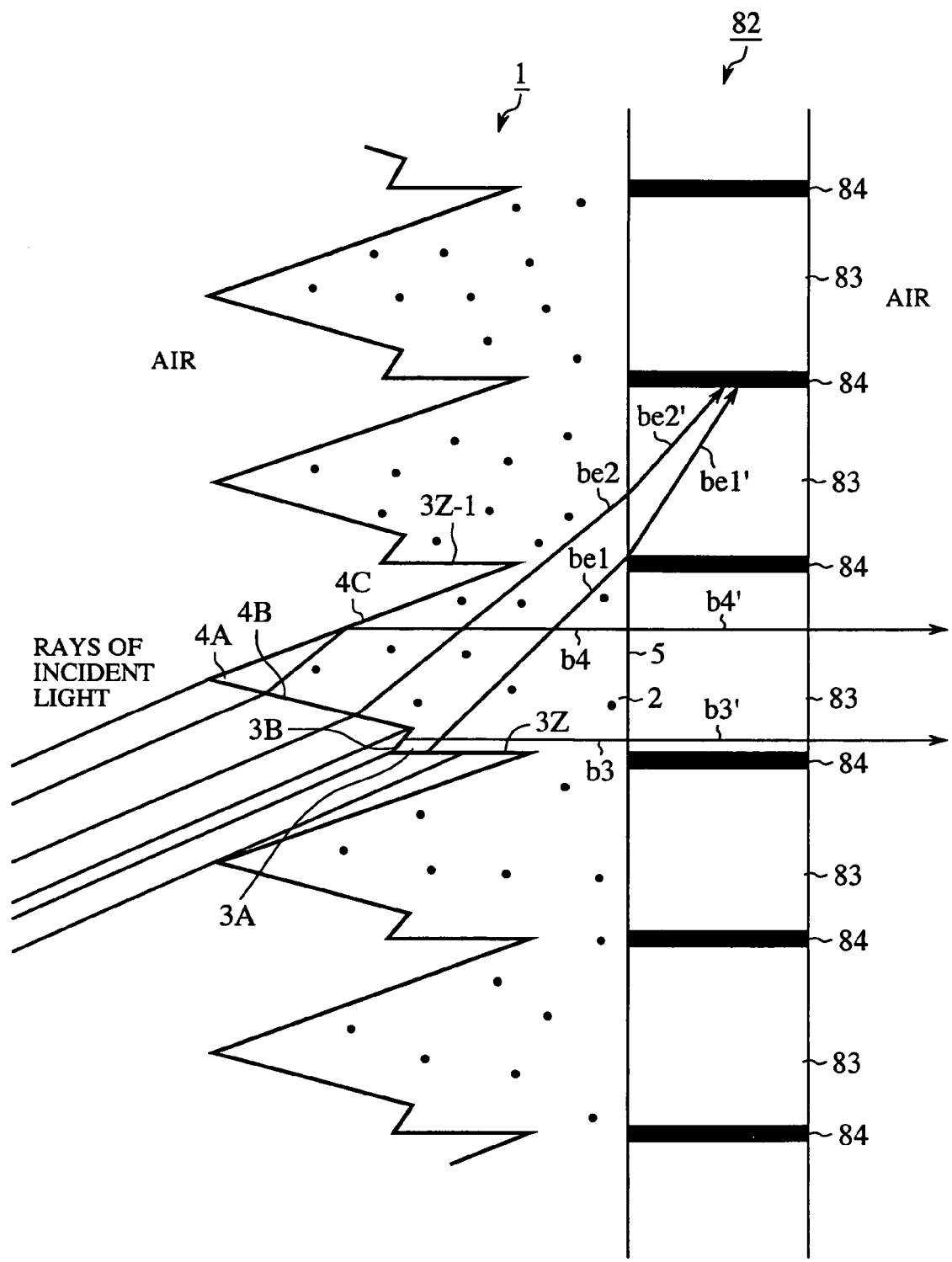
FIG. 40 is a view showing a sectional shape of another Fresnel lens according to the seventh embodiment of the present invention.

FIG. 40 is a view showing a sectional shape of another Fresnel lens according to the seventh embodiment of the present invention. A structure of absorbing stray light derived from rays of ineffective light or swishing-the-air rays on the outgoing plane is shown. The constituent elements, which are the same as those shown in FIG. 9, are indicated by the same reference numerals as those of the constituent elements shown in FIG. 9.

In FIG. 40, 82 indicates a stray light absorbing plate arranged on the outgoing plane 5 of the Fresnel lens 1. The stray light absorbing plate 82 is formed of a plane parallel plate having both an incident plane and an outgoing plane parallel to the outgoing plane 5 of the Fresnel lens 1. A plurality of light transmitting layers 83 and a plurality of thin-film light absorbing layers 84 are alternately layered in the stray light absorbing plate 82 so as to be parallel to the optical axis (not shown) of the Fresnel lens 1. Rays of light transmit through each light transmitting layer 83, and rays of light are absorbed in each light absorbing layer 84.

As shown in FIG. 40, as compared with both an optical path of a ray of light b3 received on the incident plane 3B of the refraction type prism portion 3A and an optical path of a ray of light b4 received on the incident plane 4B of the total reflection type prism portion 4A, a ray of stray light be1 is generated in the inside of the Fresnel lens 1 from a ray of light incident on each ineffective plane 3Z, 3Z-1, - - - , a ray of stray light be2 is generated from a striking-at-the-air ray which is incident on the incident plane 4B of the total reflection type prism portion 4A and does not strike at the total reflection plane 4C, and the ray of stray light be1 and the ray of stray light be2 propagated through the Fresnel lens 1 are greatly inclined toward a radial direction of the Fresnel lens 1. Therefore, when the ray of stray light be1 and the ray of stray light be2 go out from the outgoing plane 5 of the Fresnel lens 1 and are changed to rays of light be1' and be2' respectively, the rays of light be1' and be2' are absorbed in the light absorbing layer 84 layered in parallel to the optical axis of the Fresnel lens 1.

Also, the ray of light b3 received on the incident plane 3B of the refraction type prism portion 3A and the ray of light b4 received on the incident plane 4B of the total reflection type prism portion 4A go out from the outgoing plane 5 and are changed to rays of light b3' and b4', and parts of the rays of light b3' and b4' are absorbed in the light absorbing layer 84. However, because the rays of light b3' and b4' go out almost in parallel to the optical axis of the Fresnel lens 1, an amount of the rays of light b3' and b4' absorbed in the light absorbing layer 84 is very small. Therefore, the greater parts of the rays of light b3' and b4' are transmitted through the light transmitting layer 83 and are propagated to the lenticular (not shown). Therefore, there is no great problem.

Figure 41A:
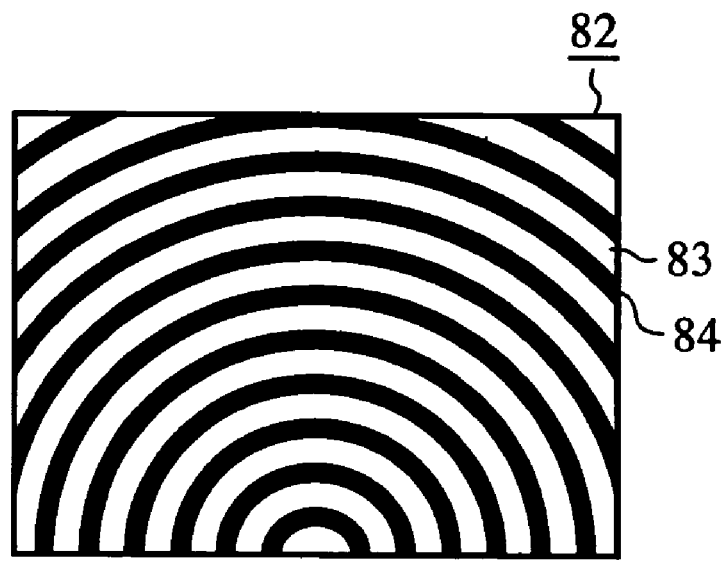
FIG. 41A and FIG. 41B are views respectively showing an example of a layered structure of light transmitting layers and light absorbing layers.
Figure 41B:
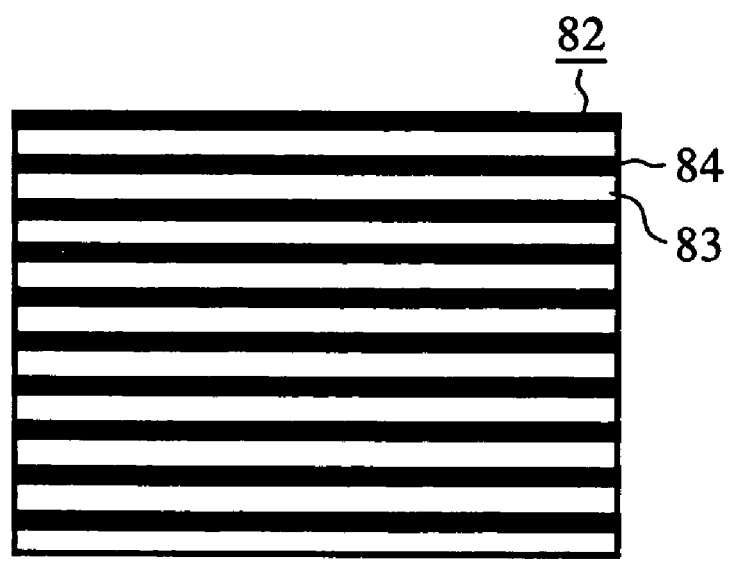

Here, as shown in FIG. 41A, it is applicable that the layered structure of the light transmitting layers 83 and the light absorbing layers 84 be formed in a concentric circular shape (or a radial manner) by placing the optical axis of the Fresnel lens 1 in the center of concentric circles. Also, as shown in FIG. 41B, it is applicable that the light transmitting layers 83 and the light absorbing layers 84 be layered in upper and lower directions in FIG. 41B so as to extend each of the layers 83 and 84 in right and left directions in FIG. 41B. In this case, when the Fresnel lens 1 is applied to a screen having an aspect ratio of 3:4, a ratio of the length in upper and lower directions to the length in right and left directions is 3:4.

In cases where the configuration of the Fresnel lens 1 shown in FIG. 41A is adopted, an absorption efficiency of the stray light can be maximized. Also, in cases where the configuration of the Fresnel lens 1 shown in FIG. 41B is adopted, the stray light absorbing plate 82 can be easily manufactured, and a manufacturing cost can be reduced.

Also, it is applicable that a layered interval between each pair of the light absorbing layers 84 adjacent each other (or a thickness of each light transmitting layer 83) be set to the pitch of the Fresnel lens 1 or be changed according to a distance between the optical axis of the Fresnel lens 1 and the pair of the light absorbing layers 84. In other words, the layered interval between each pair of the light absorbing layers 84 can be freely designed according to specifications. In addition, the pitch of the light absorbing layers 84 in the layered structure should be set so as to prevent moire fringes from occurring due to the interference with a periodical structure of the lenticular (not shown).

Also, it is applicable that a plurality of slits used for the embedding of the light absorbing layers 84 be arranged on the side of the outgoing plane 5 of the Fresnel lens 1 in case of the layered pattern shown in FIG. 41A or FIG. 41B and the light absorbing layers 84 be arranged in the slits. In this case, it is preferred that paint having a light absorbing performance is packed in the slits to form the light absorbing layers 84. Therefore, because the stray light absorbing plate 82 arranged on the outgoing plane 5 of the Fresnel lens 1 is integrally formed with the Fresnel lens 1, the number of constituent parts can be reduced.

Figure 42:
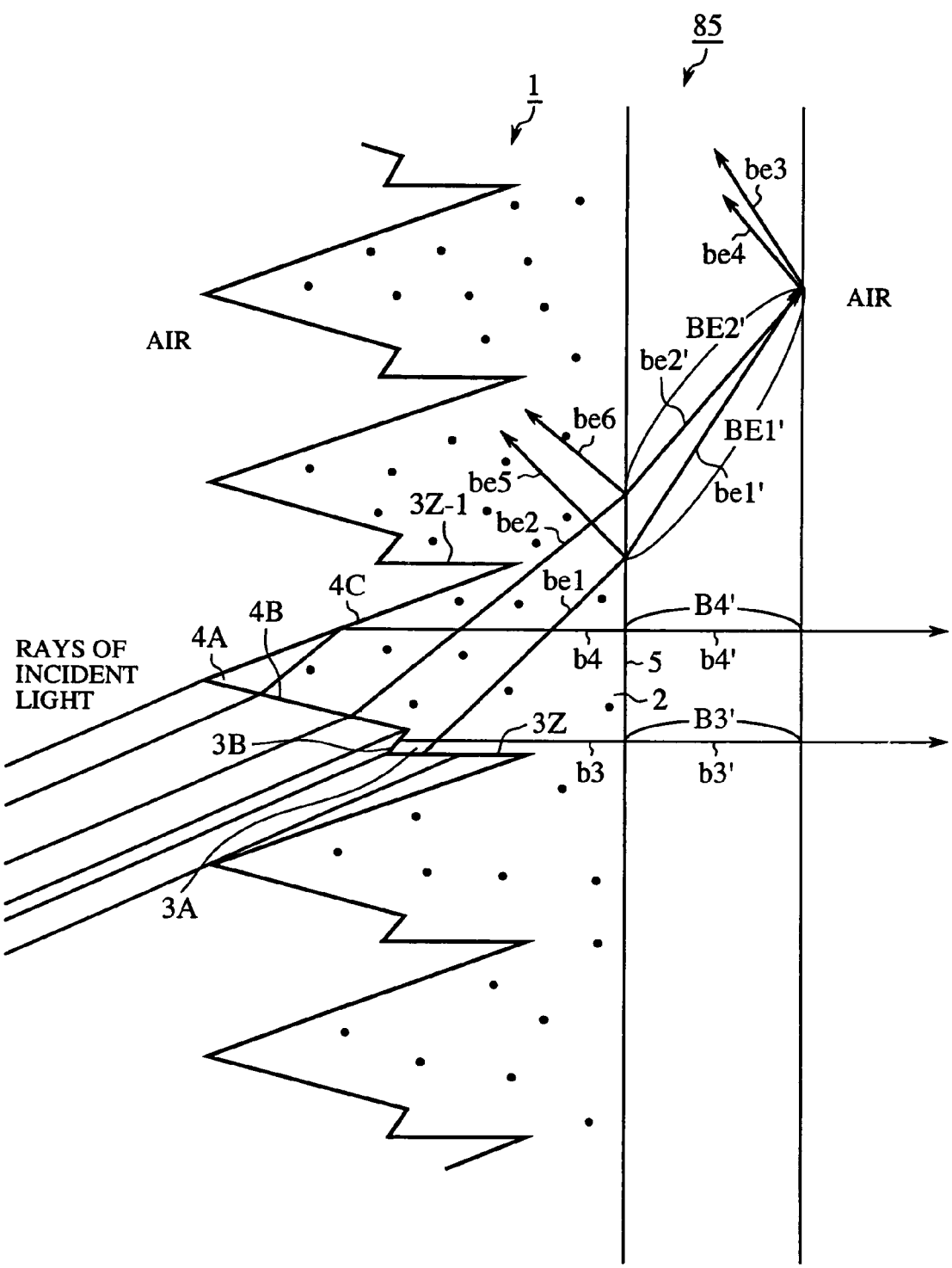
FIG. 42 is a view showing a sectional shape of another Fresnel lens according to the seventh embodiment of the present invention.

FIG. 42 is a view showing a sectional shape of another Fresnel lens according to the seventh embodiment of the present invention. A structure of absorbing stray light, which is generated from rays of light received on the ineffective plane, on the side of the outgoing plane is shown. The constituent elements, which are the same as those shown in FIG. 9 or FIG. 40, are indicated by the same reference numerals as those of the constituent elements shown in FIG. 9 or FIG. 40.

In FIG. 42, 85 indicates a light absorbing plate arranged on the side of the outgoing plane 5 of the Fresnel lens 1. The light absorbing plate 85 is formed of a plane parallel plate having both an incident plane and an outgoing plane parallel to the outgoing plane 5 of the Fresnel lens 1.

As is described with reference to FIG. 40, the ray of stray light be1 and the ray of stray light be2 propagated through the Fresnel lens 1 are greatly inclined toward a radial direction of the Fresnel lens 1. Therefore, as compared with both an optical path length B3' of the ray of light b3' received on the incident plane 3B of the refraction type prism portion 3A and going out from the outgoing plane 5 and an optical path B4' length of the ray of light b4' received on the incident plane 4B of the total reflection type prism portion 4A and going out from the outgoing plane 5, optical path lengths BE1' and BE2' of the rays of stray light be1' and be2' propagated through the light absorbing plate 85 are longer than the optical path lengths B3' and B4'. Therefore, the absorption of the stray light be1' and be2' in the light absorbing plate 85 is larger than that of the light b3' and b4' by a degree corresponding to the difference between the optical path length BE1' or BE2' and the optical path length B3' or B4', and the intensity of the rays of the stray light be1' and be2' going out from the light absorbing plate 85 can be reduced.

Also, optical path lengths of rays of the stray light be3 and be4 reflected many times in the inside (or on the outgoing plane) of the light absorbing plate 85 are further lengthened to a degree corresponding to the number of reflections, and the rays of the stray light be3 and be4 are largely absorbed in the light absorbing plate 85. Therefore, the intensity of the rays of the stray light be3 and be4 is lowered than that of the rays of the stray light be1' and be2', and there is no problem.

Also, rays of the stray light be5 and be6 reflected on the side of the incident plane of the light absorbing plate 85 are refracted and reflected (many times) in various portions of the Fresnel lens 1 and are incident on the light absorbing plate 85. Therefore, the intensity of rays of light refracted and reflected in various portions of the Fresnel lens 1 and going out from the Fresnel lens 1 is further reduced by a loss received due to the refraction and reflection in the various portions of the Fresnel lens 1.

Therefore, the stray light can be absorbed in a simple structure by using the light absorbing plate 85, and ghosts generated on the screen can be reduced.

Here, it is applicable that the structures of reducing the ghosts shown in FIG. 39 to FIG. 42 be arbitrarily combined to absorb the stray light. For example, the combination of the light absorbing layers 81 and the stray light absorbing plate 82 or the combination of the light absorbing layers 81 and the light absorbing plate 85 is applied to the Fresnel lens 1. In this case, the stray light can be further absorbed, and ghosts generated on the screen can be further reduced.

As is described above, in the seventh embodiment, the thin-film type light absorbing layers 81 used to absorb light are arranged on the ineffective planes 3Z, 3Z-1, - - - of the refraction type prism portions 3A respectively. Therefore, the generation of stray light in the inside of the Fresnel lens 1 can be prevented, and ghosts generated on the screen can be reduced.

Also, in the seventh embodiment, the stray light absorbing plate 82 having the plurality of light absorbing layers 84 and the plurality of light transmitting layers 83 alternately arranged and respectively layered almost in parallel to the optical axis of the Fresnel lens 1 is arranged on the outgoing plane 5. Therefore, the stray light generated in the inside of the Fresnel lens 1 can be absorbed, and ghosts generated on the screen can be reduced.

Also, in the seventh embodiment, because the stray light absorbing plate 82 is arranged on the outgoing plane 5 of the Fresnel lens 1 and is integrally formed with the Fresnel lens 1, the stray light can be absorbed by using a structure in which the number of constituent parts is small.

Also, in the seventh embodiment, the light transmitting layers 83 and the light absorbing layers 84 are layered in a concentric circular shape (or a radial manner) by placing the optical axis of the Fresnel lens 1 in the center of concentric circles. Accordingly, an absorption efficiency of the stray light can be maximized.

Also, in the seventh embodiment, the light transmitting layers 83 and the light absorbing layers 84 are layered in parallel to one direction. Accordingly, the stray light absorbing plate 82 can be easily manufactured, and a manufacturing cost of the stray light absorbing plate 82 can be reduced.

Also, in the seventh embodiment, because the light absorbing plate 85 is arranged on the outgoing plane 5 of the Fresnel lens 1, the stray light can be absorbed in a simple structure using the light absorbing plate 85, and ghosts generated on the screen can be reduced.

INDUSTRIAL APPLICABILITY

As is described above, the Fresnel lens according to the present invention is appropriate to a rear projection type projection system in which rays of image light are projected onto a screen from the rear side of the screen.

We claim:

1. A Fresnel lens, comprising:
   a pitch area having a hybrid type prism portion which has both a refraction type prism portion for making a ray of first incident light having a prescribed incident angle go out according to a first refraction phenomenon and a second refraction phenomenon as a ray of first outgoing light having a prescribed outgoing angle; and
   a total reflection prism portion for making a ray of second incident light having the prescribed incident angle go out according to a third refraction phenomenon, a total reflection phenomenon and a fourth refraction phenomenon as a ray of second outgoing light parallel to the ray of first outgoing light.

2. A Fresnel lens according to claim 1, further comprising another pitch area having the hybrid type prism portion or a plurality of other pitch areas having the hybrid type prism portions respectively, wherein a ratio of an area occupied by the refraction type prism portion to an area occupied by the hybrid type prism portion in each pitch area differs from ratios in the other pitch areas.

3. A Fresnel lens according to claim 1, further comprising:
a light absorbing plate, arranged on the outgoing layer, for absorbing light.

4. A Fresnel lens according to claim 1, further comprising:
a group of pitch areas in which a plurality of dummy prism portions are successively arranged, wherein a height of each dummy prism portion in an optical axis direction is set not to have relation to the reception of light.

5. A screen according to claim 1, wherein the image forming and diffusing means is arranged on the outgoing plane to be integrally formed with the Fresnel lens.

6. A Fresnel lens, in which a ray of incident light having a prescribed incident angle goes out through a prism portion as a ray of outgoing light having a prescribed outgoing angle for each pitch area, comprising:
a plurality of pitch areas respectively having a hybrid type prism portion which has both a refraction type prism portion and a total reflection prism portion integrally formed with each other, wherein
a sectional shape of the refraction type prism portion of each pitch area is formed by:
a first incident plane for changing a ray of first incident light incident at a prescribed incident angle to a ray of first transmitted light according to a first refraction phenomenon;
a plane-shaped outgoing plane for changing the ray of first transmitted light obtained on the first incident plane to a ray of first outgoing light having a prescribed outgoing angle according to a second refraction phenomenon; and
an ineffective plane connecting with the first incident plane and an adjacent pitch area, a sectional shape of the total reflection type prism portion of each pitch area is formed by:
a second incident plane for changing a ray of second incident light incident at the prescribed incident angle to a ray of second transmitted light according to a third refraction phenomenon;
a total reflection plane for changing the ray of second transmitted light obtained on the second incident plane to a ray of third transmitted light parallel to the ray of first transmitted light according to a total reflection phenomenon; and
the ray of third transmitted light obtained in the total reflection plane is changed to a ray of second outgoing light having the prescribed outgoing angle according to a fourth refraction phenomenon on the outgoing plane, and
a portion of the ray of second incident light not changed to the ray of third transmitted light is received as the ray of first incident light.

7. A Fresnel lens according to claim 3, wherein the second incident plane of each pitch area is formed in a sectional shape so as to make the second incident plane conceal the ineffective plane of the hybrid type prism portion arranged in an adjacent pitch from a view seen in a direction of a ray of ineffective light incident on the ineffective plane, and the total reflection plane of each pitch area is formed in a second incident plane compensating shape so as to compensate for the sectional shape of the second incident plane.

8. A Fresnel lens according to claim 3, wherein a small incident angle region is determined according to a characteristic changing angle at which transmissivity of the hybrid type prism portion is equal to that of the refraction type prism portion, and the refraction type prism portion is arranged in each of pitch areas placed in the small incident angle region.

9. A Fresnel lens according to claim 4, wherein a mixing ratio of the refraction type prism portion to the hybrid type prism portion is increased with the decrease of the incident angle in each of pitch areas corresponding to a characteristic changing region neighboring to the characteristic changing angle.

10. A Fresnel lens according to claim 8, wherein an intermediary prism portion is arranged as one hybrid type prism portion in each of pitch areas corresponding to a characteristic changing region neighboring to the characteristic changing angle, an area of the second incident plane of the intermediary prism portion is slightly decreased with the decrease of the incident angle, and an area of the first incident plane of the intermediary prism portion is slightly increased with the decrease of the incident angle.

11. A Fresnel lens according to claim 4, wherein a small incident angle region is determined according to a characteristic changing angle at which transmissivity of the hybrid type prism portion is equal to that of the refraction type prism portion, and the refraction type prism portion is arranged in each of pitch areas placed in the small incident angle region.

12. A Fresnel lens according to claim 11, wherein a mixing ratio of the refraction type prism portion to the hybrid type prism portion is increased with the decrease of the incident angle in each of pitch areas corresponding to a characteristic changing region neighboring to the characteristic changing angle.

13. A Fresnel lens according to claim 11, wherein an intermediary prism portion is arranged as one hybrid type prism portion in each of pitch areas corresponding to a characteristic changing region neighboring to the characteristic changing angle, an area of the second incident plane of the intermediary prism portion is slightly decreased with the decrease of the incident angle, and an area of the first incident plane of the intermediary prism portion is slightly increased with the decrease of the incident angle.

14. A Fresnel lens according to claim 6, wherein a top blade angle between the second incident plane and the total reflection plane is set to a most-acute angle in a range in which an angle between the second incident plane and the outgoing plane is not obtuse.

15. A Fresnel lens according to claim 14, wherein the top blade angle is set to an angle larger than the most-acute angle in a small incident angle region corresponding to incident angles smaller than a specific incident angle at which transmissivity corresponding to the top blade angle set to the most-acute angle is equal to transmissivity corresponding to the top blade angle different from the most-acute angle.

16. A Fresnel lens according to claim 6, wherein the prescribed outgoing angle is set to a value larger than zero degree in each of pitch areas corresponding to incident angles at which transmissivity of the hybrid type prism portions is decreased.

17. A Fresnel lens according to claim 6, wherein the Fresnel lens is cut out in a rectangular shape so as to have four sides, a boundary ring band of the Fresnel lens intersects only one side nearest to an optical axis among the four sides of the Fresnel lens, the outgoing angle is set so as to make the ray of first outgoing light and the ray of second outgoing light going out on a lens periphery side of the boundary ring band be parallel to the optical axis, and the outgoing angle of the ray of first outgoing light and the ray of second outgoing light going out on an optical axis side of the boundary ring band is set to a value larger than that corresponding to the ray of first outgoing light and the ray of second outgoing light going out in parallel to the optical axis.

18. A Fresnel lens according to claim 6, wherein each refraction type prism portion has a thin-film light absorbing layer on the ineffective plane, and the thin-film light absorbing layer absorbs light.

19. A Fresnel lens according to claim 6, further comprising: a stray light absorbing plate which is arranged on the outgoing plane and has a plurality of light transmitting layers and a plurality of light absorbing layers alternately layered almost in parallel to an optical axis of the Fresnel lens, wherein a ray of light is transmitted through each light transmitting layer, and light is absorbed in each light absorbing layer.

20. A Fresnel lens according to claim 19, wherein the stray light absorbing plate arranged on the outgoing plane is integrally formed with the Fresnel lens.

21. A Fresnel lens according to claim 19, wherein the light transmitting layers and the light absorbing layers are layered in a concentric circular shape while centering around the optical axis of the Fresnel lens.

22. A Fresnel lens according to claim 19, wherein the light transmitting layers and the light absorbing layers are layered in a direction almost in parallel to each other.

23. A Fresnel lens according to claim 3, further comprising: a light absorbing plate, arranged on the outgoing layer, for absorbing light.

24. A Fresnel lens according to claim 6, wherein the hybrid type prism portions are formed while having a pitch margin between each pair of pitch areas adjacent to each other.

25. A Fresnel lens according to claim 3, further comprising:
a group of pitch areas in which a plurality of dummy prism portions are successively arranged, wherein a height of each dummy prism portion in an optical axis direction is set not to have relation to the reception of light.

26. A screen, comprising:
the Fresnel lens according to claim 1; and
an image forming and diffusing means for receiving the ray of outgoing light, to which display contents are added, from the Fresnel lens, forming an image from the ray of outgoing light and diffusing the image.

27. A screen according to claim 3, wherein the image forming and diffusing means is arranged on the outgoing plane to be integrally formed with the Fresnel lens.

28. An image displaying device, comprising:
the screen according to claim 3; illumination light source means for emitting a plurality of rays of light almost parallel to each other;
converging optics means for converging the rays of light emitted from the illumination light source means;
optical modulating means for spatially changing intensities of the rays of light converged by the converging optics means so as to modulate the rays of light according to the display contents; and
projection optics means for projecting the rays of light modulated by the optical modulating means onto the screen.

29. A Fresnel lens, comprising:
a plurality of total reflection type prism portions which are arranged on a light incident side and respectively have both a second incident plane, on which a plurality of rays of light are incident, and a total reflection plane, on which a part of the rays of light are totally reflected and are deflected in a desired direction,
wherein each total reflection type prism portion has a subsidiary unit-prism portion arranged in a part of the second incident plane on which a ray of light expected not to be totally reflected on the total reflection plane is incident, and
the subsidiary unit-prism portion functions as a refraction type prism portion having a first incident plane on which the ray of incident light is refracted to be deflected in the desired direction;
wherein a plane obtained by extending the first incident plane of each subsidiary unit-prism portion is placed in a position shifted from the total reflection plane toward a light outgoing side in a range of the corresponding total reflection type prism portion.

30. A Fresnel lens according to claim 29, wherein a ratio of each subsidiary unit-prism portion to the corresponding second incident plane differs from those of the other subsidiary unit-prism portions.

31. A Fresnel lens, comprising:
a plurality of total reflection type prism portions which are arranged on a light incident side and respectively have both a second incident plane, on which a plurality of rays of light are incident, and a total reflection plane, on which a part of the rays of light are totally reflected and are deflected in a desired direction,
wherein each total reflection type prism portion has a subsidiary unit-prism portion arranged in a part of the second incident plane on which a ray of light expected not to be totally reflected on the total reflection plane is incident, and
the subsidiary unit-prism portion functions as a refraction type prism portion having a first incident plane on which the ray of incident light is refracted to be deflected in the desired direction;
wherein a ratio of each subsidiary unit-prism portion to the corresponding second incident plane differs from those of the other subsidiary unit-prism portions.

32. A Fresnel lens, comprising:
a plurality of refraction type prism portions which are arranged on a light incident side and respectively have both a first incident plane, on which a ray of incident light is refracted to be deflected in a desired direction, and an ineffective plane different from the first incident plane,
wherein each refraction type prism portion has a subsidiary unit-prism portion arranged on the first incident plane, a ray of light expected to be incident on the ineffective plane of another adjacent refraction type prism portion placed on a Fresnel periphery side is received in the subsidiary unit-prism portion, and
the subsidiary unit-prism portion functions as a total reflection type prism portion having both a second incident plane, on which a ray of light is received, and a total reflection plane on which the ray of light received on the second incident plane is totally reflected to be deflected in the desired direction.

33. A Fresnel lens according to claim 32, wherein a plane obtained by extending the second incident plane of each subsidiary unit-prism portion is placed in a position shifted from the ineffective plane toward a light outgoing side in a range of the corresponding refraction type prism portion.

34. A Fresnel lens according to claim 33, wherein a ratio of each subsidiary unit-prism portion to the corresponding first incident plane differs from those of the other subsidiary unit-prism portions.

35. A Fresnel lens according to claim 32, wherein a ratio of each subsidiary unit-prism portion to the corresponding first incident plane differs from those of the other subsidiary unit-prism portions.

36. A Fresnel lens according to claim 32, wherein a second Fresnel lens different from the Fresnel lens arranged on a plane of a light incident side is arranged on a plane of a light outgoing side of the Fresnel lens.

37. A Fresnel lens, comprising:
a first region in which a plurality of total reflection type prism portions which are arranged on a light incident side and respectively have both a second incident plane, on which a plurality of rays of light are incident, and a total reflection plane, on which a part of the rays of light are totally reflected and are deflected in a desired direction,
wherein each total reflection type prism portion has a subsidiary unit-prism portion arranged in a part of the second incident plane on which a ray of light expected not to be totally reflected on the total reflection plane is incident, and
the subsidiary unit-prism portion functions as a refraction type prism portion having a first incident plane on which the ray of incident light is refracted to be deflected in the desired direction; and
a second region in which a plurality of refraction type prism portions respectively having both a first incident plane, on which a ray of incident light is refracted to be deflected in a desired direction, and an ineffective plane different from the first incident plane are arranged on a light incident side,
wherein each refraction type prism portion has a subsidiary unit-prism portion arranged on the first incident plane, a ray of light expected to be incident on the ineffective plane of another adjacent refraction type prism portion placed on a Fresnel periphery side is received in the subsidiary unit-prism portion, and the subsidiary unit-prism portion functions as a total reflection type prism portion having both a second incident plane, on which a ray of light is received, and a total reflection plane on which the ray of light received on the second incident plane is totally reflected to be deflected in the desired direction.

38. A Fresnel lens according to claim 37, wherein a ratio of the subsidiary unit-prism portion to the corresponding second incident plane in the first region is increased as the subsidiary unit-prism portion approaches a boundary between the first region and the second region, the ratio of the subsidiary unit-prism portion to the corresponding second incident plane in the first region is decreased as the subsidiary unit-prism portion is far away from the boundary, a ratio of the subsidiary unit-prism portion to the corresponding first incident plane in the second region is increased as the subsidiary unit-prism portion approaches the boundary, and the ratio of the subsidiary unit-prism portion to the corresponding first incident plane in the second region is decreased as the subsidiary unit-prism portion is far away from the boundary.

39. A Fresnel lens, comprising:
a plurality of total reflection type prism portions which are arranged on a light incident side and respectively have both a second incident plane, on which a plurality of rays of light are incident, and a total reflection plane, on which a part of the rays of light are totally reflected and are deflected in a desired direction,
wherein each total reflection type prism portion has a subsidiary unit-prism portion arranged in a part of the second incident plane on which a ray of light expected not to be totally reflected on the total reflection plane is incident, and
the subsidiary unit-prism portion functions as a refraction type prism portion having a first incident plane on which the ray of incident light is refracted to be deflected in the desired direction;
wherein a second Fresnel lens different from the Fresnel lens arranged on a plane of the light incident side is arranged on a plane of a light outgoing side of the Fresnel lens.

40. A screen, comprising:
a Fresnel lens including
a plurality of refraction type prism portions which are arranged on a light incident side and respectively have both a first incident plane, on which a ray of incident light is refracted to be deflected in a desired direction, and an ineffective plane different from the first incident plane,
wherein each refraction type prism portion has a subsidiary unit-prism portion arranged on the first incident plane, a ray of light expected to be incident on the ineffective plane of another adjacent refraction type prism portion placed on a Fresnel periphery side is received in the subsidiary unit-prism portion, and
the subsidiary unit-prism portion functions as a total reflection type prism portion having both a second incident plane, on which a ray of light is received, and a total reflection plane on which the ray of light received on the second incident plane is totally reflected to be deflected in the desired direction,
a plane-shaped outgoing plane which transmits the light from the total reflection plane and the first incident plane; and
a light diffusing means, arranged on the outgoing plane.

41. An image displaying device, comprising:
the screen according to claim 40;
an image light source for emitting a plurality of rays of image light; and projection optics means for projecting the rays of image light emitted from the image light source onto the screen.

* * * * *

UNITED STATES PATENT AND TRADEMARK OFFICE
CERTIFICATE OF CORRECTION

PATENT NO. : 7,116,476 B2
APPLICATION NO. : 10/792795
DATED : October 3, 2006
INVENTOR(S) : Hiroshi Suzuki et al.

It is certified that error appears in the above-identified patent and that said Letters Patent is hereby corrected as shown below:

Col. 59 lines 11-13 should read:

Claim 3: ~~A Fresnel lens according to claim 1, further comprising: a light-absorbing plate, arranged on the outgoing layer, for absorbing light.~~ A screen, comprising:
 the Fresnel lens according to claim 1; and
 an image forming and diffusing means for receiving the ray of outgoing light, to which display contents are added, from the Fresnel lens, forming an image from the ray of outgoing light and diffusing the image.

Col. 59 lines 14-19 should read:

Claim 4: ~~A Fresnel lens according to claim 1, further comprising: a group of pitch areas in which a plurality of dummy prism portions are successively arranged, wherein a height of each dummy prism portion in an optical axis direction is set not to have relation to the reception of light.~~ A screen according to claim 3, wherein the image forming and diffusing means is arranged on the outgoing plane to be integrally formed with the Fresnel lens.

Col. 59 lines 20-29 should read:

Claim 5: ~~A screen according to claim 1, wherein the image forming and diffusing means is arranged on the outgoing plane to be integrally formed with the Fresnel lens.~~ An image displaying device, comprising:
 the screen according to claim 3; illumination light source means for emitting a plurality of rays of light almost parallel to each other;
 converging optics means for converging the rays of light emitted from the illumination light source means;
 optical modulating means for spatially changing intensities of the rays of light converged by the converging optics means so as to modulate the rays of light according to the display contents; and
 projection optics means for projecting the rays of light modulated by the optical modulating means onto the screen.

UNITED STATES PATENT AND TRADEMARK OFFICE
CERTIFICATE OF CORRECTION

PATENT NO. : 7,116,476 B2
APPLICATION NO. : 10/792795
DATED : October 3, 2006
INVENTOR(S) : Hiroshi Suzuki et al.

It is certified that error appears in the above-identified patent and that said Letters Patent is hereby corrected as shown below:

Col. 59 lines 62-67 should read:

Claim 7. A Fresnel lens according to ~~claim 3~~ claim 6, wherein the second incident plane of each pitch area is formed in a sectional shape so as to make the second incident plane conceal the ineffective plane of the hybrid type prism portion arranged in an adjacent pitch from a view seen in a direction of a ray of ineffective light incident on the ineffective plane, and the total reflection plane of each pitch area is formed in a second incident plane compensating shape so as to compensate for the sectional shape of the second incident plane.

Claim 8. A Fresnel lens according to ~~claim 3~~ claim 7, wherein a small incident angle region is determined according to a characteristic changing angle at which transmissivity of the hybrid type prism portion is equal to that of the refraction type prism portion, and the refraction type prism portion is arranged in each of pitch areas placed in the small incident angle region.

Col. 60 lines 12-17 should read:

Claim 9. A Fresnel lens according to ~~claim 4~~ claim 8, wherein a mixing ratio of the refraction type prism portion to the hybrid type prism portion is increased with the decrease of the incident angle in each of pitch areas corresponding to a characteristic changing region neighboring to the characteristic changing angle.

Col. 60 lines 27-33 should read:

Claim 11. A Fresnel lens according to ~~claim 4~~ claim 6, wherein a small incident angle region is determined according to a characteristic changing angle at which transmissivity of the hybrid type prism portion is equal to that of the refraction type prism portion, and the refraction type prism portion is arranged in each of pitch areas placed in the small incident angle region.

Col. 61 lines 35-37 should read:

Claim 23. A Fresnel lens according to ~~claim 3~~ claim 6, further comprising: a light absorbing plate, arranged on the outgoing layer, for absorbing light.

UNITED STATES PATENT AND TRADEMARK OFFICE
CERTIFICATE OF CORRECTION

| | | |
|---|---|---|
| PATENT NO. | : 7,116,476 B2 | |
| APPLICATION NO. | : 10/792795 | |
| DATED | : October 3, 2006 | |
| INVENTOR(S) | : Hiroshi Suzuki et al. | |

It is certified that error appears in the above-identified patent and that said Letters Patent is hereby corrected as shown below:

Col. 61 lines 42-47 should read:

Claim 25.  A Fresnel lens according to ~~claim 3~~ claim 6, further comprising: a group of pitch areas in which a plurality of dummy prism portions are successively arranged, wherein a height of each dummy prism portion in an optical axis direction is set not to have relation to the reception of light.

Col. 61 lines 49-52 should read:

Claim 26.  A screen, comprising: the Fresnel lens according to ~~claim 1~~ claim 6; and an image forming and diffusing means for receiving the ray of outgoing light, to which display contents are added, from the Fresnel lens, forming an image from the ray of outgoing light and diffusing the image.

Col. 61 lines 55-57 should read:

Claim 27.  A screen according to ~~claim 3~~ claim 26, wherein the image forming and diffusing means is arranged on the outgoing plane to be integrally formed with the Fresnel lens.

UNITED STATES PATENT AND TRADEMARK OFFICE
CERTIFICATE OF CORRECTION

PATENT NO.         : 7,116,476 B2
APPLICATION NO.    : 10/792795
DATED              : October 3, 2006
INVENTOR(S)        : Hiroshi Suzuki et al.

It is certified that error appears in the above-identified patent and that said Letters Patent is hereby corrected as shown below:

Col. 61 lines 58-64 should read:

Claim 28. An image displaying device, comprising: the screen according to ~~claim 3~~claim 26; illumination light source means for emitting a plurality of rays of light almost parallel to each other; converging optics means for converging the rays of light emitted from the illumination light source means; optical modulating means for spatially changing intensities of the rays of light converged by the converging optics means so as to modulate the rays of light according to the display contents; and projection optics means for projecting the rays of light modulated by the optical modulating means onto the screen.

Signed and Sealed this

Third Day of March, 2009

JOHN DOLL
*Acting Director of the United States Patent and Trademark Office*